US011645781B2

(12) United States Patent
Li et al.

(10) Patent No.: US 11,645,781 B2
(45) Date of Patent: *May 9, 2023

(54) AUTOMATED DETERMINATION OF ACQUISITION LOCATIONS OF ACQUIRED BUILDING IMAGES BASED ON DETERMINED SURROUNDING ROOM DATA

(71) Applicant: MFTB Holdco, Inc., Seattle, WA (US)

(72) Inventors: Yuguang Li, Seattle, WA (US); Will A. Hutchcroft, Seattle, WA (US); Naji Khosravan, Seattle, WA (US); Ivaylo Boyadzhiev, Seattle, WA (US)

(73) Assignee: MFTB Holdco, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,299

(22) Filed: Oct. 7, 2022

(65) Prior Publication Data

US 2023/0032888 A1 Feb. 2, 2023

Related U.S. Application Data

(63) Continuation of application No. 17/201,996, filed on Mar. 15, 2021, now Pat. No. 11,481,925.

(Continued)

(51) Int. Cl.
*G06T 7/73* (2017.01)
*G06T 7/50* (2017.01)
(Continued)

(52) U.S. Cl.
CPC ............... *G06T 7/74* (2017.01); *G06F 18/22* (2023.01); *G06T 7/50* (2017.01); *G06T 11/00* (2013.01);
(Continued)

(58) Field of Classification Search
CPC ... G06T 7/74; G06T 7/50; G06T 11/00; G06T 2207/10028; G06T 2207/20084;
(Continued)

(56) References Cited

U.S. PATENT DOCUMENTS 5,140,352 A 8/1992 Moore et al.
6,031,540 A 2/2000 Golin et al.
(Continued)

FOREIGN PATENT DOCUMENTS

CA 3058602 A1 4/2020
CN 107123144 A 9/2017
(Continued)

OTHER PUBLICATIONS

CubiCasa | From video to floor plan in under 5 minutes, retrieved on Mar. 26, 2019, from https://www.cubi.casa/, 6 pages.
(Continued)

*Primary Examiner* — Jacinta M Crawford
*Assistant Examiner* — Andrew Shin
(74) *Attorney, Agent, or Firm* — VLP Law Group LLP; James A. D. White

(57) ABSTRACT

Techniques are described for computing devices to perform automated operations to determine the acquisition locations of images, such as within a building interior based on automatically determined shapes of rooms of the building, and for using the determined image acquisition location information in further automated manners. The image may be a panorama image or of another type (e.g., a rectilinear perspective image) and acquired at an acquisition location in a multi-room building's interior, and the determined acquisition location for such an image may be at least a location on the building's floor plan and optionally an orientation/direction for at least a part of the image—in addition, the automated image acquisition location determination may be (Continued)

further performed without having or using information from any depth sensors or other distance-measuring devices about distances from an image's acquisition location to walls or other objects in the surrounding building.

24 Claims, 26 Drawing Sheets

Related U.S. Application Data

(60) Provisional application No. 63/117,372, filed on Nov. 23, 2020.

(51) Int. Cl.
  G06V 10/44 (2022.01)
  G06V 10/75 (2022.01)
  G06V 20/00 (2022.01)
  G06T 11/00 (2006.01)
  G06F 18/22 (2023.01)
  H04N 23/698 (2023.01)

(52) U.S. Cl.
  CPC .......... G06V 10/44 (2022.01); G06V 10/7515 (2022.01); G06V 20/00 (2022.01); H04N 23/698 (2023.01); *G06T 2207/10028* (2013.01); *G06T 2207/20084* (2013.01); *G06T 2207/20164* (2013.01); *G06T 2207/30244* (2013.01); *G06V 2201/10* (2022.01)

(58) Field of Classification Search
  CPC . G06T 2207/20164; G06T 2207/30244; G06T 7/33; G06T 7/75; G06T 19/003; G06F 18/22; G06V 10/44; G06V 10/7515; G06V 20/00; G06V 2201/10; H04N 23/698; G06N 3/08
  See application file for complete search history.

(56) References Cited

U.S. PATENT DOCUMENTS

| | | |
|---|---|---|
| 6,141,034 A | 10/2000 | McCutchen |
| 6,317,166 B1 | 11/2001 | McCutchen |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvari et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,666,815 B1 | 3/2014 | Chau |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,026,947 B2 | 5/2015 | Lee et al. |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Mamo et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Birkler et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,375,306 B2 | 8/2019 | Shan et al. |
| 10,395,435 B2 | 8/2019 | Powers et al. |
| 10,530,997 B2 | 1/2020 | Shan et al. |
| 10,643,386 B2 | 5/2020 | Li et al. |
| 10,708,507 B1 | 7/2020 | Dawson et al. |
| 10,809,066 B2 | 10/2020 | Colburn et al. |
| 10,825,247 B1 | 11/2020 | Vincent et al. |
| 10,834,317 B2 | 11/2020 | Shan et al. |
| 10,937,247 B1 | 3/2021 | Chuah et al. |
| 11,057,561 B2 | 7/2021 | Shan et al. |
| 11,164,361 B2 | 11/2021 | Moulon et al. |
| 11,164,368 B2 | 11/2021 | Vincent et al. |
| 11,165,959 B2 | 11/2021 | Shan et al. |
| 11,217,019 B2 | 1/2022 | Li et al. |
| 11,238,652 B2 | 2/2022 | Impas et al. |
| 11,243,656 B2 | 2/2022 | Li et al. |
| 11,252,329 B1 | 2/2022 | Cier et al. |

(56) References Cited

U.S. PATENT DOCUMENTS

| | | |
|---|---|---|
| 11,284,006 B2 | 3/2022 | Dawson et al. |
| 11,405,549 B2 | 8/2022 | Cier et al. |
| 11,405,558 B2 | 8/2022 | Dawson et al. |
| 11,408,738 B2 | 8/2022 | Colburn et al. |
| 11,480,433 B2 | 10/2022 | Shan et al. |
| 11,481,925 B1 | 10/2022 | Li et al. |
| 11,494,973 B2 | 11/2022 | Moulon et al. |
| 11,501,492 B1 | 11/2022 | Li et al. |
| 2006/0256109 A1 | 11/2006 | Acker et al. |
| 2008/0126022 A1 | 5/2008 | Hoguet |
| 2010/0232709 A1 | 9/2010 | Zhang et al. |
| 2012/0075414 A1 | 3/2012 | Park et al. |
| 2012/0293613 A1 | 11/2012 | Powers et al. |
| 2013/0050407 A1 | 2/2013 | Brinda et al. |
| 2013/0342533 A1 | 12/2013 | Bell et al. |
| 2014/0003705 A1 | 1/2014 | Taguchi et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2014/0320674 A1 | 10/2014 | Kuang |
| 2015/0116691 A1 | 4/2015 | Likholyot |
| 2015/0189165 A1 | 7/2015 | Milosevski et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0007340 A1 | 1/2018 | Stachowski |
| 2018/0025536 A1 | 1/2018 | Bell et al. |
| 2018/0075168 A1 | 3/2018 | Tiwari et al. |
| 2018/0075652 A1 | 3/2018 | Kim |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hovden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |
| 2020/0225673 A1 | 7/2020 | Afrouzi et al. |
| 2020/0336675 A1 | 10/2020 | Dawson et al. |
| 2020/0389602 A1 | 12/2020 | Dawson et al. |
| 2020/0408532 A1 | 12/2020 | Colburn et al. |
| 2021/0044760 A1 | 2/2021 | Dawson et al. |
| 2021/0377442 A1 | 12/2021 | Boyadzhiev et al. |
| 2021/0385378 A1 | 12/2021 | Cier et al. |
| 2022/0003555 A1 | 1/2022 | Colburn et al. |
| 2022/0028156 A1 | 1/2022 | Boyadzhiev et al. |
| 2022/0028159 A1 | 1/2022 | Vincent et al. |
| 2022/0076019 A1 | 3/2022 | Moulon et al. |
| 2022/0092227 A1 | 3/2022 | Yin et al. |
| 2022/0114291 A1 | 4/2022 | Li et al. |
| 2022/0164493 A1 | 5/2022 | Li et al. |
| 2022/0189122 A1 | 6/2022 | Li et al. |

FOREIGN PATENT DOCUMENTS

| | | |
|---|---|---|
| EP | 2413097 A2 | 2/2012 |
| EP | 2505961 A2 | 10/2012 |
| EP | 2506170 A2 | 10/2012 |
| KR | 101770648 B1 | 8/2017 |
| KR | 101930796 B1 | 12/2018 |
| WO | 2005091894 A2 | 10/2005 |
| WO | 2016154306 A1 | 9/2016 |
| WO | 2018204279 A1 | 11/2018 |
| WO | 2019083832 A1 | 5/2019 |
| WO | 2019104049 A1 | 5/2019 |
| WO | 2019118599 A2 | 6/2019 |

OTHER PUBLICATIONS

CubiCasa FAQ & Manual, retrieved on Mar. 26, 2019, from https://www.cubi.casa/faq/, 5 pages.
Cupix Home, retrieved on Mar. 26, 2019, from https://www.cupix.com/, 1 page.
Cupix—FAQ, retrieved on Mar. 26, 2019, from https://www.cupix.com/faq.html, 3 pages.
IGUIDE: 3D Virtual Tours, retrieved on Mar. 26, 2019, from https://goiguide.com/, 6 pages.
Immoviewer.com | Automated Video Creation & Simple Affordable 3D 360 Tours, retrieved on Mar. 26, 2019, from https://www.immoviewer.com/, 5 pages.
MagicPlan | #1 Floor Plan App, Construction & Surveying Samples, retrieved on Mar. 26, 2019, from https://www.magicplan.app/, 9 pages.
EyeSpy360 Virtual Tours | Virtual Tour with any 360 camera, retrieved on Mar. 27, 2019, from https://www.eyespy360.com/en-us/, 15 pages.
Indoor Reality, retrieved on Mar. 27, 2019, from https://www.indoorreality.com/, 9 pages.
InsideMaps, retrieved on Mar. 27, 2019, from https://www.insidemaps.com/, 7 pages.
IStaging | Augmented & Virtual Reality Platform For Business, retrieved on Mar. 27, 2019, from https://www.istaging.com/en/, 7 pages.
Metareal, retrieved on Mar. 27, 2019, from https://www.metareal.com/, 4 pages.
PLNAR—The AR 3D Measuring / Modeling Platform, retrieved on Mar. 27, 2019, from https://www.plnar.co, 6 pages.
YouVR Global, retrieved on Mar. 27, 2019, from https://global.youvr.io/, 9 pages.

(56) References Cited

OTHER PUBLICATIONS

GeoCV, retrieved on Mar. 28, 2019, from https://geocv.com/, 4 pages.
Biersdorfer, J.D., "How To Make A 3-D Model Of Your Home Renovation Vision," in The New York Times, Feb. 13, 2019, retrieved Mar. 28, 2019, 6 pages.
Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.
Immersive 3D for the Real World, retrieved from https://matterport.com/, on Mar. 27, 2017, 5 pages.
Learn About Our Complete 3D System, retrieved from https://matterport.com/how-it-works/, on Mar. 27, 2017, 6 pages.
Surefield FAQ, retrieved from https://surefield.com/faq, on Mar. 27, 2017, 1 page.
Why Surefield, retrieved from https://surefield.com/why-surefield, on Mar. 27, 2017, 7 pages.
Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.
Tango (platform), Wikipedia, retrieved from https://en.wikipedia.org/wiki/Tango_(platform), on Jun. 12, 2018, 5 pages.
Zou et al. "LayoutNet: Reconstructing the 3D Room Layout from a Single RGB Image" in arXiv:1803.08999, submitted Mar. 23, 2018, 9 pages.
Lee et al. "RoomNet: End-to-End Room Layout Estimation" in arXiv:1703.00241v2, submitted Aug. 7, 2017, 10 pages.
Time-of-flight camera, Wikipedia, retrieved from https://en.wikipedia.org/wiki/Time-of-flight_camera, on Aug. 30, 2018, 8 pages.
Magicplan—Android Apps on Go . . . , retrieved from https://play.google.com/store/apps/details?id=com.sensopia.magicplan, on Feb. 21, 2018, 5 pages.
Hashemifar et al., "Geometric Mapping For Sustained Indoor Autonomy", IoPARTS 2018: Proceedings of the 1st International Workshop on Internet of People, Assistive Robots and Things, Jun. 2018, 6 pages.
Liu et al., "Global Localization With Object-Level Semantics And Topology", 2019 International Conference On Robotics And Automation (ICRA), May 20-24, 2019, 7 pages.
Zheng et al., "Structured3D: A Large Photo-Realistic Dataset For Structured 3D Modeling", European Conference on Computer Vision (ECCV), 2020, 11 pages.

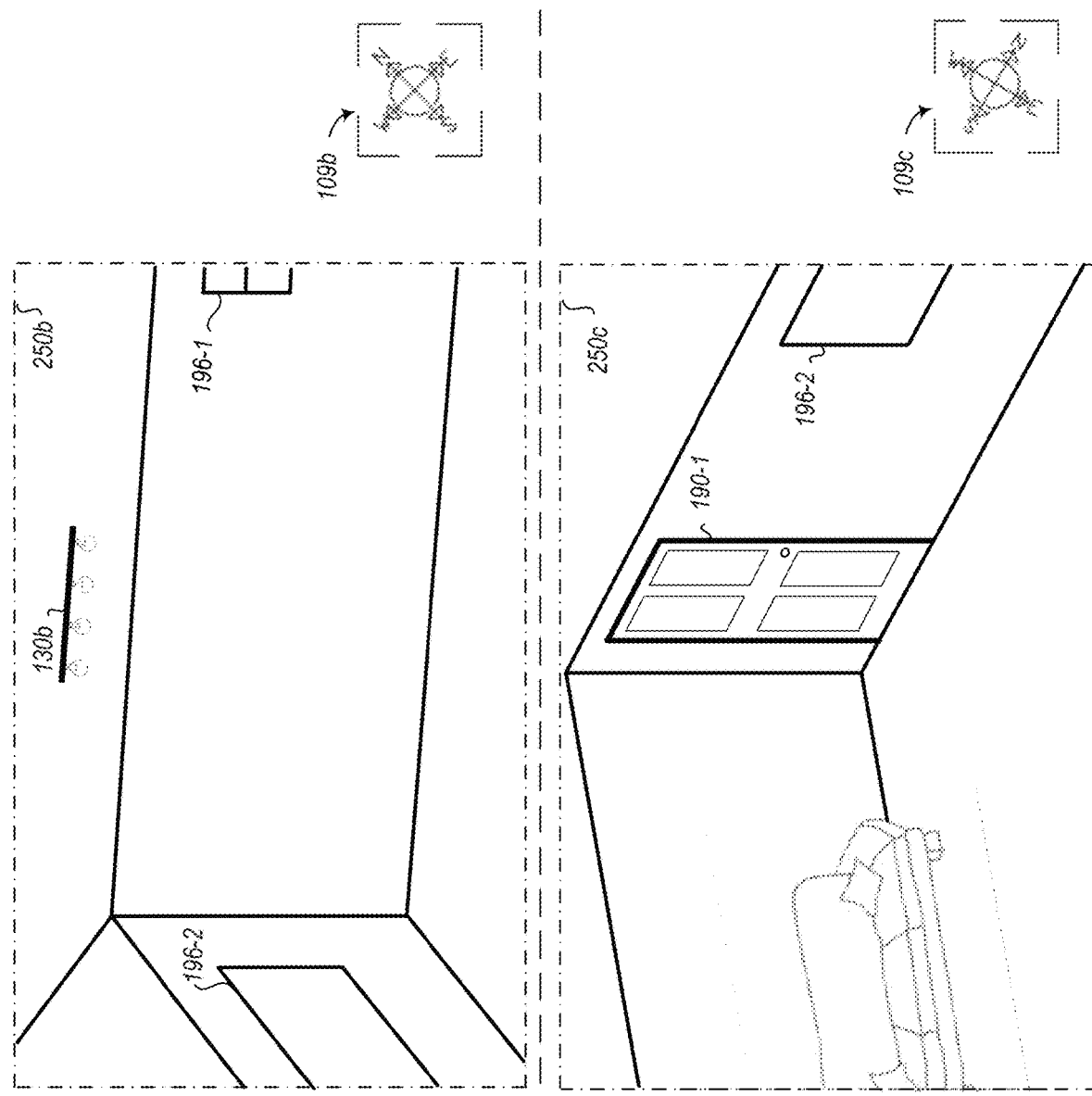

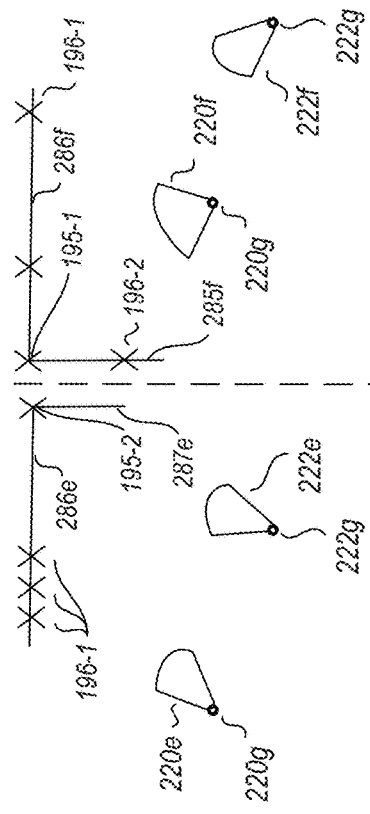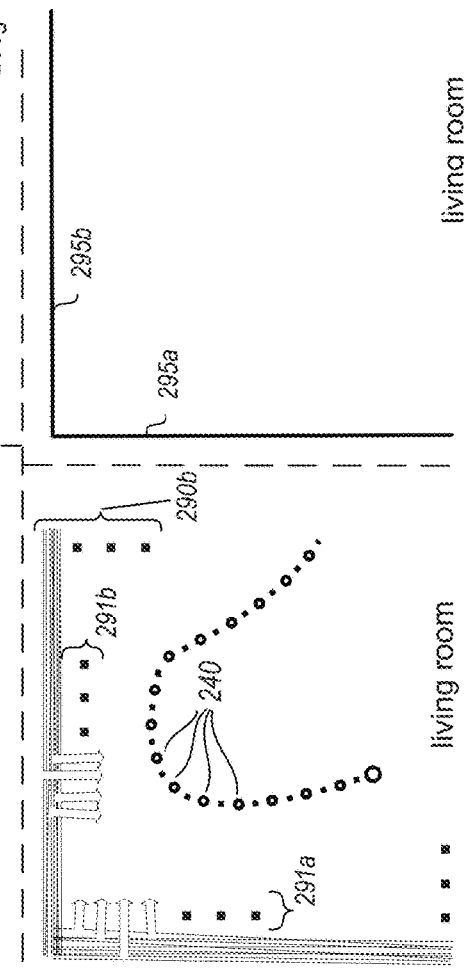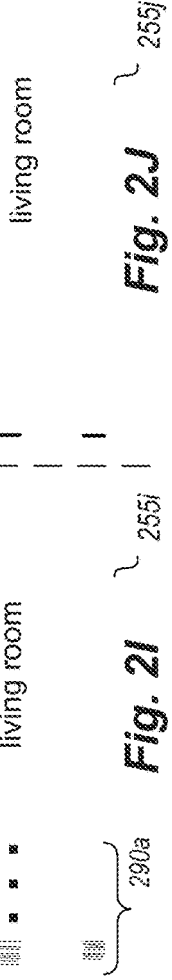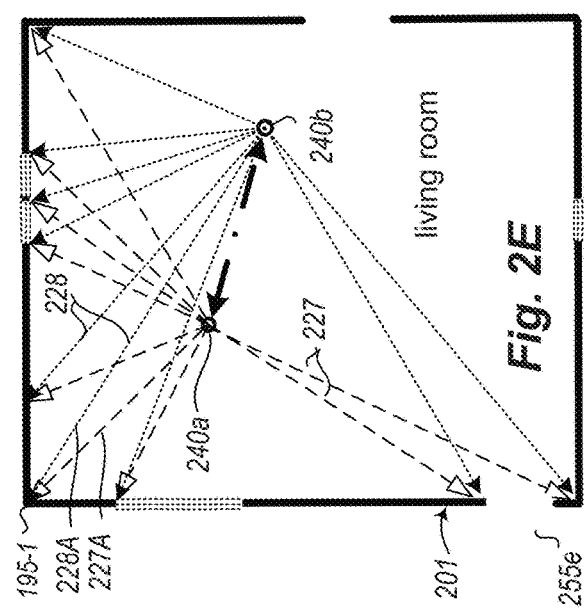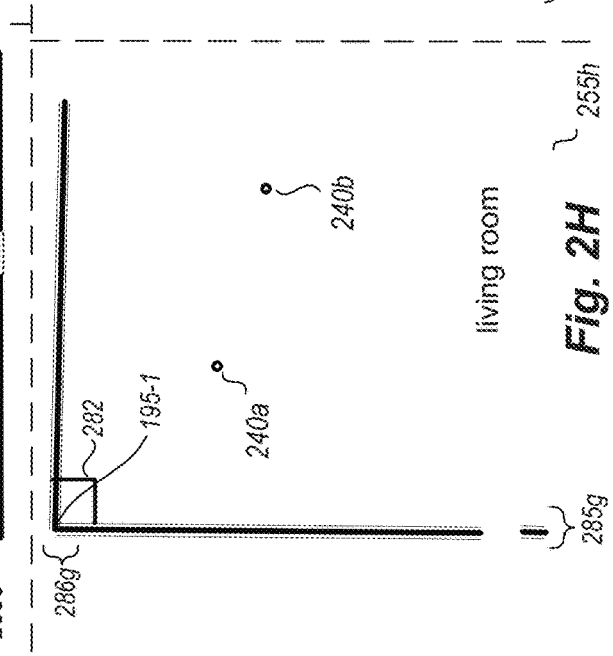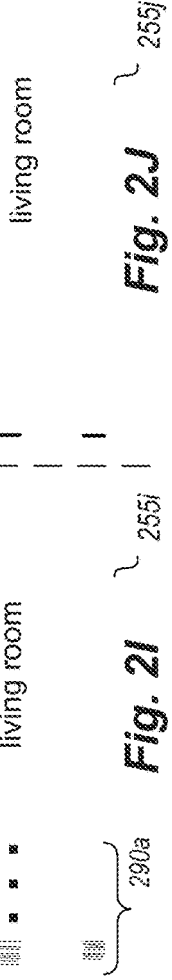
*Fig. 2E*
*Fig. 2F*
*Fig. 2G*
*Fig. 2H*
*Fig. 2I*
*Fig. 2J*

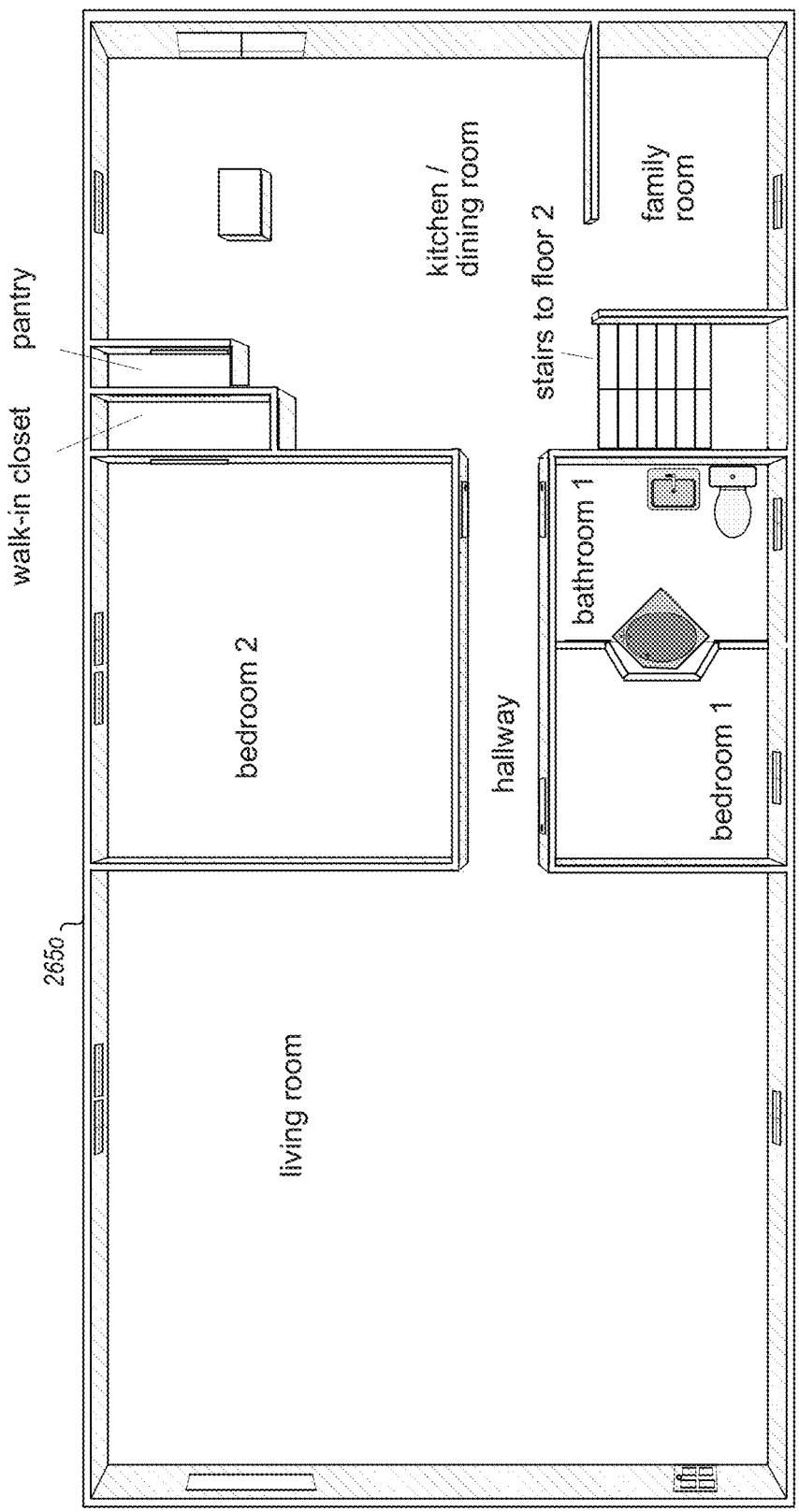
Fig. 2-O

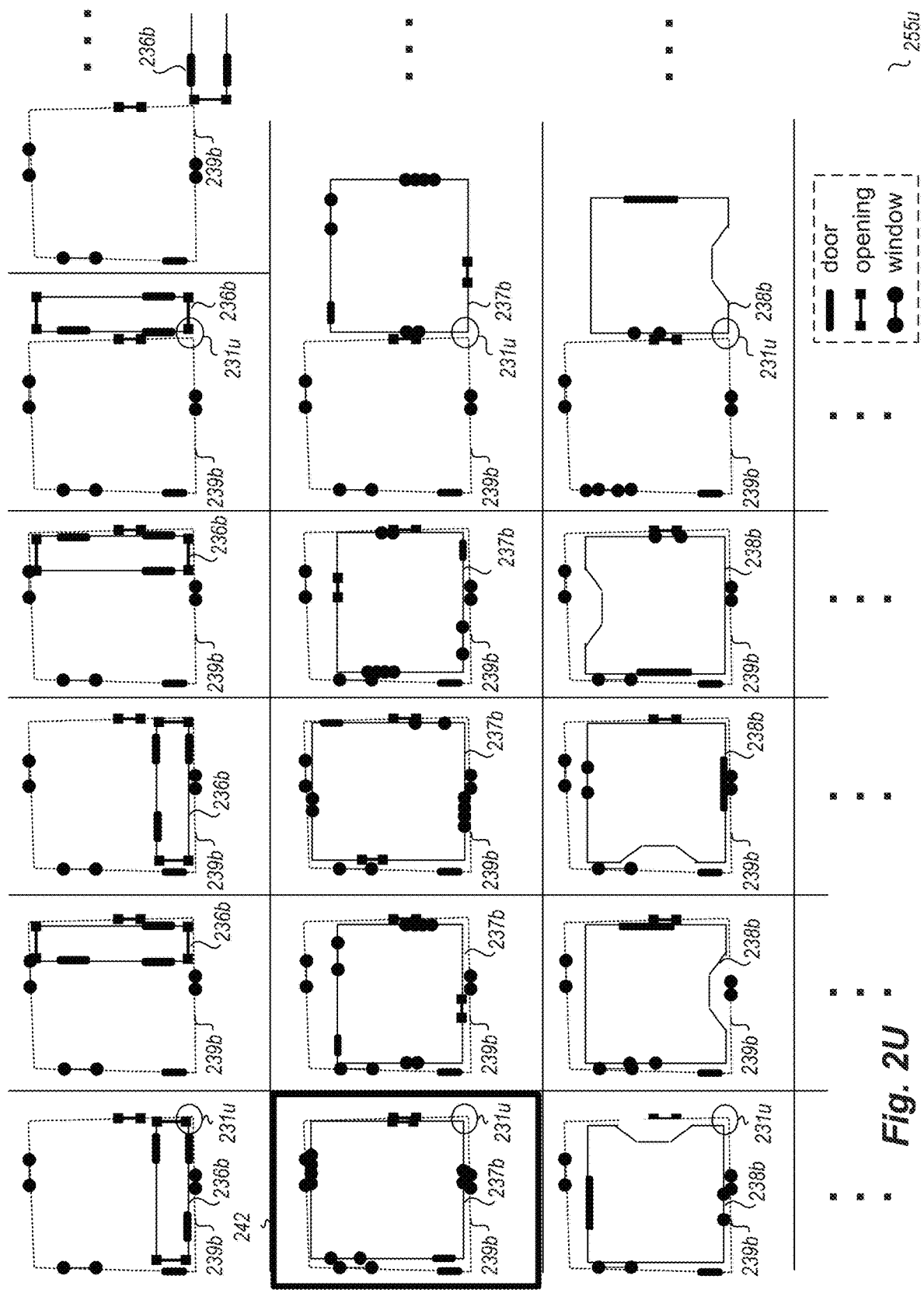

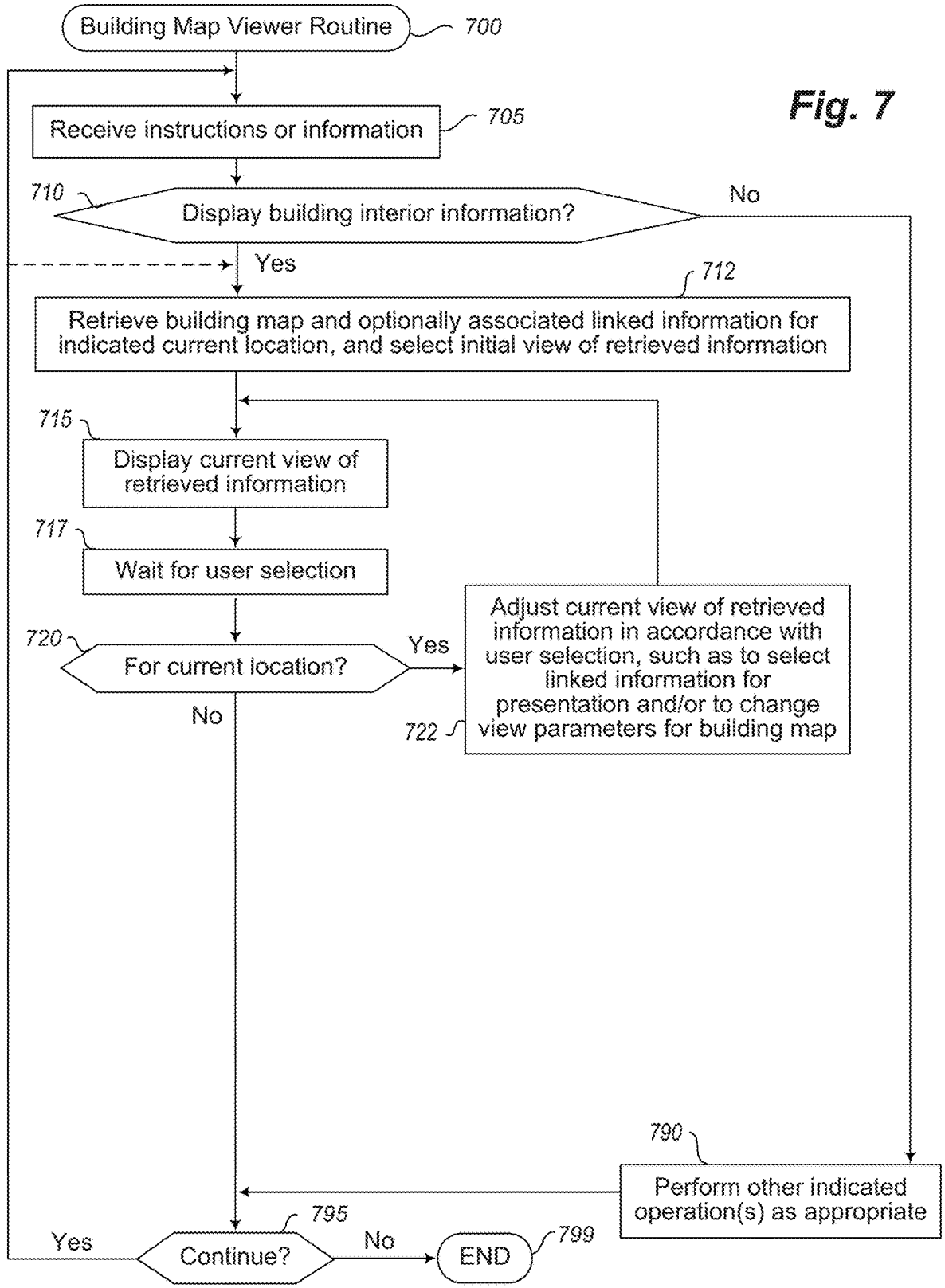

AUTOMATED DETERMINATION OF ACQUISITION LOCATIONS OF ACQUIRED BUILDING IMAGES BASED ON DETERMINED SURROUNDING ROOM DATA

CROSS REFERENCE TO RELATED APPLICATIONS

This application is a continuation-in-part of co-pending U.S. Non-Provisional patent application Ser. No. 17/201, 996, filed Mar. 15, 2021 and entitled "Automated Determination Of Image Acquisition Locations In Building Interiors Using Determined Room Shapes", which claims the benefit of U.S. Provisional Patent Application No. 63/117,372, filed Nov. 23, 2020 and entitled "Automated Determination Of Image Acquisition Locations In Building Interiors Using Determined Room Shapes," each of which is hereby incorporated by reference in its entirety.

TECHNICAL FIELD

The following disclosure relates generally to techniques for automatically determining the acquisition locations of images acquired at buildings based on using automatically determined data about surrounding room shapes and features, and for subsequently using the determined acquisition location information in one or more manners, such as to locate an image of an interior of a room in a building on a floor plan of the building and to use the image location to improve navigation of the building.

BACKGROUND

In various fields and circumstances, such as architectural analysis, property inspection, real estate acquisition and development, remodeling and improvement services, general contracting and other circumstances, it may be desirable to view information about the interior of a house, office, or other building without having to physically travel to and enter the building, including to determine actual as-built information about the building rather than design information from before the building is constructed. However, it can be difficult to effectively capture, represent and use such building interior information, including to display visual information captured within building interiors to users at remote locations (e.g., to enable a user to fully understand the layout and other details of the interior, including to control the display in a user-selected manner). In addition, while a floor plan of a building may provide some information about layout and other details of a building interior, such use of floor plans has some drawbacks in certain situations, including that floor plans can be difficult to construct and maintain, to accurately scale and populate with information about room interiors, to visualize and otherwise use, etc.

BRIEF DESCRIPTION OF THE DRAWINGS

FIG. 7 illustrates an example flow diagram for a Building Map Viewer system routine in accordance with an embodiment of the present disclosure.

DETAILED DESCRIPTION

Figure 1:
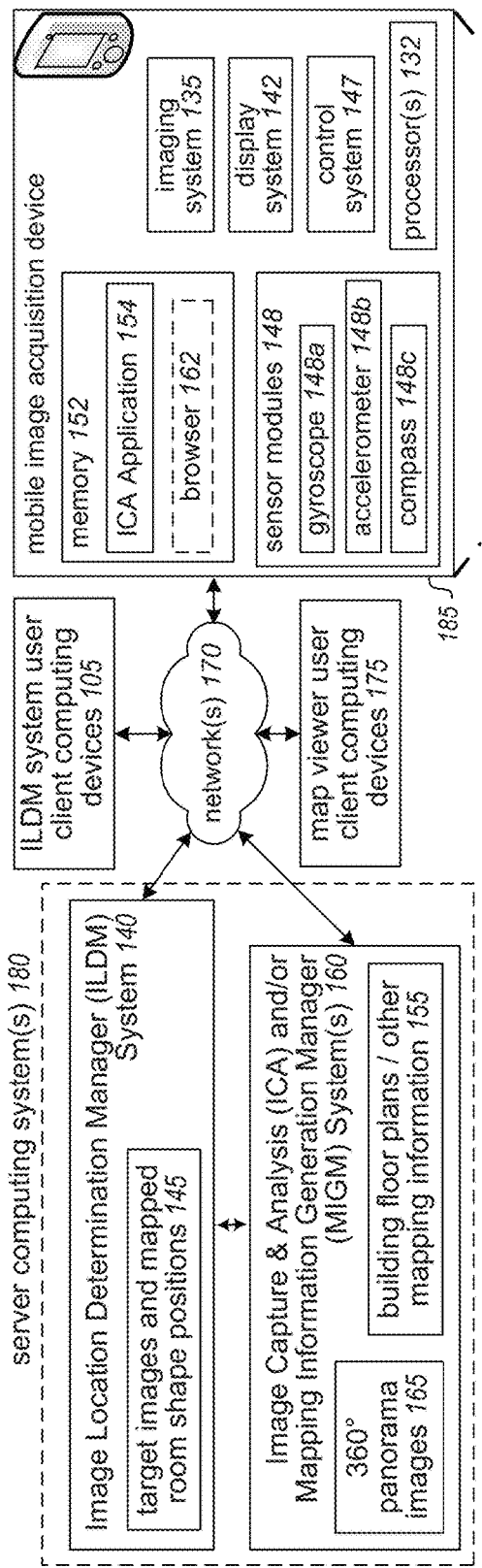
FIG. 1 is a diagram depicting an exemplary building interior environment and computing system(s) for use in embodiments of the present disclosure, such as for performing automated operations to determine the acquisition locations of images in building interiors based on automatically determined room shapes and to subsequently use the determined acquisition location information in one or more manners.
Figure 1:
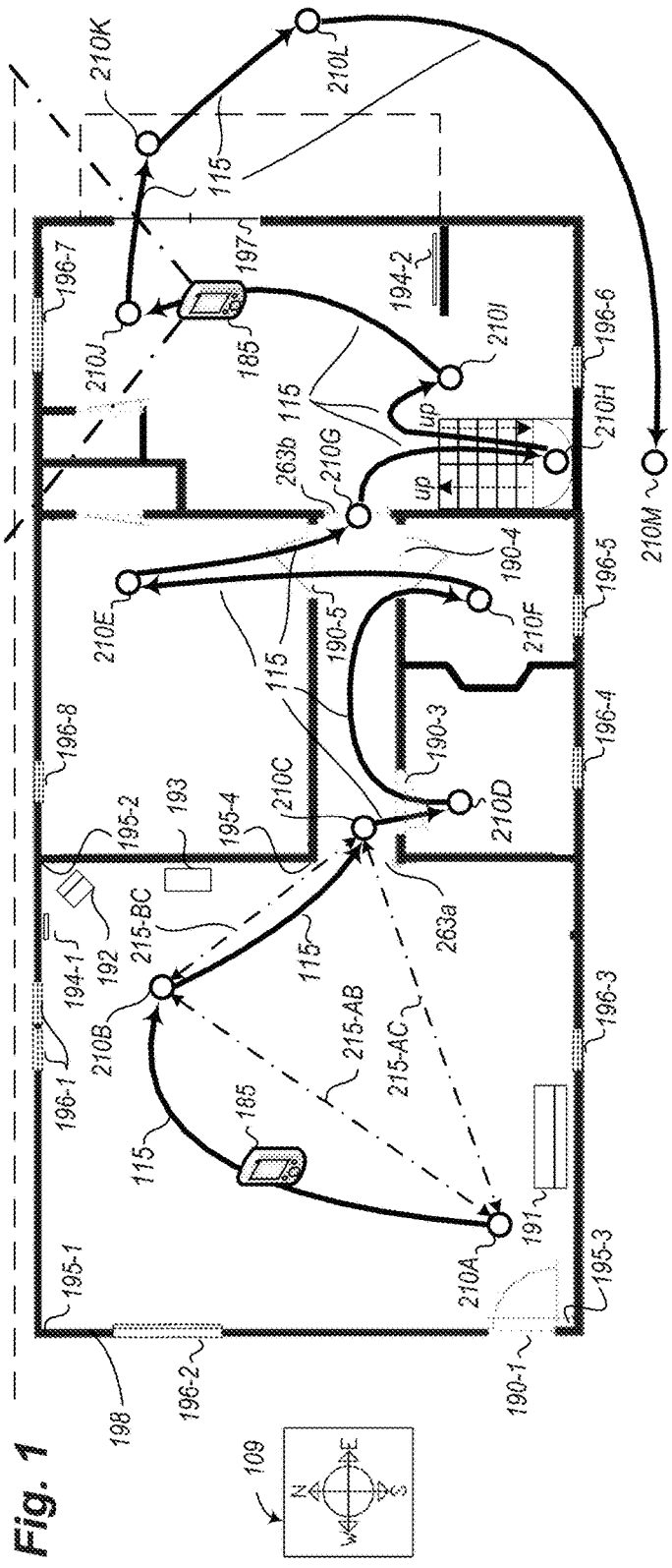

The present disclosure describes techniques for using computing devices to perform automated operations related to determining the acquisition locations of images, such as within a building interior based on automatically determined data about rooms of the building (e.g., room shapes and positions of in-room features), and for subsequently using the determined image acquisition location information in one or more further automated manners. Images to be analyzed may include panorama images or other images (e.g., rectilinear perspective images) that are acquired at acquisition locations in an interior of a multi-room building (e.g., a house, office, etc.), referred to generally herein as 'target images', and the determined image acquisition location information for such a target image includes at least a location on a floor plan of the building and in some situations further includes an orientation or other direction information for at least a part of the target image—in addition, in at least some such embodiments, the automated image acquisition location determination is further performed without having or using information from any depth sensors or other distance-measuring devices about distances from a target image's acquisition location to walls or other objects in the surrounding building. The determined image acquisition location information for one or more target images acquired for a building may be further used in various manners in various embodiments, such as in conjunction with a corresponding building floor plan and/or other generated mapping-related information for the building, including for controlling navigation of mobile devices (e.g., autonomous vehicles), for display or other presentation over one or more computer networks on one or more client devices in corresponding GUIs (graphical user interfaces), etc. Additional details are included below regarding the automated determination and use of image acquisition location information, and some or all of the techniques described herein may be performed via automated operations of an Image Location Determination Manager ("ILDM") system in at least some embodiments, as discussed further below.

As noted above, automated operations of an ILDM system may include determining the acquisition location and optionally orientation of a target image that is captured in a room of a house or other building (or in another defined area), by using automatically determined data about rooms of the building such as room shapes and in-room feature positions (or similar data shape and feature position data for multiple other defined areas that are candidates for the image's acquisition location, such as exterior areas around the building or otherwise on the building's property) —a combination of acquisition location and orientation for a target image is referred to at times herein as an 'acquisition position' or 'acquisition pose' of the target image or merely 'position' or 'pose' of the target image. For example, a building floor plan having associated room shape information for rooms of the building may be used in at least some embodiments in the automated determination of a target image's acquisition location within the building—in at least some such situations, 2D and/or 3D room shapes for the rooms shown on the floor plan (or for the other defined areas) may have been previously automatically determined (as discussed further below), while in other situations some or all of the room shapes of the rooms (or other shapes of defined areas) may be determined in other manners (e.g., automatically determined concurrently at a time of determining a target image's acquisition location, or instead determined previously or concurrently based at least in part on manual input by one or more users). A building floor plan with associated room shape information may have various forms in various embodiments, such as a 2D (two-dimensional) floor map of the building (e.g., an orthographic top view or other overhead view of a schematic floor map that does not include or display height information) and/or a 3D (three-dimensional) or 2.5D (two and a half-dimensional) floor map model of the building that does display height information. As another example, room shape information for rooms or the building may be determined directly from analysis of visual data of existing images previously acquired in those rooms and for which acquisition location information has already been determined, such as for a room with multiple such existing images to have multiple alternative room shapes that are similar but not identical corresponding to respective ones of those multiple existing images or to have a single room shape from a combination of the visual data of all those multiple existing images, and whether such image-based room shapes are in addition to or instead of room shapes determined from a building floor plan. In at least some embodiments, the automated determination of a target image's acquisition location within a multi-room building may generally include retrieving determined room shapes for some or all of the building's rooms (whether image-based room shapes and/or floor plan-based room shapes), and identifying one of those rooms whose determined room shape best matches a room shape for the target image that is estimated from the visual data of the target image's contents and is placed (e.g., sized and rotated) to match that identified room's determined room shape, including comparing aspects of the target image's visual data (e.g., data about in-room wall objects and other in-room elements and features, such as positions of and other information about elements and features such as corners and inter-wall borders, and about in-room wall objects such as windows, doorway wall openings, non-doorway wall openings, etc.) to the determined room shape of that identified room to determine at least a location within that identified room at which the target image was acquired.

As part of automated operations for identifying an estimated room shape for a room enclosing a target image based at least in part on the visual data of the target image, the described techniques may, in at least some embodiments, include using one or more trained neural networks or other techniques to estimate a 3D room shape shown in the target image. As non-exclusive examples, such 3D room shape estimation may include one or more of the following: using a trained convolutional neural network or other analysis technique to take the target image as input and to estimate a 3D point cloud of the walls and other surfaces of the enclosing room from the visual data of the target image and/or to estimate 3D walls and other planar surfaces of the enclosing room from the visual data of the target image; using a trained neural network or other analysis technique to take the target image as input and to estimate wireframe structural lines of the enclosing room from the visual data of the target image (e.g., structural lines to show one or more of borders between walls, borders between walls and ceiling, borders between walls and floor, outlines of doorways and/or other inter-room wall openings, outlines of windows, etc.); using a trained neural network or other analysis technique to detect wall objects and other in-room wall structural elements and features (e.g., windows and/or skylights; passages into and/or out of the room, such as doorways and other openings in walls, stairs, hallways, etc.; borders between adjacent walls; borders between walls and a floor; borders between walls and a ceiling; corners (or solid geometry vertices) where at least three surfaces or planes meet; etc.) in the visual data of the target image and to optionally detect other fixed structural elements (e.g., countertops, bath tubs, sinks, islands, fireplaces, etc.) and to generate 3D bounding boxes for the detected elements and to optionally further determine object types and associated tags (e.g., window, doorway, etc.) for those elements and to optionally further determine a vector direction orientation associated with an object and pointing into the room (e.g., for a wall object such as a window or doorway or non-doorway wall opening that has a vertical planar surface parallel to the wall, a vector direction that is orthogonal to that planar surface, such as to point inward into the room at a level horizontal angle from a center point of the object or other point associated with the object or its 2D or 3D bounding box); using a trained neural network or other analysis technique to determine a room type and associated tag for the enclosing room (e.g., living room, bedroom, bathroom, kitchen, etc.) from the visual data of the target image; using a trained deep neural network or other analysis technique to generate an object (or other feature or element) embedding vector that encodes information about each of one or more in-room wall objects and other elements and features of the enclosing room, such as object/element/feature types and locations and optionally additional data such as about object/element/feature shapes and/or appearances, etc. (e.g., in a concise format that is not easily discernible to a human reader); using a trained deep neural network or other analysis technique to generate a room embedding vector that encodes information about elements and other features of each of the rooms, such as element types and locations, room type and shape and size, etc. (e.g., in a concise format that is not easily discernible to a human reader); etc. In some embodiments, acquisition metadata for the target image may be further used as part of determining an estimated room shape for a room enclosing a target image, such as by using data from IMU (internal measurement unit) sensors on the acquiring camera or other associated device as part of performing a SLAM (Simultaneous Localization And Mapping) and/or SfM (Structure from Motion) and/or MVS (multiple-view stereovision) analysis, as discussed further below. Additional details are included below regarding automated operations that may be performed by the ILDM system in at least some embodiments for identifying an estimated room shape for a room enclosing a target image based at least in part on the visual content of the target image.

Once a target image's estimated room shape for an enclosing room is automatically identified, it may be compared to other candidate room shapes (e.g., the previously determined room shapes of some or all rooms for a building) in order to automatically determine a room shape from the candidates that best matches the target image's estimated room shape, with the room having such a matching determined room shape referred to herein as a 'target' room within the building in which the target image's acquisition location occurs. Determination of one or more potentially matching candidate room shapes, including a particular placement (i.e., location and rotation) of the target image's estimated room shape relative to that of the candidate room shape, may include considering and evaluating multiple alternative shape matches each having different such placements of the target image's estimated room shape relative to that of one or more candidate room shapes. For example, in at least some embodiments, one or more corners of the target image's estimated room shape may be successively or simultaneously matched to one or more corners of a candidate room shape (e.g., to separately match each corner of the target image's estimated room shape to each corner of each candidate room shape, to separately match each pair of two corners of the target image's estimated room shape to each pair of two other corners of each candidate room shape, etc.), along with using vanishing line angle information for the target image and a candidate room shape to represent wall alignment options for the two room shapes with a matching corner—thus, if all alternatives are considered for the target image's estimated room shape and a particular candidate room shape, and there are M predicted room corners in the target image's estimated room shape and N room corners in the candidate room shape and 2 vanishing line angles for each of the target image and the candidate room shape (or for an existing image with a specified position within that candidate room shape), there will be M*N*4 shape matching alternatives for the target image's estimated room shape and that candidate room shape, each providing a possible acquisition location and optionally orientation for the target image according to that shape match alternative, and with such various shape matching alternatives further being considered for each candidate room shape. As another example, in at least some embodiments, one or more wall objects of the target image's estimated room shape may be successively or simultaneously matched to one or more wall objects (e.g., wall objects of the same type) of a candidate room shape (e.g., to separately match each wall object of the target image's estimated room shape to each wall object of each candidate room shape, to separately match each pair of two wall object of the target image's estimated room shape to each pair of two other wall object of each candidate room shape, etc.), along with using vanishing line angle information for the target image and a candidate room shape (or an existing image with a specified position within that candidate room shape) to represent wall alignment options for the two room shapes with a matching corner, and such as by using the wall objects 2D and/or 3D bounding boxes to represent those objects' locations and shapes for the matching—thus, if all alternatives are considered for the target image's estimated room shape and a particular candidate room shape, and there are P predicted wall objects in the target image's estimated room shape and Q wall objects in the candidate room shape and 2 vanishing line angles for each of the target image and the candidate room shape (or for an existing image with a specified position within that candidate room shape), there will be P*Q*4 shape matching alternatives for the target image's estimated room shape and that candidate room shape, each providing a possible acquisition location and optionally orientation for the target image according to that shape match alternative, and with such various shape matching alternatives further being considered for each candidate room shape. Alternatively, if vector direction information is further available for such one or more wall objects of the target image's estimated room shape and one or more wall objects (e.g., wall objects of the same type) of a candidate room shape, such vector direction information may further be used to match a placement (rotation and location) of the two room shapes without considering the multiple different alternative wall alignment options based on vanishing line angle information, resulting in only P*Q shape matching alternatives for the target image's estimated room shape and that candidate room shape when further using such vector directional information.

In addition, in at least some embodiments, additional automated operations may be performed to determine one or more preferred candidate room shapes to compare to the estimated room shape for the target image (e.g., by ranking some or all of the candidate room shapes, and in some embodiments to compare the preferred candidate(s) to the target image's estimated room shape before or instead of other non-preferred candidates), such as by using one or more types of information to identified the preferred candidate(s) as follows: by matching determined room type tags for the target image's estimated room shape to room type tags for the candidate room shapes; by using information about one or more floor plan rooms associated with one or more other additional images acquired in the building successively before and/or after the target image in order to identify the same or adjacent rooms in the floor plan as possible acquisition locations of the target image; by comparing the visual data of the target image pairwise to the visual data of existing images that were previously acquired and have specified positions within the room shapes of the floor plan (e.g., by a trained neural network) in order to determine matching features in the pair of images that enable the target image's position to be determined relative to the specified position of a paired existing image (e.g., with a degree of match that exceeds a first defined matching threshold); by comparing the visual data of the entire target image pairwise to the visual data of entire existing images that were previously acquired and have specified positions within the room shapes of the floor plan (e.g., by a trained neural network) in order to determine similarity from co-visible areas in the pair of images that enable the target image's position to be determined relative to the specified position of a paired existing image (e.g., with a degree of similarity that exceeds a second defined matching threshold); by using movement tracking information for the target image's camera (e.g., using SLAM) to determine spatial relation information for the target image, such as approximate 3D shape information for a surrounding environment, approximate 3D planar surfaces in the surrounding environment, camera travel path information in the enclosing room, etc.; by using movement information for the target image's camera (e.g., from one or more IMU sensors of the camera or an associated device) to determine, with respect to a comparison of the visual data of the target image pairwise with the visual data of existing images that were previously acquired and have specified positions within the room shapes of the floor plan (e.g., by a trained neural network), multiple directions between the pair of images to assist in determining the target image's position relative to the specified position of a paired existing image (e.g., with a degree of similarity in the multiple directions that exceeds a third defined matching threshold); etc.

In order to select between shape matching alternatives for the target image's estimated room shape and at least one candidate room shape, one or more matching scores can be considered and combined (if more than one is considered) for each shape matching alternative, such as via weighting or a trained machine learning model for the combining, with non-exclusive examples of such matching scores including the following: scoring the distance between the locations of each corner for the target image's estimated room shape and for the candidate room shape for that shape matching alternative, using a particular placement of the target image's estimated room shape for that shape matching alternative and after re-projecting the candidate room shape into the target image space, and with smaller distances identifying better matches; scoring the distance between wireframe structural lines for the target image's estimated room shape and for the candidate room shape for that shape matching alternative, using a particular placement of the target image's estimated room shape for that shape matching alternative and after re-projecting the candidate room shape's wireframe structural lines into the target image space, and with smaller distances identifying better matches; scoring the distance between the locations of each wall object 2D and/or 3D bounding box for the target image's estimated room shape and for the candidate room shape for that shape matching alternative, using a particular placement of the target image's estimated room shape for that shape matching alternative based on those bounding box locations and after re-projecting the object 2D and/or 3D bounding boxes for the candidate room shape into the target image space, such as by using an intersection-over-union distance measurement and with smaller distances identifying better matches; scoring the distance between the locations of structural walls for the target image's estimated room shape and for the candidate room shape for that shape matching alternative, using a particular placement of the target image's estimated room shape for that shape matching alternative and after re-projecting the structural walls for the candidate room shape into the target image space, and with smaller distances identifying better matches; scoring the difference between two determinations of directions/angles between the acquisition position of the target image for that shape matching alternative and the specified position of an existing image in the candidate room shape, such as by using the determined location and orientation of the acquisition location for that shape matching alternative relative to the existing image's specified position as a first direction/angle, and using a comparison of the visual data in the target and existing images' contents (e.g., using an SfM analysis; using results of a trained convolutional neural network; etc.) to provide a second direction/angle, and with smaller differences identifying better matches; scoring the difference between the overall visual data of the target image and of another image in the room with the candidate room shape for that shape matching alternative (e.g., an additional image acquired in that room at a same time as the target image, such as within a defined time period of minutes and/or hours; an existing image previously acquired in that room and with a specified position in that room; etc., and as determined by a trained convolutional neural network or in another manner), and with smaller differences identifying better matches; scoring the difference between a first generated image embedding vector for the target image and a second generated image embedding vector for another image in the room with the candidate room shape for that shape matching alternative (e.g., an additional image acquired in that room at a same time as the target image, such as within a defined time period of minutes and/or hours; an existing image previously acquired in that room and with a specified position in that room; etc.), and with smaller differences identifying better matches; scoring the difference between a first generated wall object embedding vector for a wall object in the target image and a second generated wall object embedding vector for another wall object (e.g., of the same type) in another image in the room with the candidate room shape for that shape matching alternative (e.g., an additional image acquired in that room at a same time as the target image, such as within a defined time period of minutes and/or hours; an existing image previously acquired in that room and with a specified position in that room; etc.), and with smaller differences identifying better matches; etc.

In addition, after determining an initial acquisition position of the target image for each shape matching alternative in the manner noted above, at least some embodiments include performing one or more additional automated operations to update and refine the initial acquisition position for one or more shape matching alternatives (e.g., all shape matching alternatives; one or more best matches according to the combination of the matching scores, or based on a single matching score if only one is used; etc.), such as one or more of the following non-exclusive list: using the scored distances between the locations of each corner for the target image's estimated room shape and for the candidate room shape for that shape matching alternative using a particular placement of the target image's estimated room shape for that shape matching alternative, such as by identifying corner pairs of the two room shapes that are within a first defined distance threshold (referred to herein as 'corner inliers') and using a weighted least squares regression to refine the acquisition position of the target image (e.g., using confidence scores generated for each corner inlier, such as by a trained neural network, as weights for the regression); using the scored distances between the locations of wireframe structural lines for the target image's estimated room shape and for the candidate room shape for that shape matching alternative using a particular placement of the target image's estimated room shape for that shape matching alternative, such as by identifying horizontal structural line pairs of the two room shapes that are within a second defined distance threshold (referred to herein as 'line inliers') and using a weighted least squares regression to refine the acquisition position of the target image (e.g., using confidence scores generated for each line inlier, such as by a trained neural network, as weights for the regression); performing a differentiable rendering optimization using image normal/orthogonal direction predictions, by rendering pixel-level surface normal information for the target image's estimated room shape using the initial acquisition position for that shape matching alternative (e.g., by using a trained neural network), and comparing those rendered pixel-level surface normal values to other pixel-level surface normal values estimated for an existing image with a specified position in the candidate room shape to determine a difference-based cost value, such as by iterating until the cost value reaches a local minimum; performing other types of optimizations (e.g., based on gradient descent, such as using simulated annealing) for a target image's predicted pose, such as with respect to one or more existing images in the same room (e.g., by using the target image's predicted pose to reproject a new image in an existing image's visual data coordinate system space and then comparing the reprojected new image to the target image), and optimizing the predicted pose of the target image with respect to one or more matching scores, such as by determining a difference-based cost value and iterating until the cost value reaches a local minimum; etc.

Furthermore, in at least some embodiments, the determined initial and/or updated acquisition position of a target image may be further refined in conjunction with other determined acquisition positions of other target images acquired in the building, such as to reach a global optimization for all of those target images (including to optionally use additional information about relative directions between and/or positions of some or all of those target images, such as may be reflected by generated inter-target image links, as discussed in greater detail elsewhere herein). Additional details are included below regarding automated operations that may be performed by the ILDM system in at least some embodiments for comparing a target image's estimated room shape for an enclosing room to other candidate room shapes in order to determine one or more matching target rooms of the building (e.g., a single best-match target room), including to determine the acquisition position of the target image within each of the matching target rooms.

In addition, in some embodiments, an image's estimated room shape may be matched to other room shapes without using a floor plan as noted above. For example, in at least some embodiments, the candidate room shapes are generated using estimated room shapes for other images acquired in one or more buildings, such as for other additional images that are concurrently captured (e.g., within a defined time period, such as one or more minutes or hours) in the same building as the target image and/or other existing images that were previously captured and for which pose information is available. In such embodiments, the target image's position may be determined relative to that of one or more other additional images and their room shapes, including in some embodiments to do so dynamically while the target image and such additional images are being captured and/or to do so previously for such existing images before the target image is captured, including to automatically generate a partial or full floor plan for the building using the estimated room shapes for the target image and other additional images.

Furthermore, in some embodiments for an image captured in a defined area other than a room, the image's estimated shape of that defined area may be matched to other defined areas' shapes in various manners. For example, in at least some embodiments, a target image (and optionally additional and/or existing images) may be acquired outside of one or more buildings, such as in one of multiple separate areas of one or more properties (e.g., for a house, a garden, patio, deck, back yard, side yard, front yard, pool, carport, dock, etc.) that each has a previously or concurrently determined area shape (e.g., a 3D shape, a 2D shape, etc.) and that may further each have objects and/or other elements or features in those area shapes—if so, the acquisition position of the target image (and optionally of the additional images) may similarly be automatically determined using such other defined areas' shapes as the candidate 'room' shapes and optionally using similar types of information about such objects and/or other elements or features of those areas' shapes.

The automated determination by the ILDM system of the acquisition location of a target image taken in a room may further include additional operations in some embodiments, and corresponding additional details are included below, including with respect to the examples of FIG. 2A-2Z and their associated descriptions.

The described techniques provide various benefits in various embodiments, including to allow floor plans of multi-room buildings and other structures to be automatically augmented with information about acquisition locations at which images are acquired in the buildings or other structures, including without having or using information from depth sensors or other distance-measuring devices about distances from images' acquisition locations to walls or other objects in a surrounding building or other structure. Furthermore, such automated techniques allow such image acquisition location information to be determined more quickly than previously existing techniques, and in at least some embodiments with greater accuracy, including by using information acquired from the actual building environment (rather than from plans on how the building should theoretically be constructed), as well as enabling the capture of changes to structural elements that occur after a building is initially constructed. Such described techniques further provide benefits in allowing improved automated navigation of a building by mobile devices (e.g., semi-autonomous or fully-autonomous vehicles), based at least in part on the determined acquisition locations of images, including to significantly reduce computing power and time used to attempt to otherwise learn a building's layout. In addition, in some embodiments the described techniques may be used to provide an improved GUI in which a user may more accurately and quickly obtain information about a building's interior (e.g., for use in navigating that interior), including in response to search requests, as part of providing personalized information to the user, as part of providing value estimates and/or other information about a building to a user, etc. Various other benefits are also provided by the described techniques, some of which are further described elsewhere herein.

As noted above, in at least some embodiments and situations, some or all of the images acquired for a building may be panorama images that are each acquired at one of multiple acquisition locations in or around the building, such as to generate a panorama image at each such acquisition location from one or more of a video captured at that acquisition location (e.g., a 360° video taken from a smartphone or other mobile device held by a user turning at that acquisition location), or multiple images captured in multiple directions from the acquisition location (e.g., from a smartphone or other mobile device held by a user turning at that acquisition location; from automated rotation of a device at that acquisition location, such as on a tripod at that acquisition location; etc.), or a simultaneous capture of all the image information for a particular acquisition location (e.g., using one or more fisheye lenses), etc. It will be appreciated that such a panorama image may in some situations be represented in an equirectangular or other spherical coordinate system and provide up to 360° coverage around horizontal and/or vertical axes (e.g., 360° of coverage along a horizontal plane and around a vertical axis), while in other embodiments the acquired panorama images or other images may include less than 360° of vertical coverage (e.g., for images with a width exceeding a height by more than a typical aspect ratio, such as at or exceeding 21:9 or 16:9 or 3:2 or 7:5 or 4:3 or 5:4 or 1:1, including for so-called 'ultrawide' lenses and resulting ultrawide images).

In addition, it will be appreciated that a user viewing such a panorama image (or other image with sufficient horizontal and/or vertical coverage that only a portion of the image is displayed at any given time) may be permitted to move the viewing direction within the panorama image to different orientations to cause different subset images (or "views") to be rendered within the panorama image, and that such a panorama image may in some situations be represented in an equirectangular or other spherical coordinate system (including, if the panorama image is represented in a spherical coordinate system and a particular view is being rendered, to convert the image being rendered into a planar coordinate system, such as for a perspective rectilinear image view before it is displayed). Furthermore, acquisition metadata regarding the capture of such panorama images may be obtained and used in various manners, such as data acquired from IMU (inertial measurement unit) sensors or other sensors of a mobile device as it is carried by a user or otherwise moved between acquisition locations—non-exclusive examples of such acquisition metadata may include one or more of acquisition time; acquisition location, such as GPS coordinates or other indication of location; acquisition direction and/or orientation; relative or absolute order of acquisition for multiple images acquired for a building or that are otherwise associated; etc., and such acquisition metadata may further optionally be used as part of determining the images' acquisition locations in at least some embodiments and situations, as discussed further below. Additional details are included below regarding automated operations of device(s) implementing an Image Capture and Analysis (ICA) system involved in acquiring images and optionally acquisition metadata, including with respect to FIGS. 1 and 2A-2D and elsewhere herein.

As is also noted above, shapes of rooms of a building may be automatically determined in various manners in various embodiments, including at a time before automated determination of a particular target image's acquisition location within the building. For example, in at least some embodiments, a Mapping Information Generation Manager (MIGM) system may analyze various existing images acquired in and around a building in order to automatically determine room shapes of the building's rooms (e.g., 3D room shapes, 2D room shapes, etc.) and to automatically generate a floor plan for the building. As one example, if multiple images are acquired within a particular room, those images may be analyzed to determine a 3D shape of the room in the building (e.g., to reflect the geometry of the surrounding structural elements of the building) —the analysis may include, for example, automated operations to 'register' the camera positions for the images in a common frame of refence so as to 'align' the images and to estimate 3D locations and shapes of objects in the room, such as by determining features visible in the content of such images (e.g., to determine the direction and/or orientation of the acquisition device when it took particular images, a path through the room traveled by the acquisition device, etc., such as by using SLAM techniques for multiple video frame images and/or other SfM techniques for a 'dense' set of images that are separated by at most a defined distance (such as 6 feet) to generate a 3D point cloud for the room including 3D points along walls of the room and at least some of the ceiling and floor of the room and optionally with 3D points corresponding to other objects in the room, etc.) and/or by determining and aggregating information about planes for detected features and normal (orthogonal) directions to those planes to identify planar surfaces for likely locations of walls and other surfaces of the room and to connect the various likely wall locations (e.g., using one or more constraints, such as having 90° angles between walls and/or between walls and the floor, as part of the so-called 'Manhattan world assumption') and form an estimated room shape for the room. After determining the estimated room shapes of the rooms in the building, the automated operations may, in at least some embodiments, further include positioning the multiple room shapes together to form a floor plan and/or other related mapping information for the building, such as by connecting the various room shapes. Additional details are included below regarding automated operations of device(s) implementing an MIGM system involved in determining room shapes and combining room shapes to generate a floor plan, including with respect to FIGS. 1 and 2E-2M and elsewhere herein.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while floor plans may be generated for houses that do not include detailed measurements for particular rooms or for the overall houses, it will be appreciated that other types of floor plans or other mapping information may be similarly generated in other embodiments, including for buildings (or other structures or layouts) separate from houses. As another non-exclusive example, while floor plans for houses or other buildings may be used for display to assist viewers in navigating the buildings, generated mapping information may be used in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), etc. The term "acquire" or "capture" as used herein with reference to a building interior, acquisition location, or other location (unless context clearly indicates otherwise) may refer to any recording, storage, or logging of media, sensor data, and/or other information related to spatial and/or visual characteristics and/or otherwise perceivable characteristics of the building interior or subsets thereof, such as by a recording device or by another device that receives information from the recording device. As used herein, the term "panorama image" may refer to a visual representation that is based on, includes or is separable into multiple discrete component images originating from a substantially similar physical location in different directions and that depicts a larger field of view than any of the discrete component images depict individually, including images with a sufficiently wide-angle view from a physical location to include angles beyond that perceivable from a person's gaze in a single direction (e.g., greater than 120° or 150° or 180°, etc.). The term "sequence" of acquisition locations, as used herein, refers generally to two or more acquisition locations that are each visited at least once in a corresponding order, whether or not other non-acquisition locations are visited between them, and whether or not the visits to the acquisition locations occur during a single continuous period of time or at multiple different times, or by a single user and/or device or by multiple different users and/or devices. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

FIG. 1 is an example block diagram of various computing devices and systems that may participate in the described techniques in some embodiments. In particular, panorama images 165 are illustrated in FIG. 1 that have been generated by an Interior Capture and Analysis ("ICA") system 160 executing in this example on one or more server computing systems 180, such as with respect to one or more buildings or other structures, and for which inter-image directional links have been generated for at least some pairs of images—FIG. 1 further shows one example of such linked panorama image acquisition locations 210 for a particular house 198, as discussed further below, and additional details related to the automated operation of the ICA system are included elsewhere herein, including with respect to FIG. 4. In at least some embodiments, at least some of the ICA system may execute in part on a mobile image acquisition device 185 (whether in addition to or instead of ICA system 160 on the one or more server computing systems 180), as discussed further below. An MIGM (Mapping Information Generation Manager) system 160 is further executing on one or more server computing systems 180 in FIG. 1 to generate and provide building floor plans 155 and/or other mapping-related information based on use of the panorama images 165 and optionally associated metadata about their acquisition and linking—FIGS. 2M through 2O (referred to herein as '2-O' for clarity) show examples of such floor plans, as discussed further below, and additional details related to the automated operation of the MIGM system are included elsewhere herein, including with respect to FIGS. 5A-5B.

FIG. 1 further illustrates an ILDM (Image Location Determination Manager) system 140 that is executing on one or more server computing systems 180 to determine acquisition locations of other target images 145 (e.g., panorama images) acquired in one or more building rooms, such as with respect to corresponding building floor plans 155. In at least some embodiments and situations, one or more users of ILDM client computing devices 105 may further interact over the network(s) 170 with the ILDM system 140, such as to assist with some of the automated operations of the ILDM system for determining the acquisition location of an image based at least in part on an analysis of the image's contents, and/or for subsequently using the determined image acquisition location information in one or more further automated manners. Additional details related to the automated operation of the ILDM system are included elsewhere herein, including with respect to FIGS. 2P-2Z and FIGS. 6A-6B. In some embodiments, the ICA system and/or MIGM system and/or ILDM system 140 may execute on the same server computing system(s), such as if multiple or all of those systems are operated by a single entity or are otherwise executed in coordination with each other (e.g., with some or all functionality of those systems integrated together into a larger system), while in other embodiments the ILDM system may instead obtain floor plan information and/or other images (e.g., target images, other additional images, etc.) from one or more external sources and optionally store them locally (not shown) with the ILDM system for further analysis and use.

One or more users (not shown) of one or more client computing devices 175 may further interact over one or more computer networks 170 with the ILDM system 140 and optionally the ICA system and/or MIGM system, such as to assist in determining acquisition locations of one or more target images and obtaining corresponding determined acquisition location information, and/or to obtain and optionally interact with a generated floor plan on which one or more additional images have been located, and/or to obtain and optionally interact with additional information such as one or more associated existing images (e.g., to change between a floor plan view and a view of a particular image at an acquisition location within or near the floor plan; to change the horizontal and/or vertical viewing direction from which a corresponding view of a panorama image is displayed, such as to determine a portion of a panorama image to which a current user viewing direction is directed, etc.). In addition, while not illustrated in FIG. 1, a floor plan (or portion of it) may be linked to or otherwise associated with one or more other types of information, including for a floor plan of a multi-story or otherwise multi-level building to have multiple associated sub-floor plans for different stories or levels that are interlinked (e.g., via connecting stairway passages), for a two-dimensional ("2D") floor plan of a building to be linked to or otherwise associated with a three-dimensional ("3D") rendering floor plan of the building, etc. In addition, while not illustrated in FIG. 1, in some embodiments the client computing devices 175 (or other devices, not shown), may receive and use determined image acquisition location information (optionally in combination with generated floor plans and/or other generated mapping-related information) in additional manners, such as to control or assist automated navigation activities by those devices (e.g., by autonomous vehicles or other devices), whether instead of or in addition to display of the generated information.

In the depicted computing environment of FIG. 1, the network 170 may be one or more publicly accessible linked networks, possibly operated by various distinct parties, such as the Internet. In other implementations, the network 170 may have other forms. For example, the network 170 may instead be a private network, such as a corporate or university network that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks in various situations. In addition, the client computing devices 175 and server computing systems 180 may include various hardware components and stored information, as discussed in greater detail below with respect to FIG. 3.

In the example of FIG. 1, ICA system 160 may perform automated operations involved in generating multiple panorama images (e.g., each a 360 degree panorama around a vertical axis) at multiple associated acquisition locations (e.g., in multiple rooms or other locations within a building or other structure and optionally around some or all of the exterior of the building or other structure), such as for use in generating and providing a representation of an interior of the building or other structure. The techniques may further include analyzing information to determine relative positions/directions between each of two or more acquisition locations, creating inter-panorama positional/directional links in the panoramas to each of one or more other panoramas based on such determined positions/directions, and then providing information to display or otherwise present multiple linked panorama images for the various acquisition locations within the building. Additional details related to embodiments of a system providing at least some such functionality of an ICA system are included in U.S. Non-Provisional patent application Ser. No. 17/064,601, filed Oct. 7, 2020 and entitled "Connecting And Using Building Data Acquired From Mobile Devices" (which includes disclosure of an example BICA system that is generally directed to obtaining and using panorama images from within one or more buildings or other structures); in U.S. Non-Provisional patent application Ser. No. 17/082,044, filed Oct. 28, 2020 and entitled "Automated Control Of Image Acquisition Via Acquisition Location Determination" (which includes disclosure of an example ICA system that is generally directed to obtaining and using panorama images from within one or more buildings or other structures); in U.S. Non-Provisional patent application Ser. No. 17/019,247, filed Sep. 12, 2020 and entitled "Automated Mapping Information Generation From Inter-Connected Images"; in U.S. Non-Provisional patent application Ser. No. 17/080,604, filed Oct. 26, 2020 and entitled "Generating Floor Maps For Buildings From Automated Analysis Of Visual Data Of The Buildings' Interiors"; and in U.S. Provisional Patent Application No. 63/035,619, filed Jun. 5, 2020 and entitled "Automated Generation On Mobile Devices Of Panorama Images For Buildings Locations And Subsequent Use"; each of which is incorporated herein by reference in its entirety.

FIG. 1 further depicts a block diagram of an exemplary building interior environment in which linked panorama images have been generated and are ready for use to generate and provide a corresponding building floor plan, as well as for use in presenting the linked panorama images to users. In particular, FIG. 1 includes a building 198 (in this example, a house 198) with an interior that was captured at least in part via multiple panorama images, such as by a user (not shown) carrying a mobile device 185 with image acquisition capabilities through the building interior to a sequence of multiple acquisition locations 210 along a path 115. An embodiment of the ICA system (e.g., ICA system 160 on server computing system(s) 180; a copy of some or all of the ICA system executing on the user's mobile device, such as ICA application system 155 executing in memory 152 on device 185; etc.) may automatically perform or assist in the capturing of the data representing the building interior, as well as to in some embodiments further analyze the captured data to generate linked panorama images providing a visual representation of the building interior. While the mobile device of the user may include various hardware components, such as one or more cameras or other imaging systems 135, one or more sensors 148 (e.g., a gyroscope 148a, an accelerometer 148b, a magnetometer or other compass 148c, etc., such as part of one or more IMUs, or inertial measurement units, of the mobile device; an altimeter; light detector; etc.), a GPS receiver, one or more hardware processors 132, memory 152, a display 142, a microphone, one or more external lights, etc., the mobile device does not in at least some embodiments have access to or use equipment to measure the depth of objects in the building relative to a location of the mobile device, such that relationships between different panorama images and their acquisition locations may be determined in part or in whole based on matching elements in different images and/or by using information from other of the listed hardware components, but without using any data from any such depth sensors. In addition, while directional indicator 109 is provided for reference of the viewer, the mobile device and/or ICA system may not use such absolute directional information in at least some embodiments, such as to instead determine relative directions and distances between panorama images 210 without regard to actual geographical positions or directions.

In operation, a user associated with the mobile device arrives at a first acquisition location 210A within a first room of the building interior (in this example, an entryway from an external door 190-1 to the living room), and captures a view of a portion of the building interior that is visible from that acquisition location 210A (e.g., some or all of the first room, and optionally small portions of one or more other adjacent or nearby rooms, such as through doorways, halls, stairways or other connecting passages from the first room) as the mobile device is rotated around a vertical axis at the first acquisition location (e.g., with the user turning his or her body in a circle while holding the mobile device stationary relative to the user's body). The actions of the user and/or the mobile device may be controlled or facilitated via use of one or more programs executing on the mobile device, such as ICA application system 155 and/or optional browser 162, control system 147 to manage I/O (input/output) and/or communications and/or networking for the device 185 (e.g., to receive instructions from and present information to the user), etc., and the view capture may be performed by recording a video at location 210A and/or taking a succession of one or more images at location 210A, including to capture visual information depicting a number of objects or other elements (e.g., structural details) that may be visible in images (e.g., video frames) captured from the acquisition location. In the example of FIG. 1, such objects or other elements include various elements that are structurally part of the walls (or "wall elements") of rooms of the house, such as the doorways 190 and 197 and their doors (e.g., with swinging and/or sliding doors), windows 196, inter-wall borders (e.g., corners or edges) 195 (including corner 195-1 in the northwest corner of the house 198, corner 195-2 in the northeast corner of the first room, and corner 195-3 in the southwest corner of the first room) —in addition, such objects or other elements in the example of FIG. 1 may further include other elements within the rooms, such as furniture 191-193 (e.g., a couch 191; chair 192; table 193; etc.), pictures or paintings or televisions or other objects 194 (such as 194-1 and 194-2) hung on walls, light fixtures, etc. The user may also optionally provide a textual or auditory identifier to be associated with an acquisition location, such as "entry" for acquisition location 210A or "living room" for acquisition location 210B, while in other embodiments the ICA system may automatically generate such identifiers (e.g., by automatically analyzing video and/or other recorded information for a building to perform a corresponding automated determination, such as by using machine learning) or the identifiers may not be used.

After the first acquisition location 210A has been adequately captured (e.g., by a full rotation of the mobile device), the user and/or device 185 may proceed to a next acquisition location (such as acquisition location 210B), optionally recording movement data during movement between the acquisition locations, such as video and/or other data from the hardware components (e.g., from one or more IMUs, from the camera, etc.). At the next acquisition location, the mobile device may similarly capture one or more images from that acquisition location. This process may repeat from some or all rooms of the building and optionally external to the building, as illustrated for acquisition locations 210C-210M. The acquired video and/or other images for each acquisition location are further analyzed to generate a panorama image for each of acquisition locations 210A-210M, including in some embodiments to stitch together multiple constituent images to create a panorama image and/or to match objects and other elements in different images. In addition to generating such panorama images, further analysis may be performed in at least some embodiments in order to 'link' at least some of the panoramas and their acquisition locations together (with some corresponding lines 215 between example acquisition locations 210A-210C being shown for the sake of illustration), such as to determine relative positional information between pairs of acquisition locations that are visible to each other, to store corresponding inter-panorama links (e.g., links 215-AB, 215-BC and 215-AC between acquisition locations 210A and 210B, 210B and 210C, and 210A and 210C, respectively), and in some embodiments and situations to further link at least some acquisition locations that are not visible to each other (e.g., a link 215-BE, not shown, between acquisition locations 210B and 210E).

Additional details related to embodiments of generating and using linking information between panorama images, including using travel path information and/or elements or other features visible in multiple images, are included in U.S. Non-Provisional patent application Ser. No. 17/064,601, filed Oct. 7, 2020 and entitled "Connecting And Using Building Data Acquired From Mobile Devices" (which includes disclosure of an example BICA system that is generally directed to obtaining and using linking information to inter-connect multiple panorama images captured within one or more buildings or other structures); in U.S. Non-Provisional patent application Ser. No. 17/080,604, filed Oct. 26, 2020 and entitled "Generating Floor Maps For Buildings From Automated Analysis Of Visual Data Of The Buildings' Interiors"; and in U.S. Provisional Patent Application No. 63/035,619, filed Jun. 5, 2020 and entitled "Automated Generation On Mobile Devices Of Panorama Images For Buildings Locations And Subsequent Use"; each of which is incorporated herein by reference in its entirety.

Various details are provided with respect to FIG. 1, but it will be appreciated that the provided details are non-exclusive examples included for illustrative purposes, and other embodiments may be performed in other manners without some or all such details.

Figure 2A:
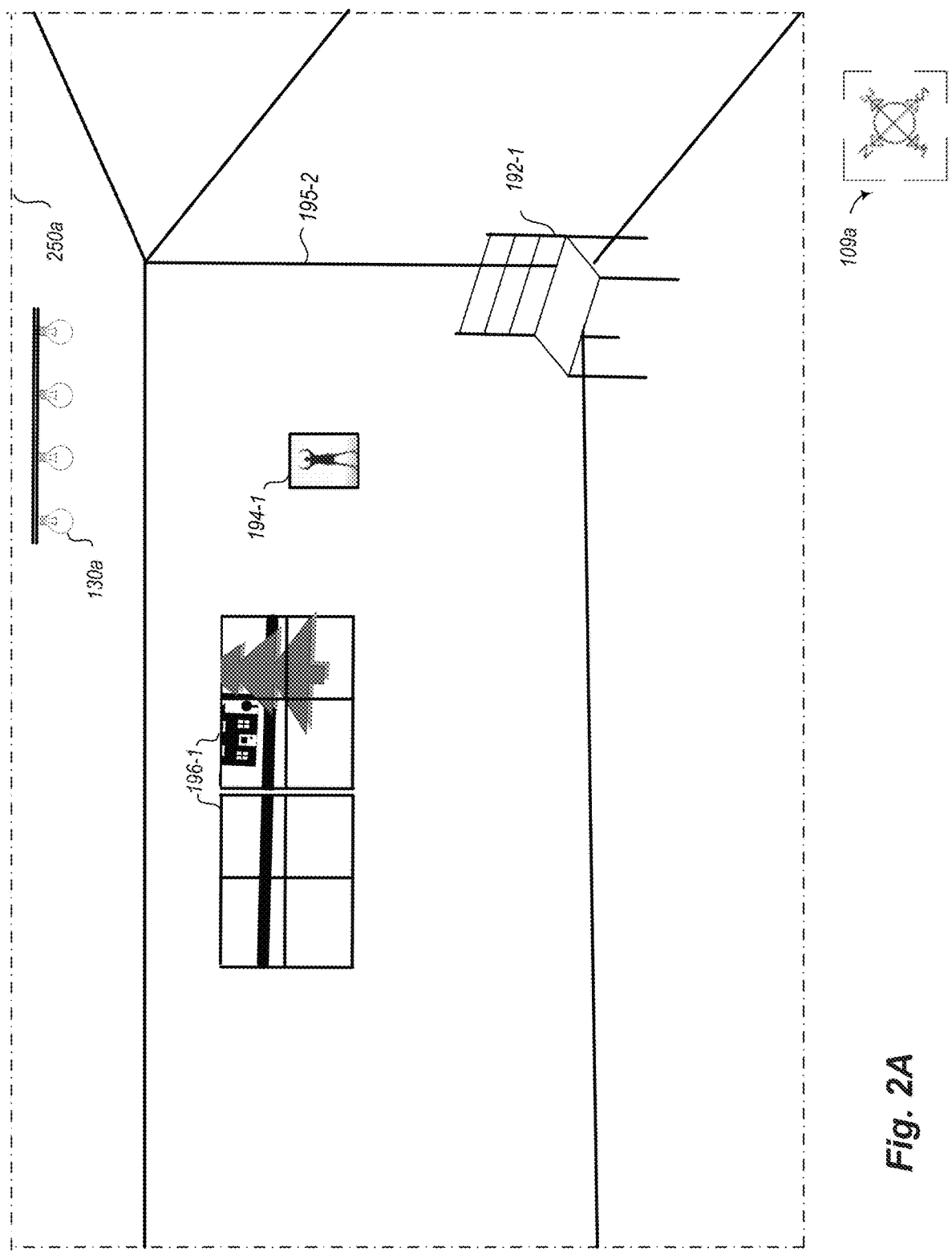
FIGS. 2A-2Z illustrate examples of automated operations for generating and presenting information on a floor plan for a building based on images taken in the building interior, such as to automatically determine and present an acquisition location of such an image from analysis of image contents.
Figure 2D:
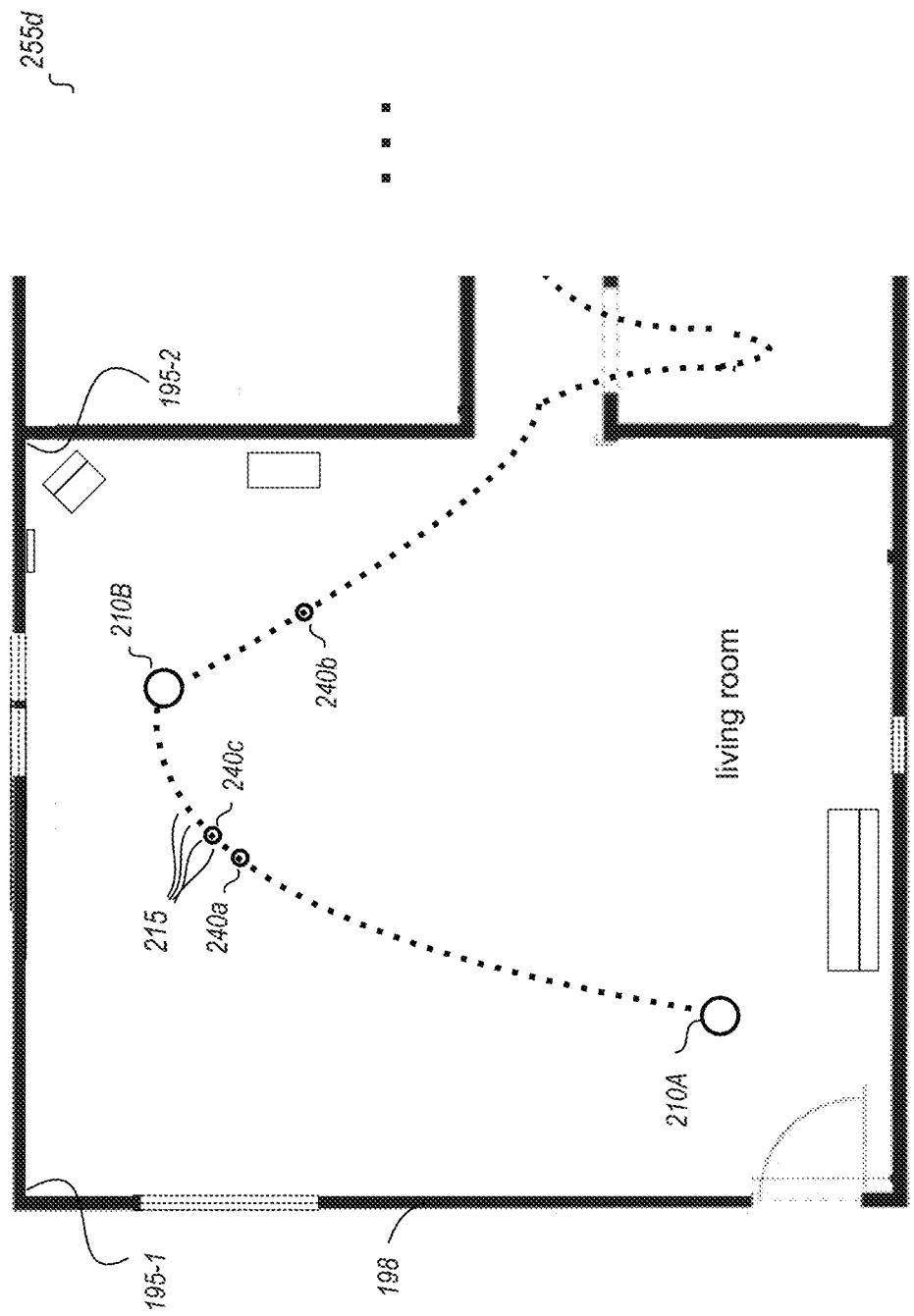
Figure 2K:
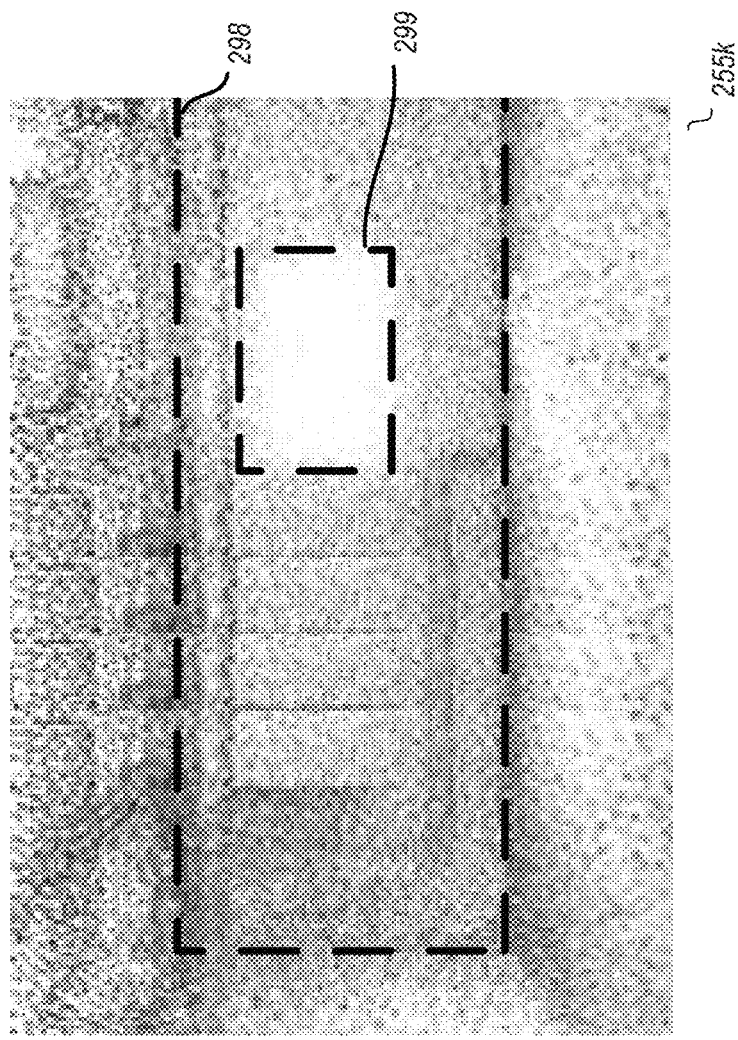
Figure 2L:
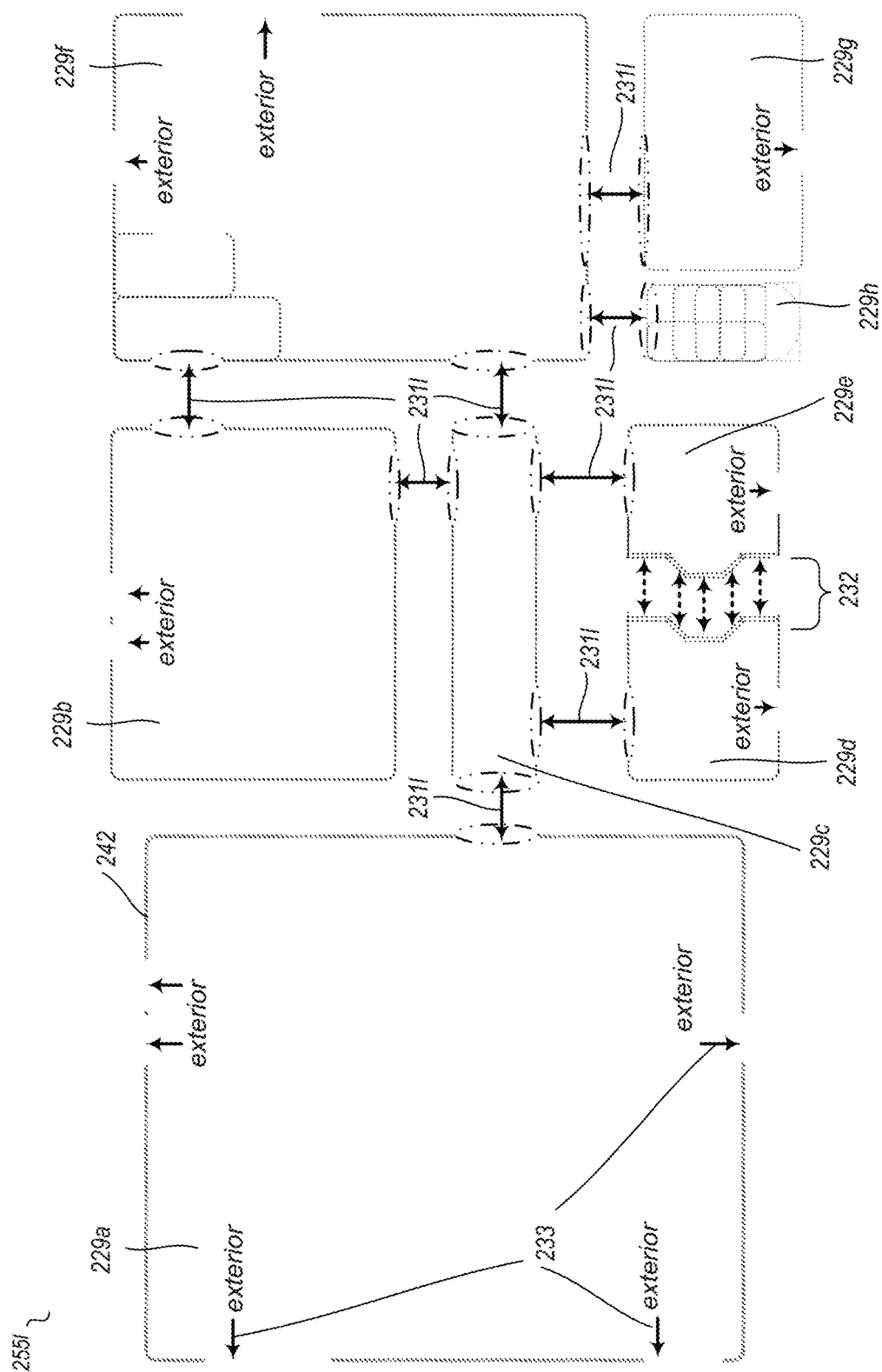
Figure 2M:
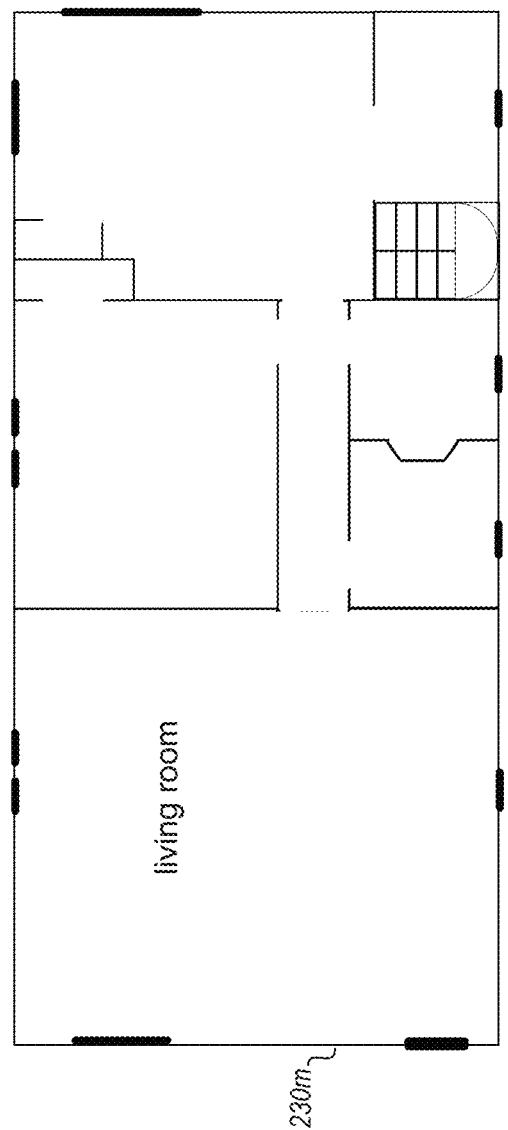
Figure 2N:
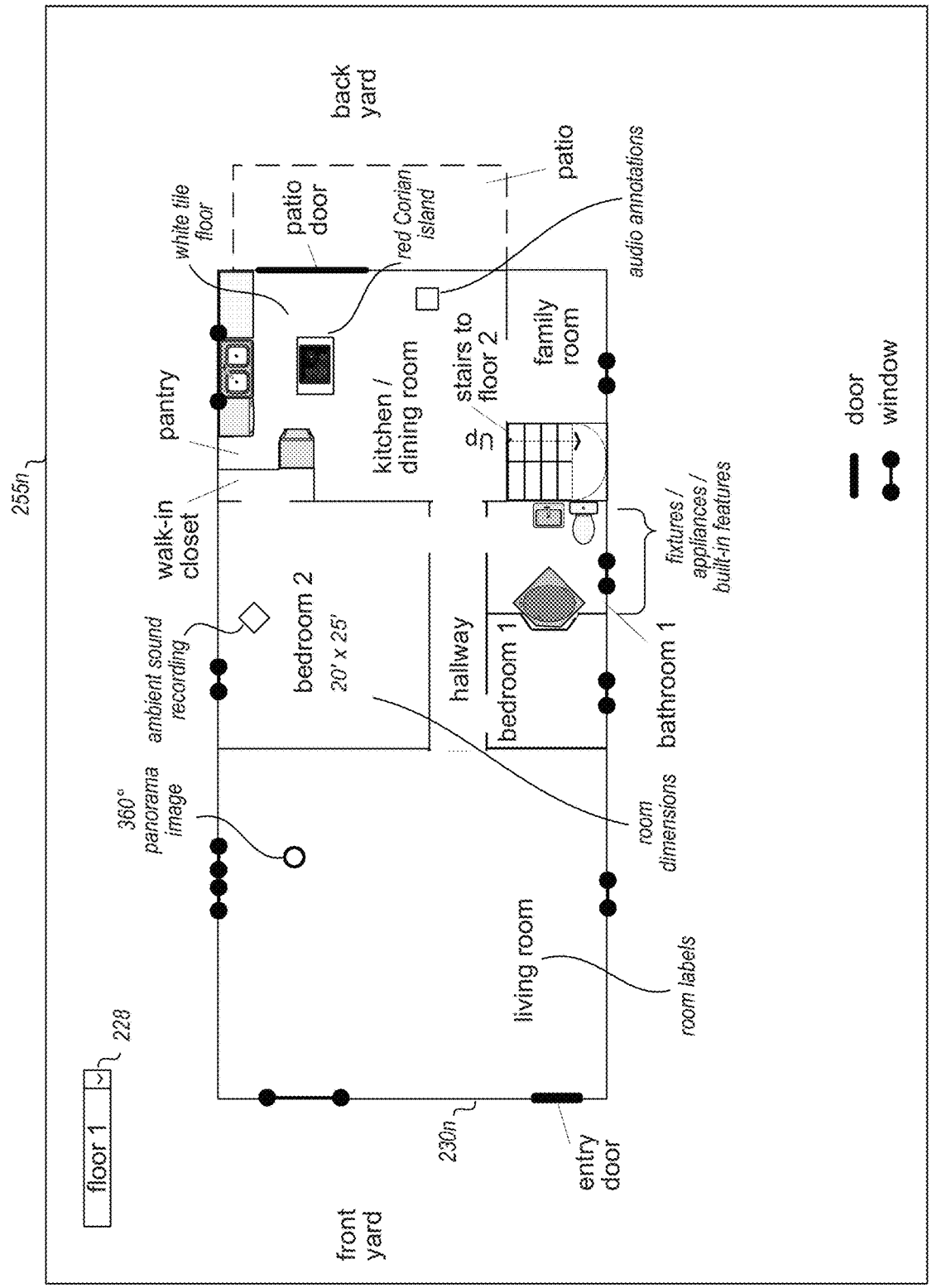
Figure 2Q:
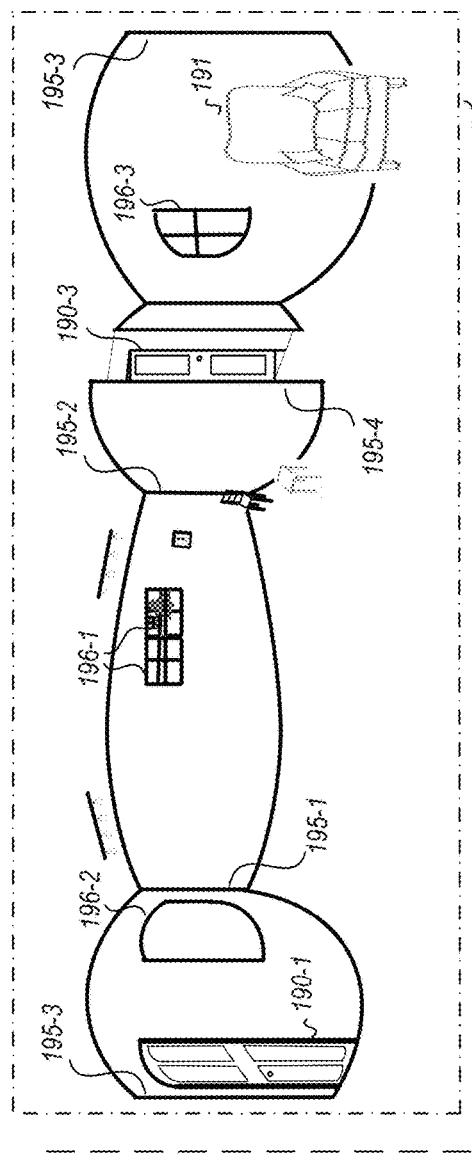
Figure 2P:
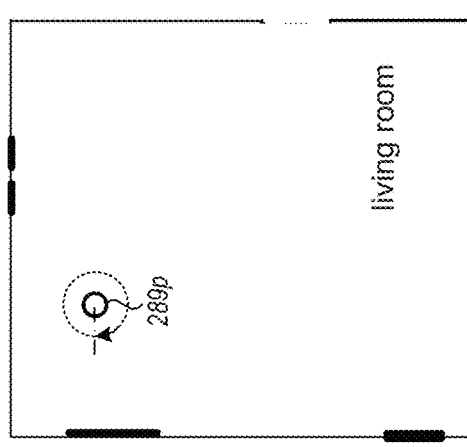
Figure 2R:
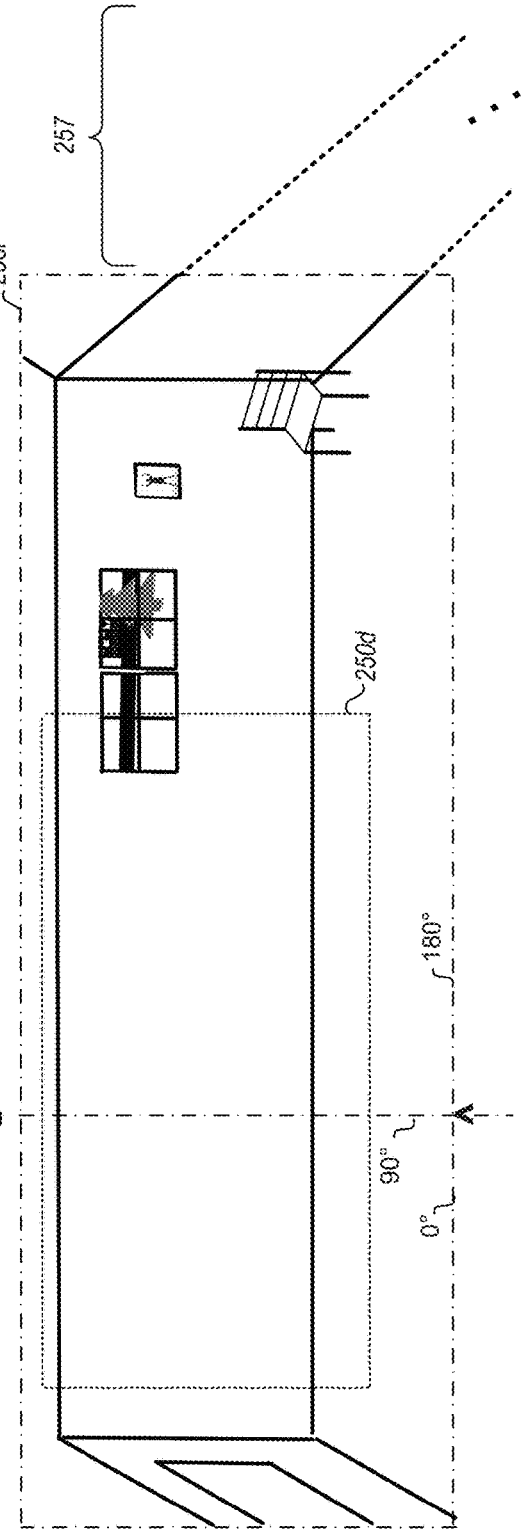
Figure 2S:
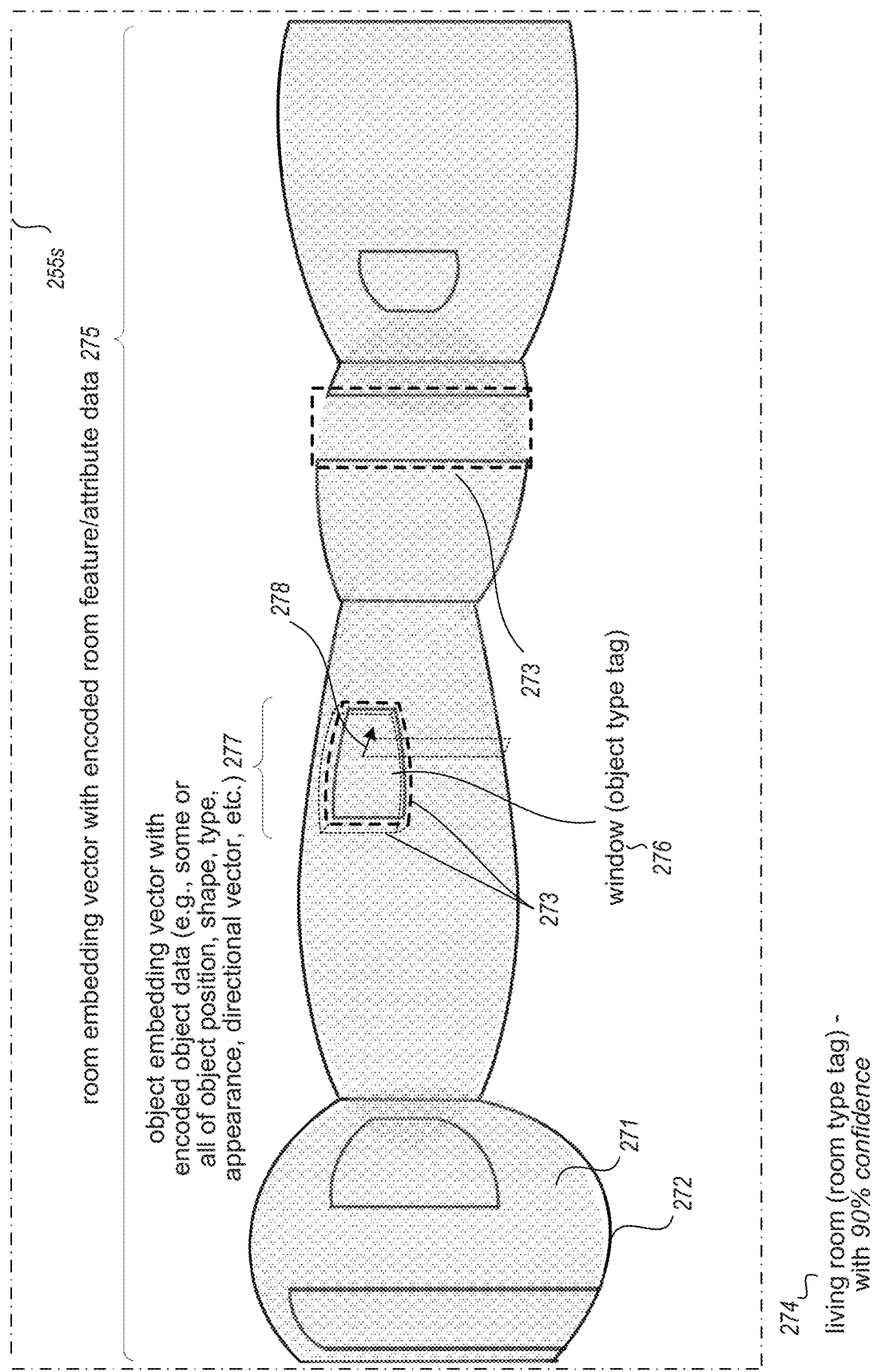
Figure 2T:
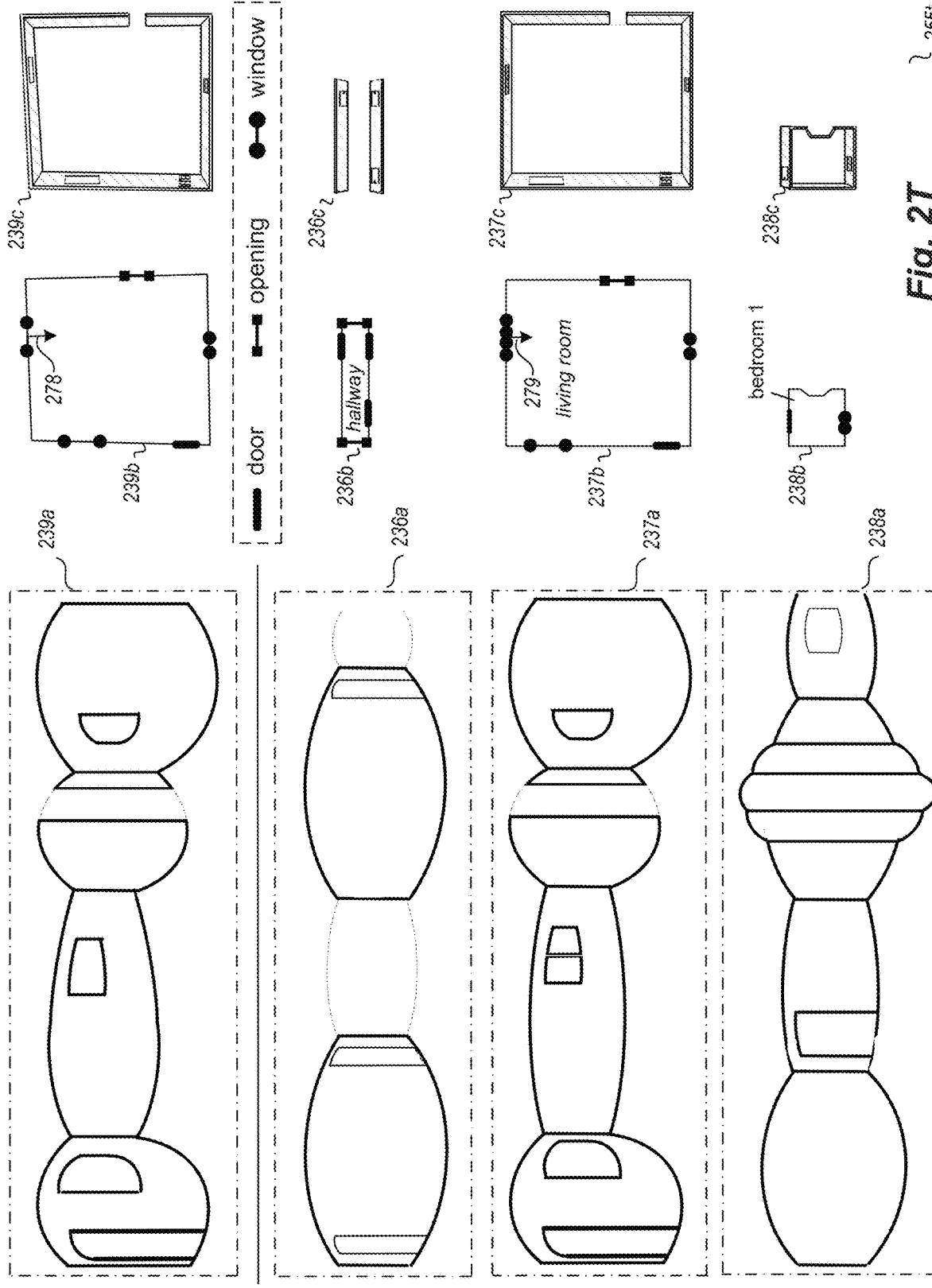
Figure 2V:
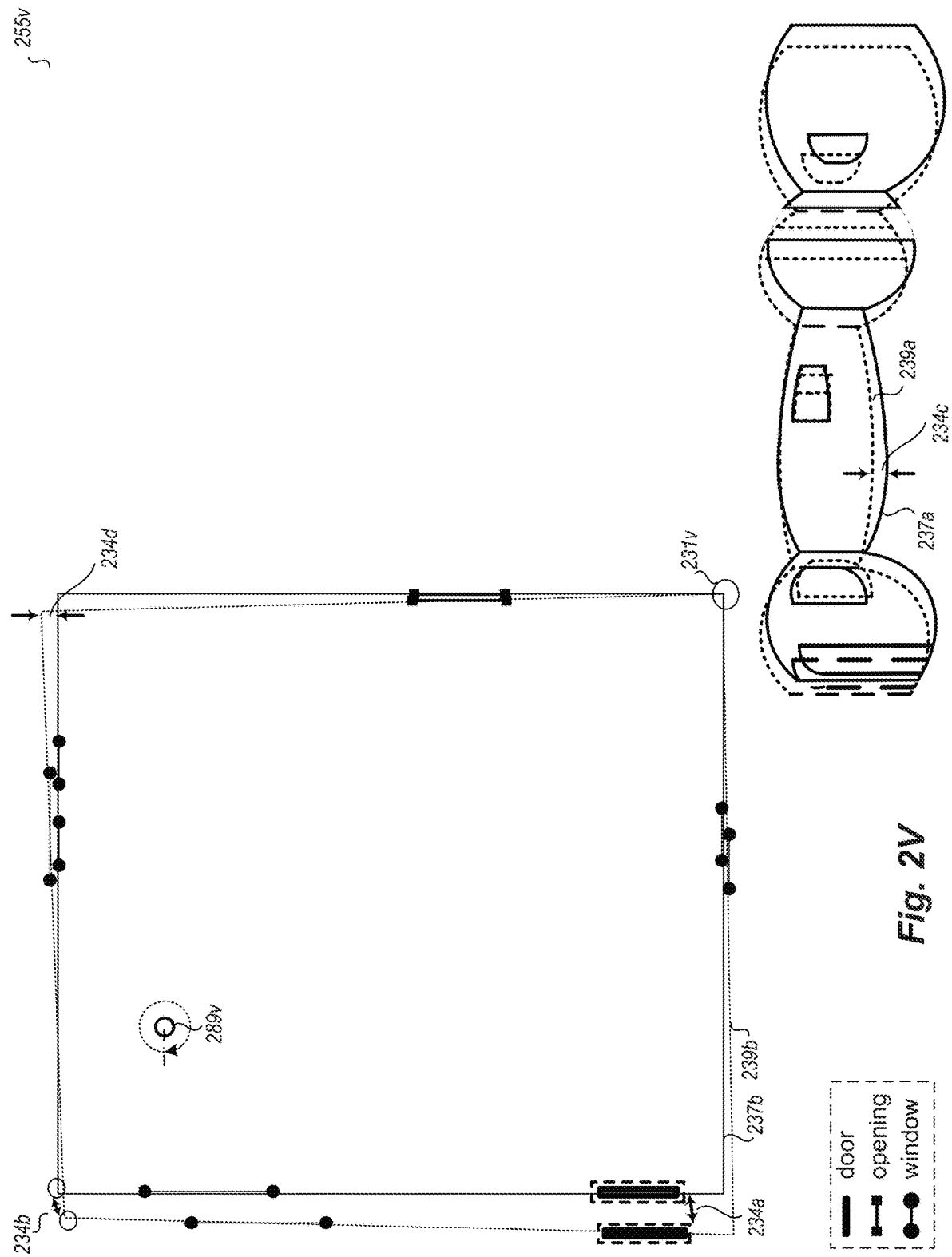
Figure 2W:
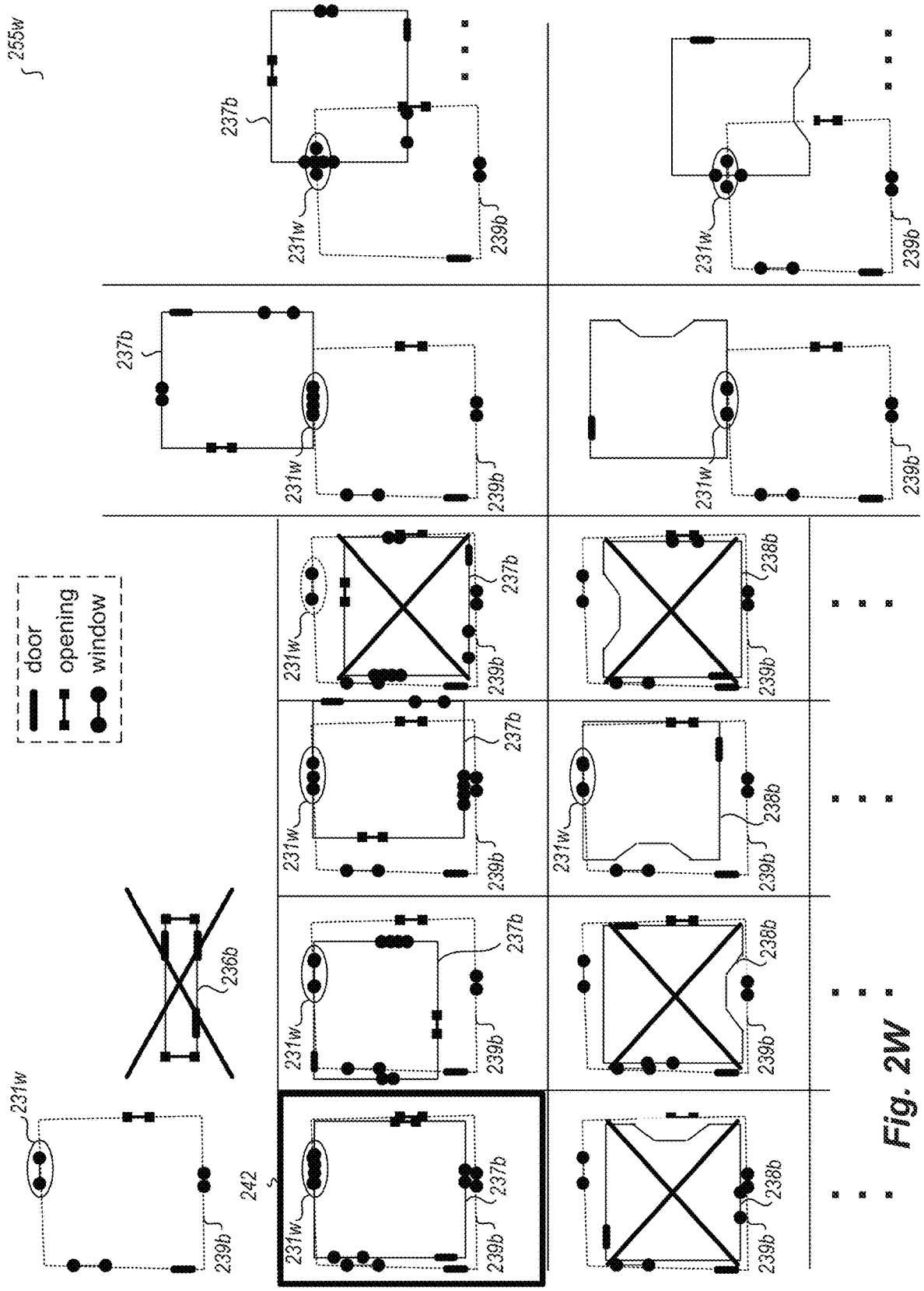
Figure 2X:
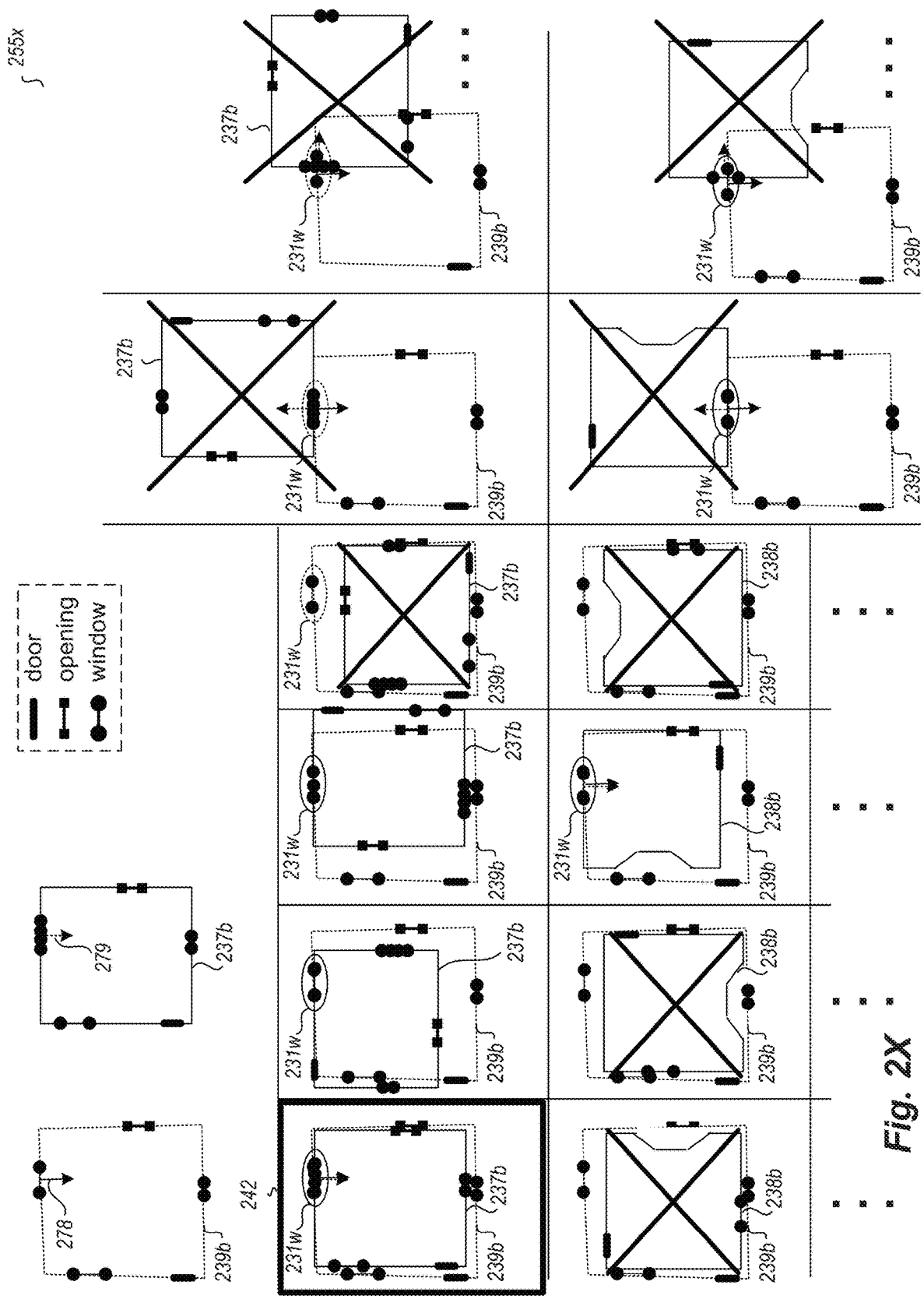
Figure 2Y:
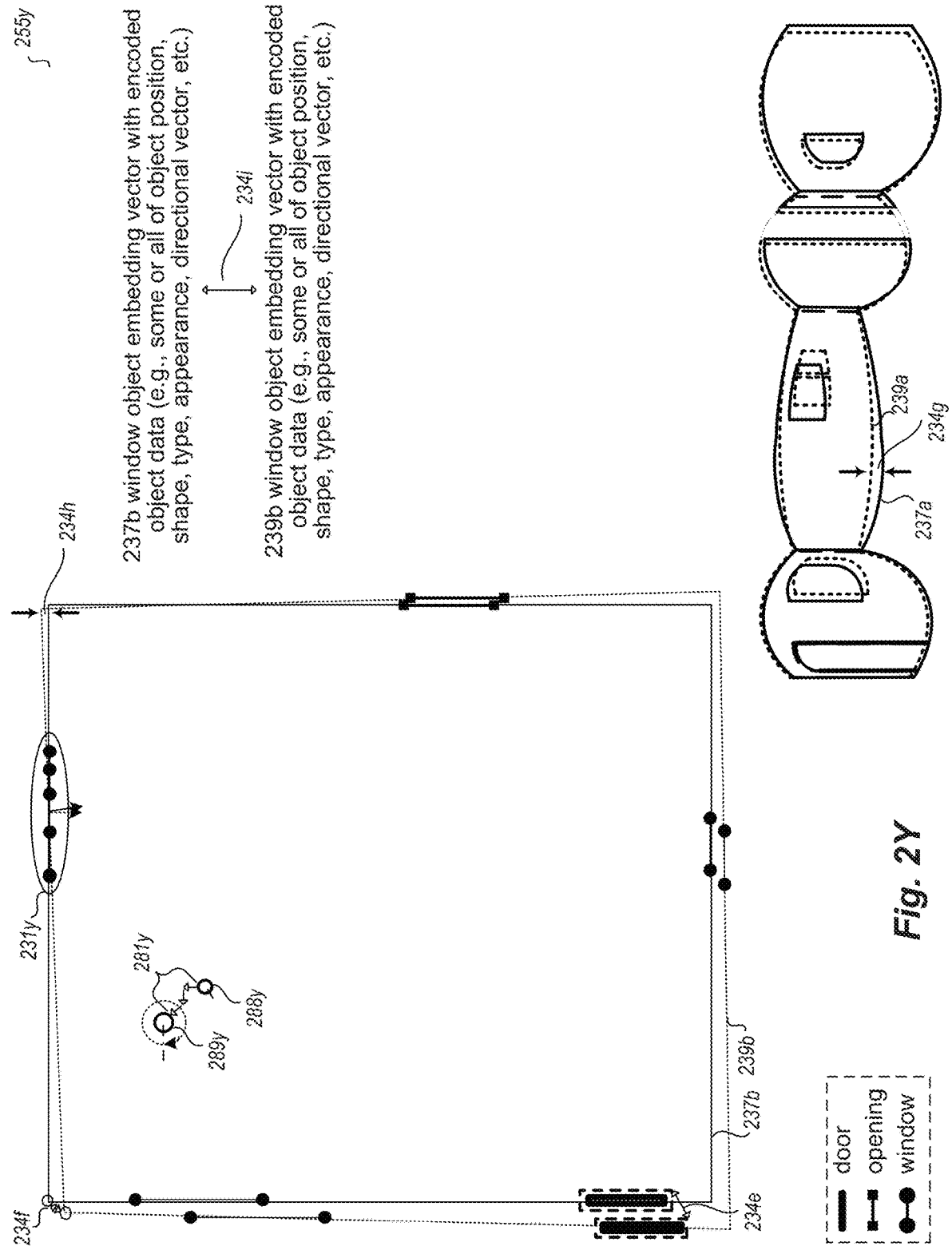
Figure 2Z:
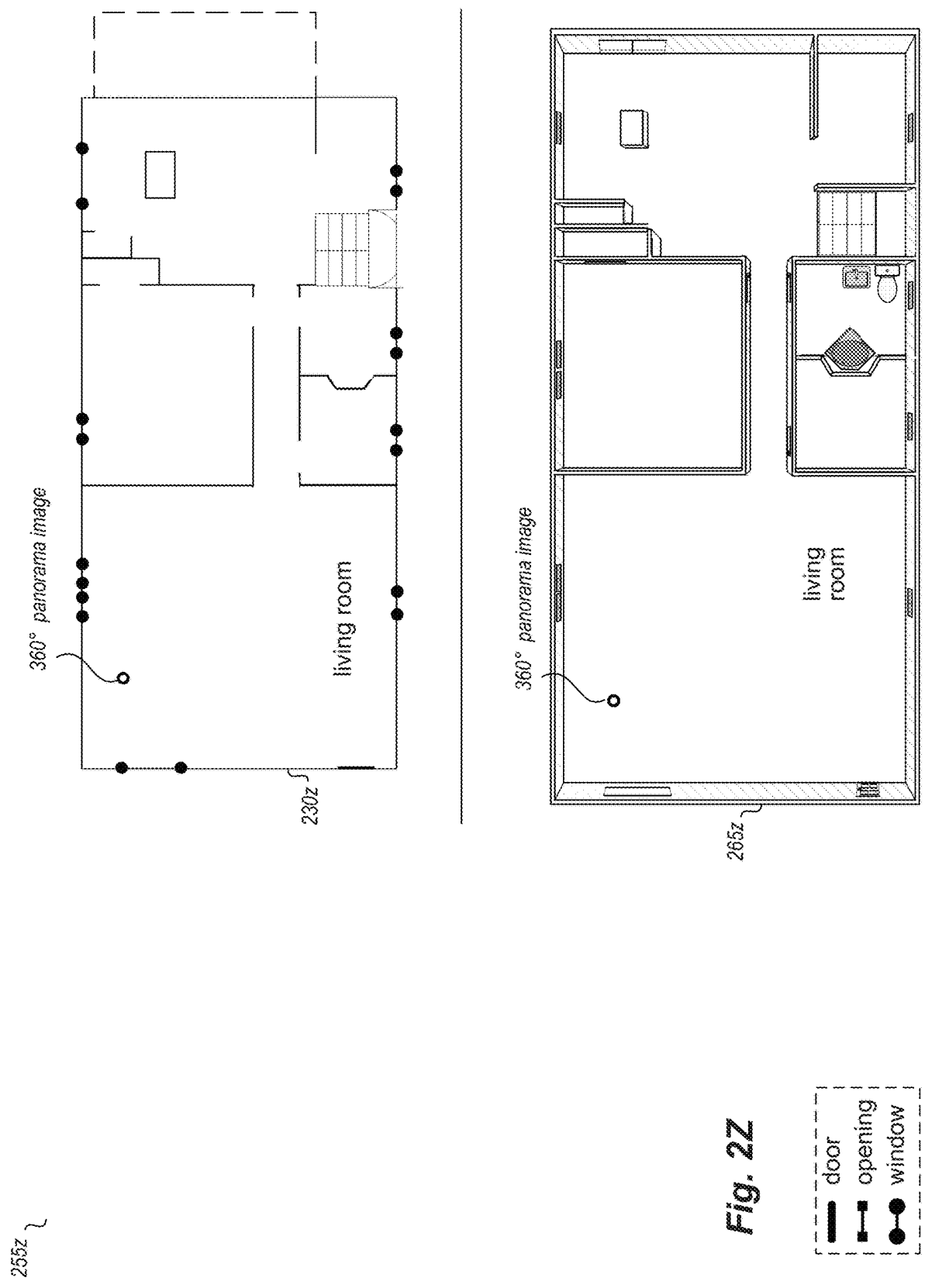

FIGS. 2A-2Z illustrate examples of automatically generating and presenting information on a floor plan for a building based on images taken in the building interior, such as based on automatically determined acquisition locations of one or more target images captured in the building 198 discussed in FIG. 1.

In particular, FIG. 2A illustrates an example image 250a, such as a non-panorama perspective image taken in a northeasterly direction from acquisition location 210B in the living room of house 198 of FIG. 1 (or a northeasterly facing subset view of a 360-degree panorama image taken from that acquisition location and formatted in a rectilinear manner) —the directional indicator 109a is further displayed in this example to illustrate the northeasterly direction in which the image is taken. In the illustrated example, the displayed image includes built-in elements (e.g., light fixture 130a), furniture (e.g., chair 192-1), and a picture 194-1 hanging on the north wall of the living room, as well as two window wall objects 196-1. No inter-room passages into or out of the living room (e.g., doorways or other wall opening wall objects) are visible in this image. However, multiple room borders are visible in the image 250a, including horizontal borders between a visible portion of the north wall of the living room and the living room's ceiling and floor, horizontal borders between a visible portion of the east wall of the living room and the living room's ceiling and floor, and the inter-wall vertical border 195-2 between the north and east walls.

FIG. 2B continues the example of FIG. 2A, and illustrates an additional perspective image 250b taken in a northwesterly direction from acquisition location 210B in the living room of house 198 of FIG. 1—the directional indicator 109b is further displayed to illustrate the northwesterly direction in which the image is taken. In this example image, a small portion of one of the windows 196-1 continues to be visible, along with a portion of window 196-2 and a new lighting fixture 130b. In addition, horizontal and vertical room borders are visible in image 250b in a manner similar to that of FIG. 2A.

FIG. 2C continues the examples of FIGS. 2A-2B, and illustrates a third perspective image 250c taken in a southwesterly direction in the living room of house 198 of FIG. 1, such as from acquisition location 210B—the directional indicator 109c is further displayed to illustrate the southwesterly direction in which the image is taken. In this example image, a portion of window 196-2 continues to be visible, as is a couch 191 and visual horizontal and vertical room borders in a manner similar to that of FIGS. 2A and 2B. This example image further illustrates an inter-room passage for the living room, which in this example is a doorway 190-1 to enter and leave the living room (which FIG. 1 identifies as a door to the exterior of the house). It will be appreciated that a variety of other perspective images may be taken from acquisition location 210B and/or other acquisition locations and displayed in a similar manner.

FIG. 2D continues the examples of FIGS. 2A-2C, and illustrates further information 255d for a portion of the house 198 of FIG. 1, including the living room and portions of the further rooms to the east of the living room. As discussed with respect to FIGS. 1 and 2A-2C, in some embodiments, panorama images may be captured at various locations in the house interior, such as locations 210A and 210E in the living room, with corresponding visual data of such images subsequently used to determine a room shape of the living room. In addition, in at least some embodiments, additional images may be captured, such as if device 185 (not shown) is capturing video or other sequence of continuous or near-continuous images as it moves through the interior of the house. In this example, information is illustrated for a portion of the path 115 illustrated in FIG. 1, and in particular illustrates a sequence of locations 215 along the path at which one or more video frame images (or other sequence of continuous or near-continuous images) may be captured (e.g., if video data is being captured) of the surrounding interior of the house while the device 185 is moved—examples of such locations include capture locations 240a-c, with further information related to video frame images captured from those locations shown in FIGS. 2E-2J. In this example, the locations 215 along the path are shown as being separated by short distances (e.g., a foot, an inch, a fraction of an inch, etc.), although it will be appreciated that video capture may be substantially continuous—thus, in at least some embodiments, only a subset of such captured video frame images (or other images from a sequence of continuous or near-continuous images) may be selected and used for further analysis, such as images that are separated by such distances and/or that are separated by a short period of time between their capture (e.g., a second, a fraction of a second, multiple seconds, etc.), and/or based on other criteria.

FIGS. 2E-2J continue the examples of FIGS. 2A-2D, and illustrate additional information about the living room and about analyzing 360° image frames from the video captured along the path 155 in order to determine the likely shape of the room. While not illustrated in these figures, similar techniques could be performed for panorama images captured at two or more of acquisition locations 210A, 210B and 210C, whether instead of or in addition to analysis of the additional image frames illustrated in FIG. 2D. In particular, FIG. 2E includes information 255e illustrating that a 360° image frame taken from location 240b will share information about a variety of features with that of a 360° image frame taken from location 240a, although such features are only illustrated in FIG. 2E for a portion of the living room for the sake of simplicity. In FIG. 2E, example lines of sight 228 from location 240b to various example features in the room are shown, and similar example lines of sight 227 from location 240a to corresponding features are shown, which illustrate degrees of difference between the views at significantly spaced capture locations. Accordingly, analysis of the sequence of images corresponding to locations 215 of FIG. 2A using SLAM and/or MVS and/or SfM techniques may provide a variety of information about the features of the living room, including information about associated planes of the features and normal orthogonal directions from the planes, as illustrated further with respect to FIGS. 2F-2I.

In particular, FIG. 2F illustrates information 255f about the northeast portion of the living room that is visible in subsets of 360° image frames taken from locations 240a and 240b, and FIG. 2G illustrates information 255g about the northwest portion of the living room that is visible in other subsets of 360° image frames taken from locations 240a and 240b, with various features in those portions of the living room being visible in both 360° image frames (e.g., corners 195-1 and 195-2, windows 196-1 and 196-2, etc. As part of the automated analysis of the 360° image frames using the SLAM and/or MVS and/or SfM techniques, information about planes 286e and 286f corresponding to portions of the northern wall of the living room may be determined from the features that are detected, and information 287e and 285f about portions of the east and west walls of the living room may be similarly determined from corresponding features identified in the images. In addition to identifying such plane information for detected features (e.g., for each point in a determined sparse 3D point cloud from the image analysis), the SLAM and/or MVS and/or SfM techniques may further determine information about likely locations and orientations/directions 220 for the image(s) from capture location 240a, and likely locations and orientations/directions 222 for the image(s) from capture location 240b (e.g., locations 220g and 222g in FIG. 2F of the capture locations 240a and 240b, respectively, and optionally directions 220e and 222e for the image subsets shown in FIG. 2F; and corresponding locations 220g and 222g in FIG. 2G of the capture locations 240a and 240b, respectively, and optionally directions 220f and 222f for the image subsets shown in FIG. 2G). While only features for part of the living room are illustrated in FIGS. 2F and 2G, it will be appreciated that the other portions of the 360° image frames corresponding to other portions of the living room may be analyzed in a similar manner, in order to determine possible information about possible planes for the various walls of the room, as well as for other features (not shown) in the living room. In addition, similar analyses may be performed between some or all other images at locations 215 in the living room that are selected for use, resulting in a variety of determined feature planes from the various image analyses that may correspond to walls of the room.

FIG. 2H continues the examples of FIGS. 2A-2G, and illustrates information 255h about a variety of determined feature planes that may correspond to the west and north walls of the living room, from analyses of the 360° image frames captured at locations 240a and 240b. The illustrated plane information includes determined planes 286g near or at the northern wall (and thus corresponding possible locations of the northern wall), and determined planes 285g near or at the western wall (and thus corresponding possible locations of the western wall). As would be expected, there are a number of variations in different determined planes for the northern and western walls from different features detected in the analysis of the two 360° image frames, such as differences in position, angle and/or length, causing uncertainty as to the actual exact position and angle of each of the walls. While not illustrated in FIG. 2H, it will be appreciated that similar determined feature planes for the other walls of the living room would similarly be detected, along with determined feature planes corresponding to features that are not along the walls (e.g., furniture).

FIG. 2I continues the examples of FIGS. 2A-2H, and illustrates information 255i about additional determined feature planes that may correspond to the west and north walls of the living room, from analyses of various additional 360° image frames selected from additional locations 215 along the path 115 in the living room—as would be expected, the analyses of the further images provides even greater variations in different determined planes for the northern and western walls in this example. FIG. 2I further illustrates additional determined information that is used to aggregate information about the various determined feature planes in order to identify likely locations 295a and 295b of the west and north walls, as illustrated in information 255j of FIG. 2J. In particular, FIG. 2I illustrates information 291a about normal orthogonal directions for some of the determined feature planes corresponding to the west wall, along with additional information 290a about those determined feature planes. In the example embodiment, the determined feature planes are clustered to represent hypothesized wall locations of the west wall, and the information about the hypothesized wall locations is combined to determine the likely wall location 295a, such as by weighting information from the various clusters and/or the underlying determined feature planes. In at least some embodiments, the hypothesized wall locations and/or normal information is analyzed via use of machine learning techniques to determine the resulting likely wall location, optionally by further applying assumptions or other constraints (such as a 90° corner, as illustrated in information 282 of FIG. 2H, and/or having flat walls) as part of the machine learning analysis or to results of the analysis. Similar analysis may be performed for the north wall using information 290b about corresponding determined feature planes and additional information 291b about resulting normal orthogonal directions for at least some of those determined feature planes. FIG. 2J illustrates the resulting likely wall locations 295a and 295b for the west and north walls of the living room, respectively.

While not illustrated in FIG. 2I, it will be appreciated that similar determined feature planes and corresponding normal directions for the other walls of the living room will similarly be detected and analyzed to determine their likely locations, resulting in an estimated overall room shape for the living room. In addition, similar analyses are performed for each of the rooms of the building, providing estimated room shapes of each of the rooms.

FIG. 2K continues the examples of FIGS. 2A-2J, and illustrates information 255k about additional information that may be generated from images in a room and used in one or more manners in at least some embodiments. In particular, images (e.g., video frames) captured in the living room of the house 198 may be analyzed in order to determine a 3D shape of the living room, such as from a 3D point cloud of features detected in the video frames (e.g., using SLAM and/or SfM and/or MVS techniques). In this example, information 255k reflects an example portion of such a point cloud for the living room, such as in this example to correspond to a northwesterly portion of the living room (e.g., to include northwest corner 195-1 of the living room, as well as windows 196-1) in a manner similar to image 250c of FIG. 2C. Such a point cloud may be further analyzed to determine planar areas, such as to correspond to walls, the ceiling, floor, etc., as well as in some cases to detect features such as windows, doorways and other inter-room openings, etc. —in this example, a first planar area 298 corresponding to the north wall of the living room is identified, with a second planar area 299 corresponding to windows 196-1 being further identified. It will be appreciated that various other walls and other features may be similarity identified in the living room and in the other rooms of the house 198.

FIG. 2L continues the examples of FIGS. 2A-2K, and illustrates additional information 255l corresponding to, after estimated room shapes are determined for the rooms of the illustrated floor of the house 198, positioning the rooms' estimated room shapes relative to each other, based at least in part on connecting inter-room passages between rooms and matching room shape information between adjoining rooms—in at least some embodiments, such information may be treated as constraints on the positioning of the rooms, and an optimal or otherwise preferred solution is determined for those constraints. Examples of such constraints in FIG. 2L include matching 231l connecting passage information (e.g., passages detected in the automated image analyses discussed with respect to FIGS. 2E-2J) for adjacent rooms so that the locations of those passages are co-located, and matching 232 shapes of adjacent rooms in order to connect those shapes (e.g., as shown for rooms 229d and 229e). Various other types of information may be used in other embodiments for room shape positions, whether in addition to or instead of passage-based constraints and/or room shape-based constraints, such as exact or approximate dimensions for an overall size of the house (e.g., based on additional metadata available regarding the building, analysis of images from one or more capture locations external to the building, etc.). House exterior information 233 may further be identified and used as constraints (e.g., based at least in part of automated identification of passages and other features corresponding to the building exterior, such as windows), such as to prevent another room from being placed at a location that has been identified as the building's exterior.

FIGS. 2M through 2-O continue the examples of FIG. 2A-2L, and illustrate mapping information that may be generated from the types of analyses discussed in FIGS. 2A-2L. In particular, FIG. 2M illustrates an example floor plan 230m that may be constructed based on the positioning of the estimated room shapes, which in this example includes walls and indications of doorways and windows. In some embodiments, such a floor plan may have further information shown, such as about other features that are automatically detected by the image analysis and/or that are subsequently added by one or more users. For example, FIG. 2N illustrates a modified floor plan 230n that includes additional information of various types, such as may be automatically identified from image analysis and added to the floor plan 230m, including one or more of the following types of information: room labels (e.g., "living room" for the living room), room dimensions, visual indications of fixtures or appliances or other built-in features, visual indications of positions of additional types of associated and linked information (e.g., of existing panorama images and/or perspective images acquired at specified positions, which an end user may select for further display; of audio annotations and/or sound recordings that an end user may select for further presentation; etc.), visual indications of doorways and windows, etc. —in other embodiments and situations, some or all such types of information may instead be provided by one or more MIGM system operator users and/or ICA system operator users. In addition, when the floor plans 230m and/or 230n are displayed to an end user, one or more user-selectable controls may be added to provide interactive functionality as part of a GUI (graphical user interface) screen 255n, such as to indicate a current floor that is displayed, to allow the end user to select a different floor to be displayed, etc., with a corresponding example user-selectable control 228 added to the GUI in this example. In some embodiments, a change in floors or other levels may also be made directly from the displayed floor plan, such as via selection of a corresponding connecting passage (e.g., stairs to a different floor), and other visual changes may be made directly from the displayed floor plan by selecting corresponding displayed user-selectable controls (e.g., to select a control corresponding to a particular image at a particular location, and to receive a display of that image, whether instead of or in addition to the previous display of the floor plan from which the image is selected). In addition, in some embodiments information for multiple floors (e.g., all floors) will be displayed simultaneously (whether as separate sub-floor plans for separate 0dfloors, or instead by integrating the room connection information for all rooms and floors into a single floor plan that is shown together at once). It will be appreciated that a variety of other types of information may be added in some embodiments, that some of the illustrated types of information may not be provided in some embodiments, and that visual indications of and user selections of linked and associated information may be displayed and selected in other manners in other embodiments.

FIG. 2-O continues the examples of FIGS. 2A-2N, and Illustrates additional information 265 that may be generated from the automated analysis techniques disclosed herein, which in this example is a 2.5D or 3D model floor plan of the house. Such a model 265 may be additional mapping-related information that is generated based on the floor plan 230m and/or 230n, with additional information about height shown in order to illustrate visual locations in walls of features such as windows and doors. While not illustrated in FIG. 2-O, additional information may be added to the displayed walls in some embodiments, such as from images taken during the video capture (e.g., to render and illustrate actual paint, wallpaper or other surfaces from the house on the rendered model 265), and/or may otherwise be used to add specified colors, textures or other visual information to walls or other surfaces.

Additional details related to embodiments of a system providing at least some such functionality of an MIGM system or related system for generating floor plans and associated information and/or presenting floor plans and associated information are included in U.S. Non-Provisional patent application Ser. No. 16/190,162, filed Nov. 14, 2018 and entitled "Automated Mapping Information Generation From Inter-Connected Images" (which includes disclosure of an example Floor Map Generation Manager, or FMGM, system that is generally directed to automated operations for generating and displaying a floor map or other floor plan of a building using images acquired in and around the building); in U.S. Non-Provisional patent application Ser. No. 16/681,787, filed Nov. 12, 2019 and entitled "Presenting Integrated Building Information Using Three-Dimensional Building Models" (which includes disclosure of an example FMGM system that is generally directed to automated operations for displaying a floor map or other floor plan of a building and associated information); in U.S. Non-Provisional patent application Ser. No. 16/841,581, filed Apr. 6, 2020 and entitled "Providing Simulated Lighting Information For Three-Dimensional Building Models" (which includes disclosure of an example FMGM system that is generally directed to automated operations for displaying a floor map or other floor plan of a building and associated information); in U.S. Non-Provisional patent application Ser. No. 17/080,604, filed Oct. 26, 2020 and entitled "Generating Floor Maps For Buildings From Automated Analysis Of Visual Data Of The Buildings' Interiors" (which includes disclosure of an example Video-To-Floor Map, or VTFM, system that is generally directed to automated operations for generating a floor map or other floor plan of a building using video data acquired in and around the building); in U.S. Provisional Patent Application No. 63/035,619, filed Jun. 5, 2020 and entitled "Automated Generation On Mobile Devices Of Panorama Images For Buildings Locations And Subsequent Use"; in U.S. Non-Provisional patent application Ser. No. 17/069,800, filed Oct. 13, 2020 and entitled "Automated Tools For Generating Building Mapping Information"; and in U.S. Non-Provisional patent application Ser. No. 16/807,135, filed Mar. 2, 2020 and entitled "Automated Tools For Generating Mapping Information For Buildings" (which includes disclosure of an example MIGM system that is generally directed to automated operations for generating a floor map or other floor plan of a building using images acquired in and around the building); each of which is incorporated herein by reference in its entirety. In addition, further details related to embodiments of a system providing at least some such functionality of a system for using acquired images and/or generated floor plans are included in U.S. Non-Provisional patent application Ser. No. 17/185,793, filed Feb. 25, 2021 and entitled "Automated Usability Assessment Of Buildings Using Visual Data Of Captured In-Room Images" (which includes disclosure of an example Building Usability Assessment Manager, or BUAM, system that is generally directed to automated operations for analyzing visual data from images captured in rooms of a building to assess room layout and other usability information for the building's rooms and optionally for the overall building, and to subsequently using the assessed usability information in one or more further automated manners); which is incorporated herein by reference in its entirety.

FIGS. 2P-2R continue the examples of FIGS. 2A through 2-O, with FIG. 2P illustrating further information 230*p* that shows the living room of the house 198 of FIG. 1, along with an indication 289*p* of an acquisition position of an additional target image, although that acquisition position is not yet established by the automated operations of the ILDM system in this example. In this example, the target image is acquired separately from the images of FIG. 1 (with the images of FIG. 1 being earlier images captured at the acquisition locations 210 for use in generating a floor plan for the building 198, and the target image acquired at a different location), and in this example at a later time after the generation of the floor plan for building 198. The target image is a 360° panorama image in this example, as shown in image 250*q* of FIG. 2Q using an equirectangular spherical format to simultaneously show all 360° horizontally of visual content of the target image (with the acquisition location being in the northwest quadrant of the living room, and the beginning acquisition orientation of the panorama image to the west and continuing in a 360° horizontal circle). In other embodiments, such a target image may have other forms (e.g., a 180° panorama image, such as shown in example image 255*r* of FIG. 2R in a rectilinear format; a perspective image, such as corresponding to example image 250*d* of FIG. 2R that is shown as a subset of the image 255*r* in this example; etc.). After being supplied the target image and optionally acquisition metadata related to its capture, the ILDM system may perform various automated operations to use the visual data of the target image (and optionally the acquisition metadata) to determine the acquisition position of the target image, including to determine that the target image is captured in the living room (rather than in another room of the building 198, or in some cases, in other rooms of other buildings) and to determine the specific acquisition position or pose (location and orientation) of the target image within the living room, with such a determined acquisition position of the target image subsequently overlaid on a displayed floor plan of the building in a manner similar to that illustrated in FIG. 2P.

FIG. 2S continues the examples of FIGS. 2A-2R, and as illustrated in FIG. 2S, the automated operations of the ILDM system may begin by analyzing the visual data of the target image 250*q* and optionally its associated acquisition metadata to determine 3D room shape information and associated information for the target image, with example results shown in the image 255*s* and its associated information. In particular, as part of the analysis of the target image, the ILDM system may generate a 3D point cloud 271 corresponding to at least the walls of the room enclosing the target image, which may serve as some or all of the estimated 3D room shape for the target image—while not illustrated in the example of FIG. 2S, such a 3D point cloud may further include some or all of the ceiling and/or floor and/or other structural elements in the room in at least some embodiments and situations. In addition, the ILDM system may further generate estimated locations of planar surfaces corresponding to at least the walls (and optionally the ceiling and floor), whether in addition to or instead of the 3D point cloud, and use the estimated planar surface locations at some or all of the estimated 3D room shape for the target image— information 239*b* of FIG. 2T illustrates 2D room shape information estimated for walls of the target image's enclosing room that may be produced from such a 3D point cloud and/or planar surfaces. The ILDM system may further generate wireframe structural lines 272 for the enclosing room (e.g., for at least the wall borders with other walls and the ceiling/floor), whether in addition to or instead of the 3D point cloud, and may further use the wireframe structural lines as at least some of the estimated 3D room shape for the target image. In addition, FIG. 2S further illustrates that the automated analysis by the ILDM system may identify 2D and/or 3D bounding boxes for wall objects or other structural wall elements that are identified such as windows and doorways, with example 3D bounding boxes 273 shown for the window on the north wall and the doorway from the living room leading to the hallway, although it will be appreciated that the other windows and doorways (and optionally other structural wall elements) may similarly have generated 3D bounding boxes as well, and the automated analysis by the ILDM system may further in some embodiments determine a directional vector orientation for each of some or all such wall objects or other structural wall elements, such as vector 278 for the window on the north wall at a center point of that window (and as further illustrated in FIG. 2T, such as to show that the vector is orthogonal to the north wall direction in the 2D room shape into that room, but is slightly mis-aligned with respect to its actual southward direction due to the alignment of that north wall being slightly inaccurate in the predicted room shape for image 239*a*, as shown in comparison to corresponding directional vector information 279 determined for the actual room shape for the corresponding windows in the north wall). Furthermore, in at least some embodiments, the ILDM system may further generate tags to correspond to a determined room type for the enclosing room and/or to determined object types for structural wall elements that are identified in the room, such as the room type tag 274 and the object type tag 276 shown in this example—in addition, the room type tag 274 is shown in this example with an associated confidence level, and in some cases multiple room type tags and/or object type tags may be generated for a given room or object with different levels of confidence. In addition, in at least some embodiments, the automated operations of ILDM system may further include generating an object embedding vector for each of some or all such wall objects that encodes information regarding that wall object element or feature in a concise format for later use (such as example object embedding vector 277 shown in FIG. 2S for the window to encode information such as one or more of the shape and position of the 3D bounding box, the object type, the directional vector, etc.) and/or generating an embedding vector that encodes information regarding elements and/or features of the room in a concise format for later use (such as embedding vector 275 shown in FIG. 2S for the room), although the details of specific embedding vectors are not illustrated in this example. The various automated operations of the ILDM system to generate the estimated room shape information for the target image may be performed in various manners in various embodiments, as discussed in greater detail elsewhere herein, and additional details related to embodiments of a system for generating and using embedding vectors and associated information for one or more wall objects and/or rooms are included in U.S. Provisional Patent Application No. 63/081, 744, filed Sep. 22, 2020 and entitled "Automated Identification And Use Of Building Floor Plan Information", which is incorporated herein by reference in its entirety.

FIGS. 2T-2Z continue the examples of FIGS. 2A-2S, and illustrate aspects of further automated operations of the ILDM system in automatically determining the acquisition position of the target image shown in FIGS. 2P and 2Q. In particular, FIG. 2T illustrates information 255*t* related to information about determined room shapes in the building 198 for the ILDM system to use as candidates with which to automatically match the estimated room shape 239*a*/239*b*/239*c* of the target image's enclosing room (and optionally in other situations to retrieve determined room shapes for rooms of multiple buildings, such as if a determination of in which building the target image is acquired is being further performed by the ILDM system) —the obtained determined room shapes may be, for example, determined 2D and/or 3D room shapes that were previously specified for other rooms in the building and/or automatically generated from 2D room shape outlines on the building's floor plan, and/or determined 2D and/or 3D room shapes that are automatically generated from analysis of visual data of other images acquired in the building 198, such as other existing images previously acquired in those rooms and/or other additional images acquired during a same time period as the acquisition of the target image and with the determined room shapes being dynamically generated at the same or similar time as generating the estimated room shape for the target image. In this example, FIG. 2T illustrates information 239*a* and 239*b* and 239*c* to correspond to alternative manners for representing the estimated room shape for the target image, with information 239*a* corresponding to the 3D room shape shown in the image 255*s* of FIG. 2S (e.g., to show structural wireframe lines for at least wall borders and to show locations of wall object structural elements such as windows and doorways and other wall openings, but without some details shown that may be determined and used for the 3D room shape, such as the presence of a 3D point cloud, the bounding boxes, etc.), and information 239*b* corresponding to a 2D room shape for the enclosing room that illustrates the estimated positions of walls and wall object structural elements such as windows, doorways and other inter-room wall openings (and showing directional vector 278 for the window on the north wall), and information 239*c* corresponding to a 3D room shape for the enclosing room in a manner similar to information 239*b* but with wall height information illustrated—in various embodiments, shape matching may be performed using room shape information of type 239*a* and/or 239*b* and/or 239*c*. It will be appreciated that the estimated room shape information for the target image's enclosing room may differ somewhat from the actual enclosing room, such as to have opposite walls of slightly different length, to have intersecting walls at angles other than 90°, etc. In addition to the estimated room shape information for the enclosing room of the target image, FIG. 2T further illustrates the determined room shape information for three example rooms of the building 198, such as previously determined room shapes associated with the floor plan for the building. In this example, information of three alternative types is shown for the determined room shape for the hallway (i.e., determined room shape information 236*a* of a type analogous to estimated room shape information 239*a*, determined room shape information 236*b* of a type analogous to estimated room shape information 239*b*, and determined room shape information 236*c* of a type analogous to estimated room shape information 239*c*), for the determined room shape for the living room (i.e., determined room shape information 237*a* and 237*b* and 237*c* of types analogous to estimated room shape information 239*a* and 239*b* and 239*c*, respectively), and for the determined room shape for bedroom 1 (i.e., determined room shape information 238*a* and 238*b* and 238*c* of types analogous to estimated room shape information 239*a* and 239*b* and 239*c*, respectively) —while not illustrated in FIG. 2T, similar determined room shape information may be retrieved for some or all other rooms of building 198 (and optionally of one or more other buildings, such as other structures on the same property, other buildings in other geographic areas, etc.). In some embodiments, some or all of the candidate room shapes may be determined from analysis of visual data of other images (e.g., other additional panorama and/or non-panorama images acquired during the same or similar timeframe in the same building, other existing panorama and/or non-panorama images previously acquired in the same building, etc.), such as by estimating room shape for those other images and using those estimated room shapes as the candidate room shapes for the target image.

FIG. 2U further illustrates example information 255u regarding how the estimated room shape for the target image's enclosing room may be compared to the candidates' determined room shape information to identify one or more best matches, which in this example includes a best match 242 based on the determined room shape information 237b of the living room as shown in FIG. 2T. In this example, FIG. 2U illustrates a small proportion of the total possible alternative shape matches using the determined room shape information for the rooms of the building 198 as candidates. For example, the top row in FIG. 2U shows a small number of the possible matches of the target image's estimated room shape to the determined room shape of the hallway (as illustrated using information 236b of FIG. 2T). In particular, each of the examples of the top row involves matching 231u the lower right corner of the target image's estimated room shape to one of the corners of the hallway's determined room shape, including using vanishing line angle information (e.g., as shown 257 in FIG. 2R, but not shown in FIG. 2U) to align walls of the estimated and determined room shapes in different placements of the determined room shape for different alternative shape matches, as well as to size at least one of the estimated room shape and the determined room shape for a particular alternative shape match to fit the other—the illustrated examples are a subset of the 16 possible alternative shape placements for that lower right corner of the target image's estimated room shape (one for each of the 4 corners of the hallway's room shapes, with each of those 4 corners having 4 possible wall alignments corresponding to 2 vanishing line angle alignments for the target image's estimated room shape and to 2 vanishing line angle alignments for the hallway room shape), and with 16 additional possible alternative shape placements for each of the other 3 corners of the target image's estimated room shape, for a total of 64 possible alternative shape placements using matching corners (4 corners of the target image's estimated room shape, 4 corners of the hallway room shape, 2 vanishing line angle wall alignments for the target image's estimated room shape, and 2 vanishing line angle wall alignments for the hallway room shape). In this example, the first, fifth and sixth alternative shape matches of the top row (from left to right) involve 3 of the 4 alternative shape placements for a single corner of the hallway's determined room shape (it's southeast corner) being matched to a single corner of the estimated room shape, with different possible placements of the determined room shape using the vanishing line angles for alignment, although other alternative shape matches between the estimated room shape and the hallway's determined room shape (not shown in this example) will match other corners of the hallway's determined room shape to that same lower right corner of the estimated room shape using other possible placements, and yet other shape matches between the estimated room shape and the hallway's determined room shape (not shown in this example) will match other corners of the estimated room shape to some or all corners of the hallway's determined room shape, and with the ILDM system nonetheless further analyzing some or all of these possible alternative shape matches in at least some embodiments. In an analogous manner to the top row, the middle row includes examples of matching the target image's estimated room shape to the living room's determined room shape information 237b—as with the hallway, only a small portion of the possible alternative shape matches between the estimated room shape and the living room's determined room shape are shown, with each of these examples involving matching the lower right corner of the estimated room shape to a corner of the living room's determined room shape, with the first and fifth alternative shape matches of the middle row (from left to right) involving a single corner of the living room's determined room shape (it's southeast corner) being matched to that same corner of the estimated room shape but with different possible placements of the determined room shape using the vanishing line angles for alignment, as well as to size at least one of the estimated room shape and the determined room shape for a particular alternative shape match to fit the other, and with a variety of other possible alternative shape matches between the estimated room shape in the living room's determined room shape not shown in this example but nonetheless further analyzed by the ILDM system in at least some embodiments. The bottom row shown in FIG. 2T includes information similar to that of the top and middle rows, but with the estimated room shape being matched to the determined room shape information 238b of bedroom 1. While some or all of the alternative shape matches will be further analyzed by the ILDM system to determine one or more best matches for the target image's estimated room shape, as discussed further with respect to FIG. 2V, the illustrated alternative shape match 242 of FIG. 2U corresponds to the best match that will be determined.

In particular, FIG. 2V further illustrates information 255v that shows some of the further automated operations of the ILDM system when assessing the alternative shape match 242 of FIG. 2U. As discussed in greater detail elsewhere herein, a variety of matching criteria may be used in determining a fit between the estimated room shape of the target image and a particular determined room shape of a candidate that has a specified placement relative to the estimated room shape, including to optionally generate and combine different matching scores for different matching criteria. As one example, distances between one or more (e.g., all) matching corners of the estimated room shape and determined room shape may be measured, such as shown 234b for the two corners in the upper left (northwest) corners, with the smaller the distance reflecting the better the match (and in some embodiments, the higher the matching score) —while not shown for the other corners in this example, their distances for matching corners may be similarly measured and assessed. As another example, distances between one or more (e.g., all) corresponding wireframe structural lines of the estimated room shape and determined room shape may be measured, such as shown 234c for the two wireframes corresponding to the border of the northern wall to the floor, with the smaller the distance reflecting the better the match (and in some embodiments, the higher the matching score) —while not shown for the other structural lines in this example, their distances between corresponding lines may be similarly measured and assessed. As yet another example, distances between one or more (e.g., all) corresponding 2D and/or 3D bounding boxes for objects of the estimated room shape and determined room shape may be measured, such as shown 234a for the two doorways at the lower left side of the rooms, and with the smaller the distance reflecting the better the match (and in some embodiments, the higher the matching score), although the entire bounding box areas may be compared in other embodiments (e.g., using an intersection-over-union distance measurement) —while not shown for other structural element objects in this example, their distances between corresponding bounding box portions may be similarly measured and assessed. As another example, distances between one or more (e.g., all) corresponding walls of the estimated room shape and determined room shape may be measured, such as shown 234*d* for the two walls on the top side of the room shapes, with the smaller the distance reflecting the better the match (and in some embodiments, the higher the matching score) —while not shown for other walls in this example, their distances between corresponding walls may be similarly measured and assessed. Various other criteria may be accessed and used, whether in addition to or instead of some or all of the illustrated criteria, as discussed in greater detail elsewhere herein. After the one or more criteria are assessed for at least some of the candidate room shapes' alternative shape matches, at least one best matching alternative shape match is selected for further use in the acquisition position determination for the target image, such as to determine where the target image's position within the estimated room shape occurs within the determined room shape according to its relative placement for that best matching alternative shape match placement, so as to correspond to a location of acquisition position 289*v* shown in FIG. 2V for the illustrated alternative shape match. In addition, once the acquisition position is determined for such a target image, it may be shown on updated versions of the floor plan for the building, such as illustrated for updated floor plans 230*z* and 265*z* in information 255*z* of FIG. 2Z.

FIG. 2W continues the examples of FIGS. 2A-2V, and includes information similar to FIG. 2U in illustrating matching the estimated room shape 239*b* for the target image 250*q*'s enclosing room to other candidate room shapes for the house 198 to identify one or more best matches, but with a wall object (in this example, a window wall object) and other parts of the estimated room shape 239*b* used to match corresponding wall objects (e.g., of the same type, such as other window wall objects) and other parts of candidate room shapes. In particular, FIG. 2W further illustrates example information 255*w* with a small proportion of the total possible alternative shape matches using the determined room shape information for the rooms of the building 198 as candidates, and in this example includes the same best match 242 of the estimated room shape 239*b* to the determined room shape information 237*b* of the living room. While the possible alternative shape match placements in FIG. 2W are similar to those of FIG. 2U, the top row of FIG. 2U is not shown in FIG. 2W since the determined room shape 236*b* of the hallway shown in the top row of FIG. 2U does not include any wall objects to match to the window of the estimated room shape (corresponding to indicator 231*w*). However, the second and third rows of FIG. 2W are analogous to the second and third rows of FIG. 2U since both of the candidate room shapes 237*b* and 238*b* have one or more window objects to match to the indicated window 231*w* of the estimated room shape 239*b*. In particular, each of the examples of the second row involves matching the window 231*w* of the top of the target image's estimated room shape to one of the windows of the living room's determined room shape 237*b*, including using vanishing line angle information for the walls in target image 250*q* (e.g., as shown 257 in FIG. 2R) to align walls of the estimated room shape and using vanishing line angle information for the walls in an image of the living room (e.g., a panorama image from which the determined room shape 237*b* is generated) to align walls of the determined room shape 237*b*, providing different placements of the determined room shape 237*b* for different alternative shape matches, as well as to size at least one of the estimated room shape and the determined room shape for a particular alternative shape match to fit the other. The illustrated examples in the second row of FIG. 2W are a subset of the 12 possible alternative shape placements for that window object of the target image's estimated room shape 239*b* (one for each of the 3 window objects of the living room's room shape 237*b*, with each of those 3 window objects having 4 possible wall alignments corresponding to 4 vanishing line angle alignments for the target image's estimated room shape and the living room determined room shape), and with 12 additional possible alternative shape placements for each of the other 2 windows of the target image's estimated room shape, for a total of 36 possible alternative shape placements using matching wall objects. In this example, the fourth alternative shape match (from left to right) is shown to illustrate that no matches exist for the east wall of the living room and the illustrated shape placements of the estimated and determined room shape (since that east wall does not have a window object to match to the estimated room shape's selected window object, and the use of object types prevents the unneeded attempted match of the estimated room shape's selected window object to the non-doorway wall opening object of that east wall), while the first, fifth and sixth alternative shape matches of the second row (from left to right) involve 3 of the 4 alternative shape placements for a particular one of the windows of the living room's determined room shape (it's pair of windows on the living room's north wall, which are treated as a single combination window for the purposes of this example) being matched to the selected window of the estimated room shape, with different possible placements of the determined room shape using the vanishing line angles for alignment. The second and third alternative shape matches of the second row (from left to right) involve a subset of the alternative shape matches between the estimated room shape's selected window object and the two other windows of the living room's determined room shape, although each will have other alternative shape matches (not shown in this example) using other wall alignments based on the vanishing line angles, in a manner similar to that illustrated in the first, fifth and sixth illustrated alternative shape matches. While examples such as the fifth and sixth illustrated alternative shape matches of the second row can be visibly seen to be incorrect wall alignments, the ILDM system nonetheless analyzes some or all of these possible alternative shape matches in at least some embodiments in order to eliminate them due to low matching scores. In an analogous manner to the second row, the third row includes examples of matching the target image's estimated room shape to the determined room shape information 238*b* of bedroom 1. While some or all of the alternative shape matches will be further analyzed by the ILDM system to determine one or more best matches for the target image's estimated room shape, as discussed further with respect to FIG. 2Y, the illustrated alternative shape match 242 of FIG. 2W corresponds to the best match that will be determined if matching window objects in the manner of this example.

FIG. 2X continues the examples of FIGS. 2A-2W, and includes information similar to FIG. 2W in illustrating matching the estimated room shape 239*b* for the target image 250*q*'s enclosing room to other candidate room shapes for the house 198 to identify one or more best matches based on matching a selected wall object of the estimated room shape 239*b* to other wall objects of the determined candidate room shapes and using other room shape matching to determine a matching score, but with additional determined directional vector information for that wall object's determined bounding box being used to reduce the quantity of possible alternative shape matches by eliminating alternative possible wall alignments corresponding to vanishing line angle information. In particular, FIG. 2X further illustrates example information 255x with a small proportion of the total possible alternative shape matches using the determined room shape information for the rooms of the building 198 as candidates, and in this example continues to include the same best match 242 of the estimated room shape 239b to the determined room shape information 237b of the living room. In the example of FIG. 2X, the directional vector information 278 and 279 for the selected estimated room shape's window and the determined room shape for the living room's north windows, respectively, are illustrated in the upper row, and used for determining possible alternative shape matches as shown in the second row (corresponding to the living room's determined room shape 237b) and in the third row (corresponding to the bedroom one's determined room shape 238b). In particular, while some of the information of FIG. 2X is similar to that of FIG. 2W, the use of the directional vector information 278 and 279 can eliminate the fifth and sixth shape alternatives (from left to right) of the second and third rows, since the non-match between the directional vectors in those possible alternative shape matches, resulting in only the three possible shape matches in the second row corresponding to the first through third alternatives (from left to right), assuming that directional vector information is similarly used for the other windows of the living room, and only the single possible shape match in the third row for the third alternative (from left to right), assuming that directional vector information is similarly used for the single window of bedroom one.

FIG. 2Y continues the examples of FIGS. 2A-2X, and illustrates information 255y that shows some of the further automated operations of the ILDM system when assessing the alternative shape match 242 of FIGS. 2U and 2W-2X. As discussed in greater detail elsewhere herein, a variety of matching criteria may be used in determining a fit between the estimated room shape of the target image and a particular determined room shape of a candidate that has a specified placement relative to the estimated room shape, including to optionally generate and combine different matching scores for different matching criteria. As one example, distances between one or more (e.g., all) matching corners of the estimated room shape and determined room shape may be measured, such as shown 234f for the corners in the upper left corners, with the smaller the distance reflecting the better the match (and in some embodiments, the higher the matching score) —while not shown for the other corners in this example, their distances for matching corners may be similarly measured and assessed. As another example, distances between one or more (e.g., all) corresponding wireframe structural lines of the estimated room shape and determined room shape may be measured, such as shown 234g for the two wireframes corresponding to the wall-to-floor border of the northern wall of the living room, with the smaller the distance reflecting the better the match (and in some embodiments, the higher the matching score) —while not shown for the other structural lines in this example, their distances between corresponding lines may be similarly measured and assessed. As yet another example, distances between one or more (e.g., all) corresponding 2D and/or 3D bounding boxes for objects of the estimated room shape and determined room shape may be measured, such as shown 234e for the two doorways at the lower left side of the rooms, and with the smaller the distance reflecting the better the match (and in some embodiments, the higher the matching score), although the entire bounding box areas may be compared in other embodiments (e.g., using an intersection-over-union distance measurement) —while not shown for other structural element objects/elements/features in this example, their distances between corresponding bounding box portions may be similarly measured and assessed. As another example, distances between one or more (e.g., all) corresponding walls of the estimated room shape and determined room shape may be measured, such as shown 234h for the two walls on the top side of the room shapes, with the smaller the distance reflecting the better the match (and in some embodiments, the higher the matching score) —while not shown for other walls in this example, their distances between corresponding walls may be similarly measured and assessed, and varying distances between different parts of two walls may be assessed in various manners (e.g., averaging multiple distance measurements taken at different parts of the walls; using representative points on the walls, such as center points; etc.). As another example, distances between corresponding object embedding vectors for one or more pairs of corresponding objects of the estimated room shape and determined room shape may be measured, such as shown 234i for the two window objects being matched in this example, with the smaller the distance reflecting the better the match (and in some embodiments, the higher the matching score) —while not shown for other objects/features/elements in this example, distances between their associated object embedding vectors may be similarly measured and assessed. Various other criteria may be accessed and used, whether in addition to or instead of some or all of the illustrated criteria, as discussed in greater detail elsewhere herein.

After the one or more criteria are assessed for at least some of the candidate room shapes' alternative shape matches, at least one best matching alternative shape match is selected for further use in the acquisition pose determination for the target image, such as to determine where the target image's position within the estimated room shape occurs within the determined room shape according to its relative placement for that best matching alternative shape match placement, so as to correspond to a location of acquisition position 289y shown in FIG. 2Y for the illustrated alternative shape match. In addition, once the acquisition pose is determined for such a target image, it may be shown on updated versions of the floor plan for the building, such as illustrated for updated floor plans 230z and 265z in information 255z of FIG. 2Z. The illustrated example of FIG. 2Y further illustrates that after a best matching alternative shape match placement is determined and corresponding initial acquisition pose for the target image is determined, the ILDM system may in some embodiments and situations perform further automated operations to refine that determined initial acquisition pose to reach a final determined acquisition pose for the target image—such refinements may, for example, including using one or more of the following techniques, as discussed in greater detail elsewhere herein: performing a differentiable rendering optimization using image normal/orthogonal direction predictions; performing one or more other types of optimizations (e.g., based on gradient descent) for a target image's predicted pose, such as with respect to one or more existing images in the same room; performing a global optimization of determined pose information for multiple target images; etc. In the example of FIG. 2Y, the initial determined pose information for the target image 250q may correspond to location 288y with an indicated orientation that is approximately toward the south end of the picture window on the west wall of the living room, but via a series of one or more refinements 281y may reach the final acquisition pose at location 289y with indicated orientation to the west. One or more of the various types of criteria previously discussed for determining an initial matching score may similarly be used in some embodiments and situations as part of refining such initial determined pose information, such as, for example, using wall object information (e.g., 2D and/or 3D bounding box information, associated directional vectors, object embedding vectors, etc.).

As one non-exclusive example embodiments, automated operations of the ILDM system in determining an acquisition pose of a target image may include first determining multiple proposals for the acquisition pose corresponding to one or more rooms of a corresponding building and by using determined room shape information for those one or more rooms (e.g., with respect to multiple existing images with known pose information in the one or more rooms of the corresponding buildings, a corresponding determined room shape for each of those existing images), and determining evaluations of the multiple determined pose proposals in order to select one of the determined pose proposals as being part of a best match, and for optional further refinement before use as the determined final pose for the target image. As part of some or all such activities, information about wall objects in the target and existing images may be used, as discussed further below.

As part of the determination of the multiple acquisition pose proposals for a target image, the automated operations of the ILDS system may include performing 3D object bounding box detection on the target image and (if not previously done) on each of some or all existing images with known acquisition poses for a related area (e.g., a building, one or more rooms of the building, etc.), such as to estimate the 3D object bounding boxes for some or all wall objects (e.g., windows, doorways, non-doorway wall openings, etc.) with a relative pose using six degrees of freedom and by scaling them to a coordinate system associated with a camera used to acquire that image, as well as determining directional vector information for such 3D object bounding boxes. In addition, the automated operations include generating object embedding vectors for some or all of those wall objects (e.g., to represent shape, appearance and positional information of the object), such as by a trained neural network, and with matching between objects in the target image and one or more existing images being performed in various manners (e.g., using a trained neural network transformer module), so that the matching objects may then be used to propose poses for the target image. A 3D object bounding box can be thought of as one or more landmark points for the object and an associated directional vector corresponding to orientation of a front surface of the bounding box (e.g., a center point plus a vector coming out of that point). In some situations, 2D bounding boxes may be used, whether in addition to or instead of 3D bounding boxes, such as to correspond to a 2D landmark point on the floor beneath the object that corresponds to the center or other one or more unique control points of the object.

As part of the evaluation of multiple determined acquisition pose proposals for a target image, the automated operations of the ILDS system may further include using the determined 3D object bounding box information (or determining the information if not used for pose proposal determination). As one example, to evaluate a proposed pose based on matching objects in an estimated room shape for the target image and in one of multiple candidate determined room shapes (e.g., for multiple existing images with known pose information), that proposed pose may be used to reproject the surrounding environment in the existing image associated with the candidate determined room shape from which that proposed pose is determined to create a new reprojected image based on that proposed pose (e.g., to include some or all corners, borders, walls, windows, doorways, non-doorway wall openings and object 3D bounding boxes extracted from the target image), and then to determine if there are matching objects observed in both the target and existing images and to measure differences between such matching objects—as another example, differences between object embedding vectors for matching objects/elements/features may be measured, whether in addition to or instead of measured differences from such reprojected images. Matching objects may, for example, be considered to be objects with similar object embedding vectors (e.g., as generated by a trained neural network), locations, directional vectors, scales, object types, etc., such as to differ by at most a defined similarity threshold. A geometric relation between two object bounding boxes in the target image and an existing image may, for example, be measured by distances in object position (e.g., centroid center point) and directional vector angle of those object bounding boxes, as well as other similarity measures (e.g., volumetric intersection over union), and identify objects from the target image that overlap with corresponding objects in the existing image of the same object type (and/or by individual object instances that are uniquely identified in the target and existing images) —in some situations, the evaluation around such 3D object bounding boxers may include penalizing objects of different types (or different individual object instances) based on closeness to each other (e.g., overlapping) and rewarding objects of the same type (or the same individual object instance) based on closeness to each other (e.g., based on geometric alignment, such as measured by one or more of volumetric intersection over union, position and rotation, etc.), such as by computing a distance-based difference measure between two objects based on a computed distance between those objects' embedding vectors and/or by using a transformer neural network layer to regress a similarity score or other distance-based difference measure.

In addition, the automated operations of the ILDS system involving evaluation of determined acquisition pose proposals for a target image may further include using depth prediction for information in the target image from analysis of the visual data of the target image as part of the rendering of a reprojected new image based on a proposed pose of the target image, such as to further compare the rendered new reprojected image using a matching existing image to the original target image. The rendering of such a reprojected new image may optionally include texture mapping pixels of the original target image to determined corresponding positions in the reprojected new image, and may be performed at one or more selected resolutions and representations (e.g., a high resolution 3D point cloud or meshes; a collection of planes and cuboids, such as a determined 2D room layout and 3D object bounding boxes; etc.), with rendered pixels of the reprojected new image coming from one or more of the following: texture mapping of RGB image pixels; surface normal at each pixel; per-pixel depth at each pixel; per-pixel semantic object segmentation; etc. For example, if the existing image is a panorama image with 360° of horizontal visual coverage and the target image is a rectilinear perspective image (e.g., with 90° of horizontal visual coverage), the reprojected new image may be for only 90° of the existing image's 360° that correspond to the proposed pose, and comparison of the reprojected new image and target image may be performed for the full target image and reprojected new image or instead to only one or more subsets of the images, and may in some situations use image comparison models like Siamese convolutional neural network for classification and regression.

With respect to determining a matching score between a target image and a proposed pose for an existing image, in some situations a trained neural network is used that takes as input two lists of object embedding vectors associated with determined 3D and/or 2D bounding boxes (one list for each image) and the associated directional vector orientation for each bounding box in their respective image's local camera coordinate system—using an initial relative pose for which a score is desired, each object location and directional vector ('object pose') from the target image would be transformed to the coordinate system of the existing image, all of the object poses are passed into a pose vector embedding network with linear layers, and the resulting information is then concatenated with the object embedding vectors descriptors for the respective bounding boxes. The two lists of concatenated object information are then input to a classifier or regressor for generating scene similarities (e.g., by using a transformer that applies attention between sequence elements, thus extracting and encoding relationships between bounding boxes and the object poses, with the output of the transformer passed into a scoring layer that produces a confidence score associated with the target image's proposed pose). This technique may also be used to score a match between the target image and each existing image for which an estimated pose with the target image exists, so as to produce a list of matching scores that are aggregated to give an overall score of a target image to a room or other area in which multiple existing images are located, and/or to select one or more particular proposed target image poses.

As part of the refinement of a selected proposed pose for a target image based on a matching existing image, the automated operations of the ILDS system may further include using a pose optimization technique based on gradient descent (e.g., simulated annealing, differentiable rendering, etc.) to improve the spatial accuracy of the target image's final determined pose, such as by using an objective function for the optimizing that is the same technique used for determining the matching score while selecting that proposed pose, to optimize the pose of the target image with respect to the visual data of the matching existing image. Such pose optimization may assume, for example, that the initial selected proposed pose is within a certain error range of the actual pose (e.g., in terms of camera xyz and orientation as well as some of the camera intrinsic estimation, such as focal length of the new reprojected perspective image), and operate to adjust the pose to reduce or eliminate the difference from actual (i.e., to optimize for a higher matching score). The matching score may come, for example, from geometry reprojection of corners and 3D object bounding boxes, and/or by generating new rendered re-projected images for each adjusted pose to be considered and comparing them to the target image. Alternatively, a trained machine learning model may be used in some situations to directly regress for a more precise target image pose using the same type of information, such as geometry re-projection and/or a rendered re-projected image from the initial selected proposed pose.

Various details have been provided with respect to FIGS. 2A-2Z, but it will be appreciated that the provided details are non-exclusive examples included for illustrative purposes, and other embodiments may be performed in other manners without some or all such details.

As a non-exclusive example embodiment, the automated operations of the ILDM system may include the following actions. Begin with one or more target images with RGB visual data (but no separate depth data), optionally with further acquisition metadata for one or more of the target images that may include image capture time stamps, camera IMU signals, camera SLAM-based tracking data, and/or image room tags (e.g., supplied by a user who captured a target image for its enclosing room). In addition, begin with a floor plan in 2D or 3D using a vector format and optionally having existing images at specified positions and in different image projections from those of any of the target images, and/or with additional images in different image projections from those of any of the target images with optional further acquisition metadata of the same types.

The automated operations may include doing pre-processing on the target image(s) and optionally the additional image(s) and optionally the existing images to solve camera intrinsic and extrinsic if needed, such as to detect image vanishing lines and vanishing point, extract (if perspective image) camera focal length and field of view angle, solve camera roll pitch yaw angles relative to vanishing lines presented in the images, and re-project image into spherical space (with new camera pose leveled relative to the floor plane).

The automated operations may further include generating geometry predictions for each target image and optionally each additional image and optionally each existing image, including the following: estimating room shape geometry of the indoor structure in which the camera is located (e.g., using a convolutional-neural-network-based room shape estimator, such as HorizonNet and DuLaNet, to approximate room shape geometry to 3D shapes with uniform room height, with the camera can be found in the origin of this shape); optionally using an image structural wireframe estimator (e.g., LCNN) to predict image structural lines and projecting these lines in image 3D space as room corner candidates; using an object detection algorithm on the image to generate object bounding boxes with labels and object image descriptor (e.g., object embedding vectors that encodes information about those objects, such as object types and locations and optionally additional data such as about object shapes and/or appearances), such as to initially generate 2D object bounding boxes and then ray casting those 2D image bounding boxes onto previously estimated 3D room shapes and generating footprints of 3D objects to represent their spatial information of objects, as well as using 3D bounding box generation algorithms; optionally generating image embedding vectors (e.g., using deep neural networks models) for later use in comparing image content similarities and image overlaps; and optionally tagging the image with one or more room types (e.g., bedroom, kitchen, etc.).

The automated operations may further include generating image-to-image relations between each target image to one or more additional images and/or existing images, including the following: optionally using a feature-based image matching algorithm between the pair of images, such as SfM to solve image angular connections or pairwise image location information (e.g., which direction in image A is connecting to which direction in image B); and optionally using a deep learning-based image co-visibility algorithm between the pair of images to determine image content similarity (e.g., for later use with an assumption that images sharing high co-visibility scores have a high chance to be close to each other spatially).

The automated operations may further include retrieving a set of room shapes candidates on which to attempt to localize each target image in order to determine a precise acquisition location of the target image—the room shape candidates may be obtained from existing room shapes associated with a floor plan and/or room shapes estimated for a set of spatially-related additional images. Various heuristics may be used to generate binary relations between a pair of a target image and an additional image or a pair of a target image and an existing image or between a target image and an area in existing floor plan, including the following: use similarity/overlaps between room type tags for the target image and paired image/area (if available, such as by created by automated image classification algorithm and/or photographer and/or subsequent annotator) to aggregate a list of preferred candidate room shapes; use the temporal relation between images (if image capture time stamp metadata is available) to retrieve a set of temporally-related additional images; use a feature-matching-based image alignment algorithm to generate pairwise or groupwise image co-relations (e.g., image relative angle or binary image co-relation); use a neural-network-based image comparison algorithm to generate pairwise image to image co-relation; to use IMU metadata collected during the image capture process (if available) to give image angular connections; and use SLAM-based camera tracking algorithm (if SLAM data available) to produce image spatial relation.

The automated operations may further include performing geometry matching for each target image to one or more candidate room shapes, to match the target image's estimated room shape to a corresponding determined room shape for a room on a floor plan or to a corresponding determined room shape for an additional or existing image, and localize a target image to a single room shape (e.g., to produce one or more camera pose acquisition positions for the target image, optionally along with a confidence score for each camera pose). The automated operations generally include the following: proposing a number of shape matching options (which is based on target image camera pose in the candidate room shape space); compute a score for each of the proposed camera poses (proposed shape matching position); select the camera pose with the highest score or use threshold to pick multiple camera poses; and refine the one or more selected camera poses.

The proposing of the various shape matching options may include assuming that 2 room shapes have the same scale if they are captured by the same camera at the same height (such as for one or more target images and one or more additional images that are concurrently captured during the same period of time). Corners of the room shapes may be used to generate a collection of corner snapping options (alternative shape matches) between the target image's existing room shape and candidate room shape having different shape orientations, and/or objects in the room shapes may be used to generate a collection of object snapping options (alternative shape matches) between the target image's existing room shape and candidate room shape having different shape orientations. The shape orientations are generated by performing wall alignments based on snapping the horizontal vanishing line angle direction of the target image to the vanishing line angle direction of the paired additional or existing image or candidate room shape, or by performing wall alignments using object directional vectors. So, if vanishing line angle direction is used and there are M predicted room corners in target image, N room corners in candidate room shape, and 4 vanishing directions from the target image and the paired additional or existing image, M*N*4 camera poses are proposed for the target image. When 2 images are captured with inconsistent camera height, a camera pose can be proposed by selecting 2 control corners from each shape, and using that to generate proposed scale and xyz, with the vanishing angle alignment used to correct the proposed camera angle.

The computing of a matching score for each of the proposed camera poses (proposed shape matching position) may include combining multiple individual scores given the proposed camera pose (e.g., taking the weighted sum of each individual score, extracting a descriptor from each of these terms and use machine learning model to generate the final score, etc.). Individual scores may include one or more of the following: a corner re-projection score, in which the candidate room shape is re-projected into the target image space, the projected room corners from candidate room shape are compared with room corners from original target image existing room shape, and each target room corner is matched with its nearest candidate room shape corner, using the distance of each matching corner pair and the number of matches to generate the corner re-projection score (e.g., with the closer the match, the higher the score); a wireframe structural line re-projection score, in which the candidate room shape's structural lines are re-projected into the target image space, the projected structural lines from the candidate room shape are compared with the structural lines from the target image estimated room shape, and each target image structural line is matched with its nearest candidate room shape structural line, using the distance of each matching structural line pair and the number of matches to generate the wireframe structural line re-projection score (e.g., with the closer the match, the higher the score); a structural wall element object re-projection score, in which the candidate room shape's 2D and/or 3D object bounding boxes from the candidate room shape are re-projected into the target image estimated room space, the projected object bounding boxes from the candidate room shape are compared with the object bounding boxes from the target image estimated room shape, and each target image object bounding box is matched with its nearest candidate room shape object bounding box, using the distance of each matching object bounding box pair based on an intersection-over-union and the consistency of object type tags; an image angular score, in which the departure/landing angle starting from target image to additional/existing image is generated, in which a separate departure/landing angle is also generated for each pair of images using a different technique (e.g., SfM, convolutional neural network, etc.), and in which the score is computed by comparing these 2 sets of angles (e.g., with the bigger the discrepancy, the more penalty in this score); an image content matching score, in which the image content similarity for a given image pair is generated (e.g., using a convolutional neural network); a shape-based boundary intersection score, in which structural walls of the candidate room shape are re-projected in the 3D space of target image, and the mismatch between the structural walls of the projected room shape and of the target image estimated room shape are used to evaluate the proposed camera pose; an object embedding vector difference score, in which object embedding vectors for the target image's estimated room shape's wall objects are compared to object embedding vectors for matching objects in the candidate room shape, such as by matching each target image object with its nearest candidate room shape object (e.g., of the same object type or the same individual object instance), and measuring the distance between each matching object pairs' object embedding vectors; etc.

The refining of the one or more selected camera poses may include using an initial camera pose for the target image from the previous operations (e.g., using corner point matching), and refining the camera pose using one or a combination of multiple steps. The steps may include one or more of the following: performing an alignment using corner inliers, in which a distance threshold is used to filter all the matching pairs from the previous corner matching operations within a certain re-projection image distance (with the resulting corner pairs called corner inliers), and weighted least squares is used to find the best camera position xyz, with confidence scores from the predicted corners of the target image's estimated room shape (e.g., as generated by a neural network model) used as weights in the weighted least square regression to generate a more accurate camera position than the previous camera pose; performing an alignment using line matching of wireframe structural line predictions for the target image and for the candidate room shape (e.g., between horizontal lines on the floor), such as with a distance threshold used to filter all the matching lines from the previous line matching operations within a certain re-projection image distance (with the resulting line pairs called line inliers), and weighted least squares used to find the best camera position xyz, with confidence scores from the predicted structural lines of the target image's estimated room shape (e.g., as generated by a neural network model) used as weights in the weighted least square regression to generate a more accurate camera position than the previous camera pose; performing a differentiable rendering optimization method using image normal predictions, where camera pose is optimized for a lower cost function value, by rendering the pixel-level surface normal information for the candidate room shape in the target image space starting from an initial camera pose guess, comparing the rendered surface normal with surface normal estimated from the target image in its image space (e.g., using a neural-network-based method like Taskonomy), and computing a cost value, to optimize camera pose by iteration until the cost value reaches a local minimum; performing another type of optimization based on gradient descent (e.g., simulated annealing) to optimize the camera pose using the same matching score determination used for camera pose selection; etc.

Various details have been provided with respect to this example non-exclusive embodiment, but it will be appreciated that the provided details are included for illustrative purposes, and other embodiments may be performed in other manners without some or all such details.

Figure 3:
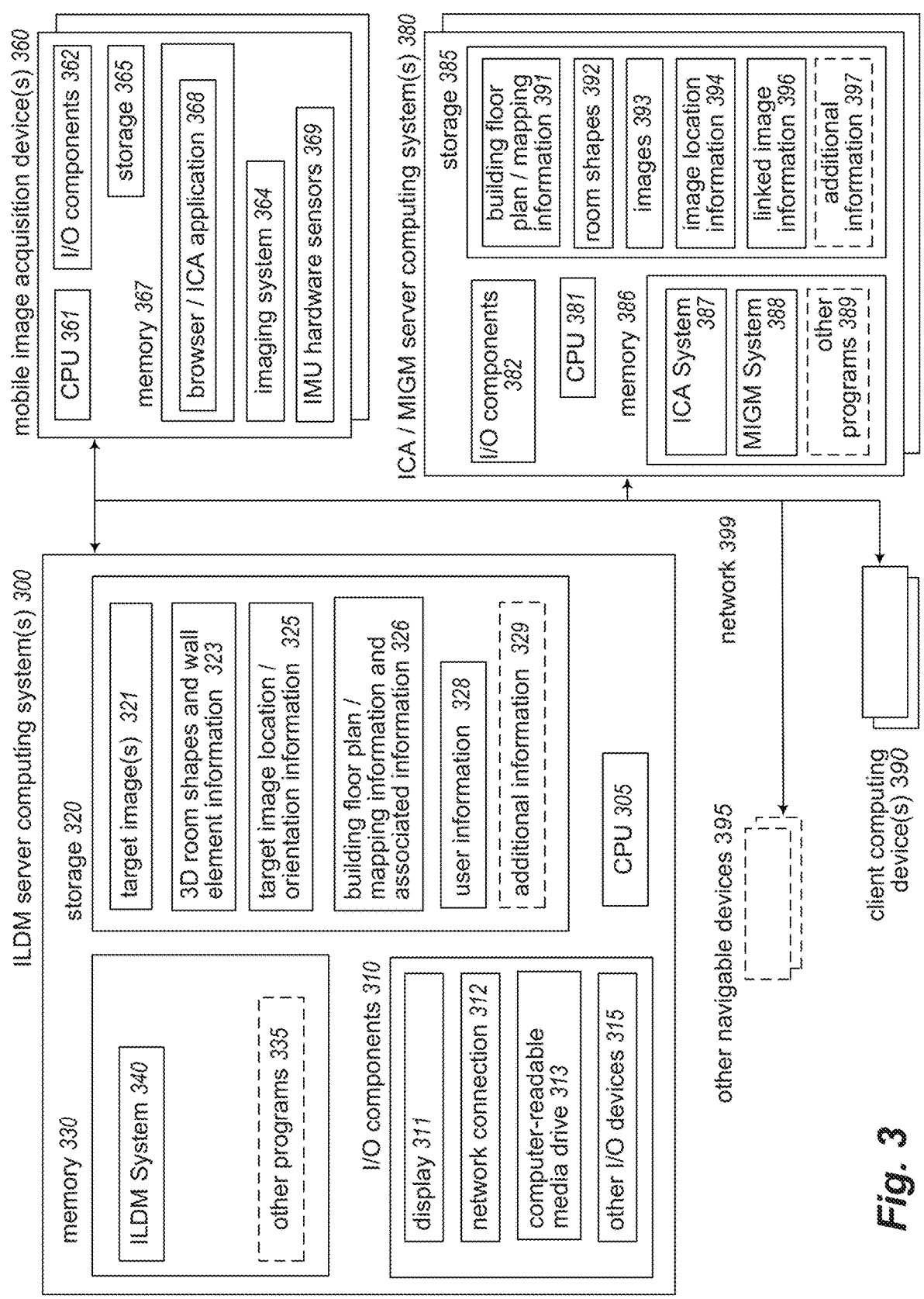
FIG. 3 is a block diagram illustrating computing systems suitable for executing embodiments of one or more systems that perform at least some of the techniques described in the present disclosure.

FIG. 3 is a block diagram illustrating an embodiment of one or more server computing systems 300 executing an implementation of an ILDM system 340, and one or more server computing systems 380 executing an implementation of an ICA system 387 and an MIGM system 388—the server computing system(s) and ILDM system may be implemented using a plurality of hardware components that form electronic circuits suitable for and configured to, when in combined operation, perform at least some of the techniques described herein. In the illustrated embodiment, each server computing system 300 includes one or more hardware central processing units ("CPU") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may include hardware components similar to those of a server computing system 300, including one or more hardware CPU processors 381, various I/O components 382, storage 385 and memory 386, but with some of the details of server 300 being omitted in server 380 for the sake of brevity.

The server computing system(s) 300 and executing ILDM system 340 may communicate with other computing systems and devices via one or more networks 399 (e.g., the Internet, one or more cellular telephone networks, etc.), such as user client computing devices 390 (e.g., used to view floor plans, associated images and/or other related information), ICA and MIGM server computing system(s) 380, one or more mobile image acquisition devices 360, optionally other navigable devices 395 that receive and use floor plans and determined image acquisition locations and optionally other generated information for navigation purposes (e.g., for use by semi-autonomous or fully autonomous vehicles or other devices), and optionally other computing systems that are not shown (e.g., used to store and provide additional information related to buildings; used to capture building interior data; used to store and provide information to client computing devices, such as additional supplemental information associated with images and their encompassing buildings or other surrounding environment; etc.).

In the illustrated embodiment, an embodiment of the ILDM system 340 executes in memory 330 in order to perform at least some of the described techniques, such as by using the processor(s) 305 to execute software instructions of the system 340 in a manner that configures the processor(s) 305 and computing system(s) 300 to perform automated operations that implement those described techniques. The illustrated embodiment of the ILDM system may include one or more components, not shown, to each perform portions of the functionality of the ILDM system, and the memory may further optionally execute one or more other programs 335—as one specific example, copies of the ICA and/or MIGM systems may execute as one of the other programs 335 in at least some embodiments, such as instead of or in addition to the ICA system 387 and MIGM system 388 on the server computing system(s) 380. The ILDM system 340 may further, during its operation, store and/or retrieve various types of data on storage 320 (e.g., in one or more databases or other data structures), such as various types of floor plan information and other building mapping information 326 (e.g., generated and saved 2D floor plans and positions of wall elements and other elements on those floor plans, generated and saved 2.5D and/or 3D model floor plans that include height information, building and room dimensions for use with associated floor plans, existing images with specified positions, annotation information, etc.), information 321 about target images whose acquisition locations are to be determined and associated information 325 about such determined acquisition locations, information 323 about estimated 3D room shapes and wall element information for target images (e.g., as generated by the ILDM system during its automated operations), user information 328 about users of client computing devices 390 and/or operator users of mobile devices 360 who interact with the ILDM system, and optionally various other types of additional information 329. The ICA system 387 and/or MIGM system 388 may similarly store and/or retrieve various types of data on storage 385 (e.g., in one or more databases or other data structures) during their operation and provide some or all such information to the ILDM system 340 for its use (whether in a push and/or pull manner), such as images 393 (e.g., acquired 360° panorama images) and inter-image directional link information 396 that is generated by the ICA system and used by the MIGM system to generate floor plans, resulting floor plan information and optionally other building mapping information 391 (e.g., similar to or the same as information 326) that is generated by the MIGM system, additional information that is generated by the MIGM system as part of generating the floor plans such as determined room shapes 392 and image location information 394, and optionally various types of additional information 397 (e.g., various analytical information related to presentation or other use of one or more building interiors or other environments captured by an ICA system).

Some or all of the user client computing devices 390 (e.g., mobile devices), mobile image acquisition devices 360, other navigable devices 395 and other computing systems may similarly include some or all of the same types of components illustrated for server computing systems 300 and 380. As one non-limiting example, the mobile image acquisition devices 360 are each shown to include one or more hardware CPU(s) 361, I/O components 362, storage 365, imaging system 364, IMU hardware sensors 369, and memory 367, with one or both of a browser and one or more client applications 368 (e.g., an application specific to the ILDM system and/or ICA system) executing within memory 367, such as to participate in communication with the ILDM system 340, ICA system 387 and/or other computing systems. While particular components are not illustrated for the other navigable devices 395 or client computing systems 390, it will be appreciated that they may include similar and/or additional components.

It will also be appreciated that computing systems 300 and 380 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated ILDM system 340 may in some embodiments be distributed in various components, some of the described functionality of the ILDM system 340 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the ILDM system 340 executing on server computing systems 300) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
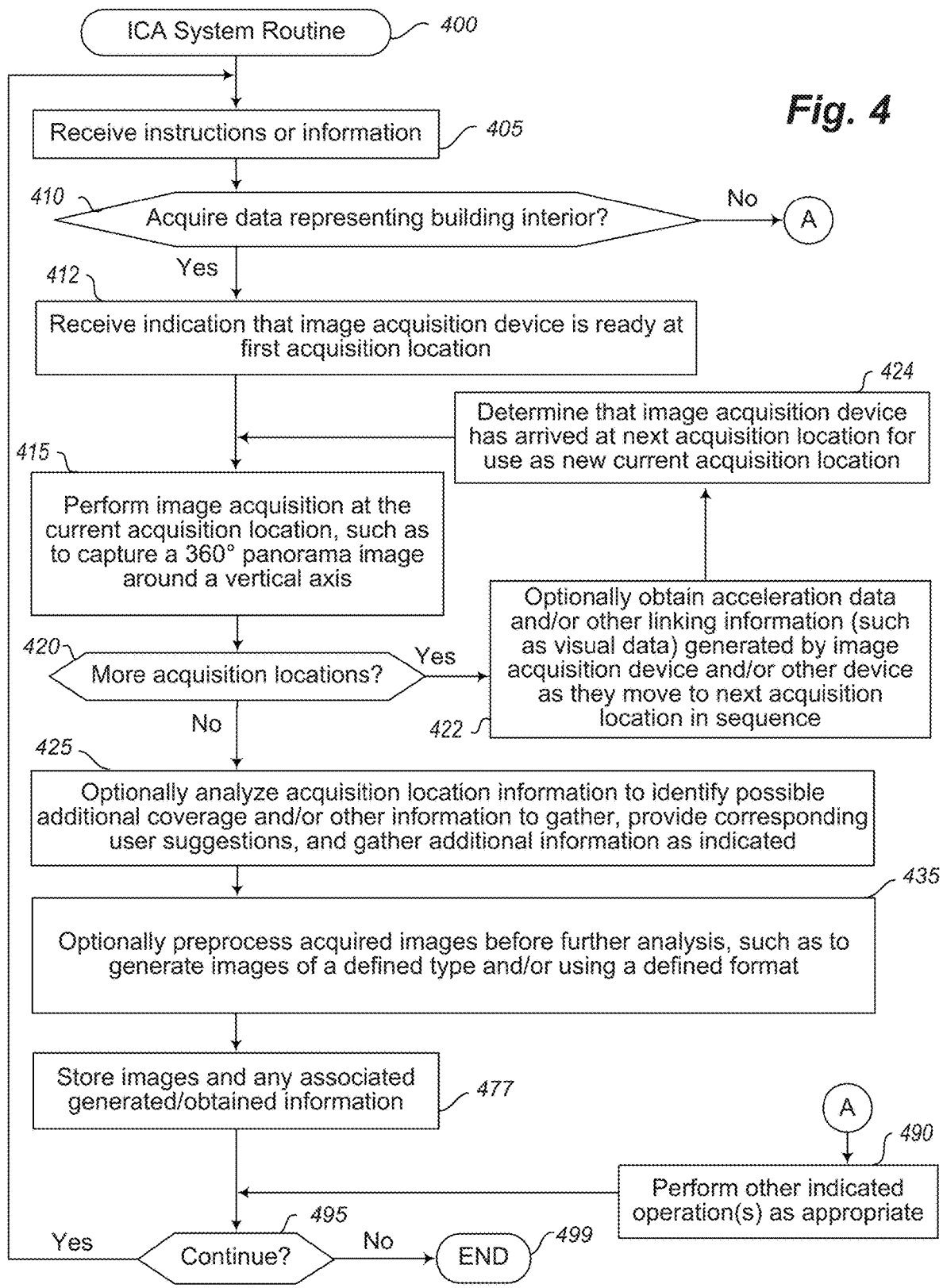
FIG. 4 illustrates an example flow diagram for an Image Capture and Analysis (ICA) system routine in accordance with an embodiment of the present disclosure.

FIG. 4 illustrates an example flow diagram of an embodiment of an ICA System routine 400. The routine may be performed by, for example, the ICA System 160 of FIG. 1A, the ICA System 387 of FIG. 3, and/or an ICA system as otherwise described herein, such as to acquire 360° panorama images and/or other images within buildings or other structures (e.g., for use in subsequent generation of related floor plans and/or other mapping information, such as by an embodiment of an MIGM system routine, with one example of such a routine illustrated with respect to FIGS. 5A-5B). While portions of the example routine 400 are discussed with respect to acquiring particular types of images at particular locations, it will be appreciated that this or a similar routine may be used to acquire video or other data (e.g., audio) and/or other types of images that are not panoramic, whether instead of or in addition to such panorama images. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to acquire image information, and/or by a system remote from such a mobile device.

The illustrated embodiment of the routine begins at block 405, where instructions or information are received. At block 410, the routine determines whether the received instructions or information indicate to acquire data representing a building interior, and if not continues to block 490. Otherwise, the routine proceeds to block 412 to receive an indication (e.g., from a user of a mobile image acquisition device) to begin the image acquisition process at a first acquisition location. After block 412, the routine proceeds to block 415 in order to perform acquisition location image acquisition activities in order to acquire a 360° panorama image for the acquisition location in the interior of the target building of interest, such as to provide horizontal coverage of at least 360° around a vertical axis. The routine may also optionally obtain annotation and/or other information from a user regarding the acquisition location and/or the surrounding environment, such as for later use in presentation of information regarding that acquisition location and/or surrounding environment.

After block 415 is completed, the routine continues to block 420 to determine if there are more acquisition locations at which to acquire images, such as based on corresponding information provided by the user of the mobile device. If so, the routine continues to block 422 to optionally initiate the capture of linking information (such as acceleration data, visual data, etc.) during movement of the mobile device along a travel path away from the current acquisition location and towards a next acquisition location within the building interior. As described elsewhere herein, the captured linking information may include additional sensor data (e.g., from one or more IMU, or inertial measurement units, on the mobile device or otherwise carried by the user) and/or additional visual information (e.g., panorama images, other types of images, panoramic or non-panoramic video, etc.) recorded during such movement. Initiating the capture of such linking information may be performed in response to an explicit indication from a user of the mobile device or based on one or more automated analyses of information recorded from the mobile device. In addition, the routine may further optionally monitor the motion of the mobile device in some embodiments during movement to the next acquisition location, and provide one or more guidance cues to the user regarding the motion of the mobile device, quality of the sensor data and/or visual information being captured, associated lighting/environmental conditions, advisability of capturing a next acquisition location, and any other suitable aspects of capturing the linking information. Similarly, the routine may optionally obtain annotation and/or other information from the user regarding the travel path, such as for later use in presentation of information regarding that travel path or a resulting inter-panorama image connection link. In block 424, the routine determines that the mobile device has arrived at the next acquisition location (e.g., based on an indication from the user, based on the forward movement of the user stopping for at least a predefined amount of time, etc.), for use as the new current acquisition location, and returns to block 415 in order to perform the acquisition location image acquisition activities for the new current acquisition location.

If it is instead determined in block 420 that there are not any more acquisition locations at which to acquire image information for the current building or other structure, the routine proceeds to block 425 to optionally analyze the acquisition location information for the building or other structure, such as to identify possible additional coverage (and/or other information) to acquire within the building interior. For example, the ICA system may provide one or more notifications to the user regarding the information acquired during capture of the multiple acquisition locations and optionally corresponding linking information, such as if it determines that one or more segments of the recorded information are of insufficient or undesirable quality, or do not appear to provide complete coverage of the building. After block 425, the routine continues to block 435 to optionally preprocess the acquired 360° panorama images before their subsequent use for generating related mapping information (e.g., to place them in a spherical format, to determine vanishing lines and vanishing points for the images, etc.). In block 477, the images and any associated generated or obtained information is stored for later use.

If it is instead determined in block 410 that the instructions or other information recited in block 405 are not to acquire images and other data representing a building interior, the routine continues instead to block 490 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the ICA system, etc.), to obtain and store other information about users of the system, to respond to requests for generated and stored information, etc.

Following blocks 477 or 490, the routine proceeds to block 495 to determine whether to continue, such as until an explicit indication to terminate is received, or instead only if an explicit indication to continue is received. If it is determined to continue, the routine returns to block 405 to await additional instructions or information, and if not proceeds to step 499 and ends.

Figure 5A:
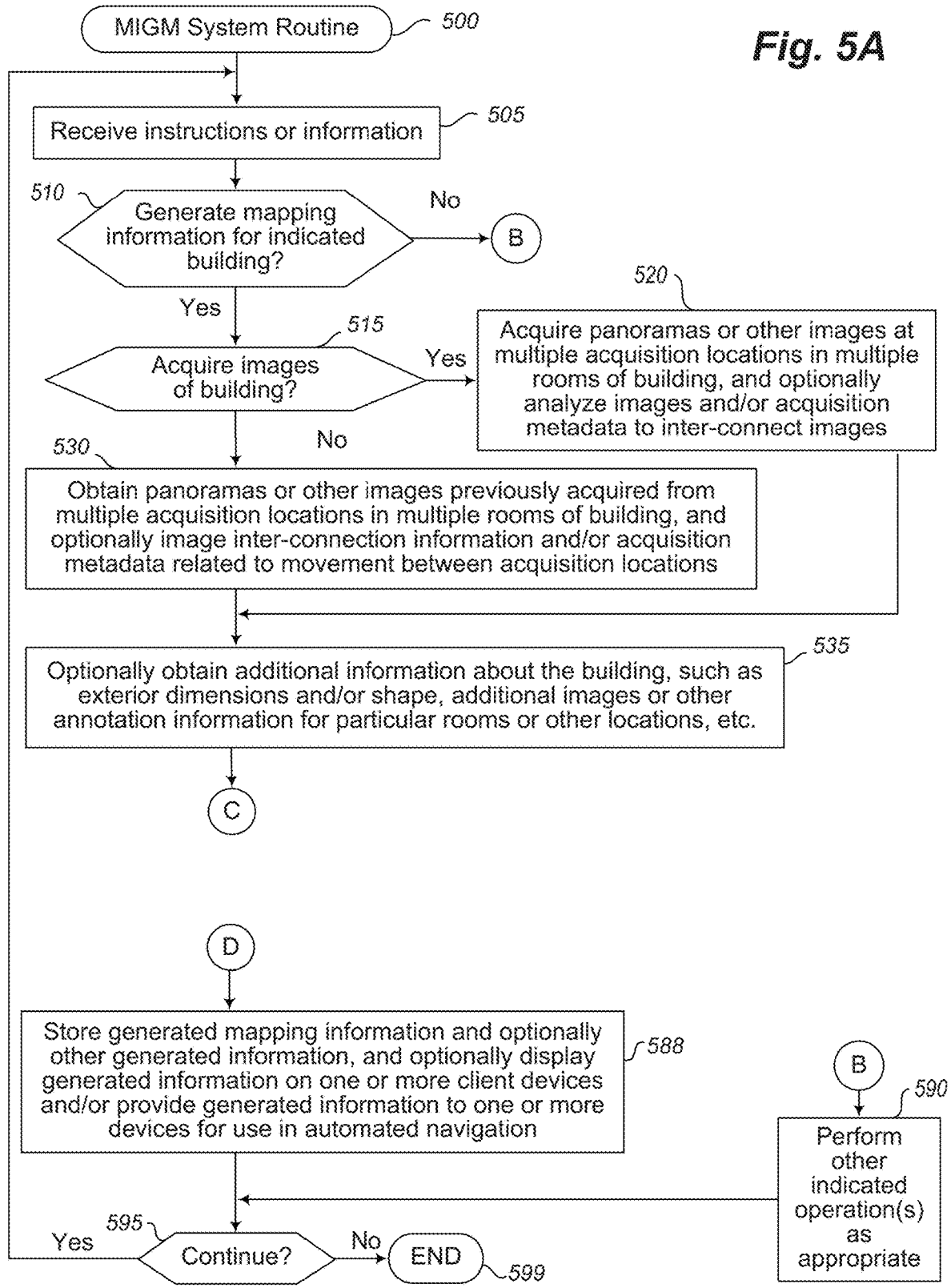
FIGS. 5A-5B illustrate an example flow diagram for a Mapping Information Generation Manager (MIGM) system routine in accordance with an embodiment of the present disclosure.
Figure 5B:
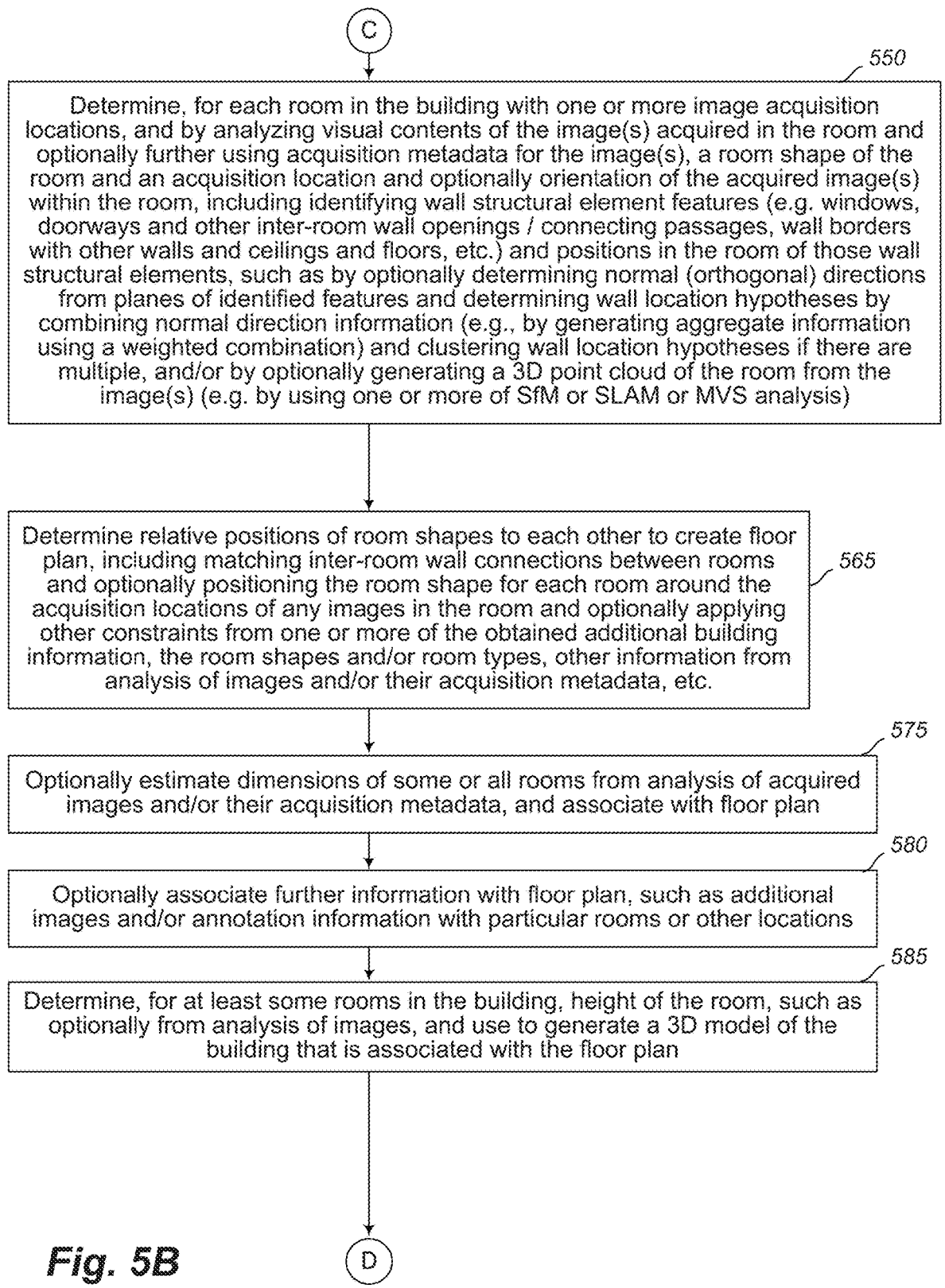

FIGS. 5A-5B illustrate an example embodiment of a flow diagram for a Mapping Information Generation Manager (MIGM) System routine 500. The routine may be performed by, for example, execution of the MIGM system 160 of FIG. 1A, the MIGM system 388 of FIG. 3, and/or an MIGM system as described elsewhere herein, such as to generate a floor plan and optionally other mapping information for a defined area based at least in part on images of the area. In the example of FIGS. 5A-5B, the generated mapping information includes a 2D floor plan and 3D computer model floor plan of a building, such as a house, but in other embodiments, other types of mapping information may be determined and generated for other types of buildings and used in other manners, as discussed elsewhere herein.

The illustrated embodiment of the routine begins at block 505, where information or instructions are received. The routine continues to block 510 to determine whether the instructions received in block 505 indicate to generate mapping information for an indicated building, and if so the routine continues to perform blocks 515-588 to do so, and otherwise continues to block 590.

In block 515, the routine determines whether image information is already available for the building, or if such information instead needs to be acquired. If it is determined in block 515 that the information needs to be acquired, the routine continues to block 520 to acquire such information, optionally waiting for one or more users or devices to move throughout the building and acquire panoramas or other images at multiple acquisition locations in multiple rooms of the building, and to optionally further analyze the images and/or metadata information about their acquisition to interconnect the images, as discussed in greater detail elsewhere herein—FIG. 4 provides one example embodiment of an ICA system routine for performing such image acquisition. If it is instead determined in block 515 that it is not necessary to acquire the images, the routine continues instead to block 530 to obtain existing panoramas or other images from multiple acquisition locations in multiple rooms of the building, optionally along with interconnection information for the images and acquisition of metadata information related to movement between the acquisition locations, such as may in some situations have been supplied in block 505 along with the corresponding instructions.

After blocks 520 or 530, the routine continues to block 535 to optionally obtain additional information about the building, such as from activities performed during acquisition and optionally analysis of the images, and/or from one or more external sources (e.g., online databases, information provided by one or more end users, etc.) —such additional information may include, for example, exterior dimensions and/or shape of the building, additional images and/or annotation information acquired corresponding to particular locations within the building (optionally for locations different from acquisition locations of the acquired panorama or other images), additional images and/or annotation information acquired corresponding to particular locations external to the building (e.g., surrounding the building), etc.

After block 535, the routine continues to block 550 to determine, for each room inside the building with one or more acquisition locations and associated acquired images, a room shape of the room from data in the image(s) taken inside the room, and optionally a specified position within the room of its acquisition location(s), such as in an automated manner. The operations of block 550 may further include using visual data in the images and/or the acquisition metadata for them to determine, for each room in the building, any connecting passages in or out of the room (e.g., in an automated manner), and any wall elements in the room and their positions (e.g., in an automated manner), such as for windows, inter-wall borders, etc. The operations of block 550 further include using some or all of the other information determined in block 550 to determine estimated room shapes of the rooms. After block 550, the routine continues to block 565, where it uses the determined room shapes to create an initial 2D floor plan, such as by connecting inter-room passages in their respective rooms, by optionally positioning room shapes around determined acquisition location positions of the images (e.g., if the acquisition location positions are inter-connected), and by optionally applying one or more constraints or optimizations. Such a floor plan may include, for example, relative position and shape information for the various rooms without providing any actual dimension information for the individual rooms or building as a whole, and may further include multiple linked or associated sub-maps (e.g., to reflect different stories, levels, sections, etc.) of the building. The routine further associates positions of the doors, wall openings and other identified wall elements on the floor plan.

After block 565, the routine optionally performs one or more steps 575-580 to determine and associate additional information with the floor plan. In block 575, the routine optionally estimates the dimensions of some or all of the rooms, such as from analysis of images and/or their acquisition metadata or from overall dimension information obtained for the exterior of the building, and associates the estimated dimensions with the floor plan—it will be appreciated that if sufficiently detailed dimension information were available, architectural drawings, blue prints, etc. may be generated from the floor plan. After block 575, the routine continues to block 580 to optionally associate further information with the floor plan (e.g., with particular rooms or other locations within the building), such as additional existing images with specified positions and/or annotation information. In block 585, the routine further estimates heights of walls in some or all rooms, such as from analysis of images and optionally sizes of known objects in the images, as well as height information about a camera when the images were acquired, and further uses such information to generate a 3D computer model floor plan of the building, with the 2D and 3D floor plans being associated with each other.

After block 585, the routine continues to block 588 to store the generated mapping information and optionally other generated information, and to optionally further use the generated mapping information, such as to provide the generated 2D floor plan and/or 3D computer model floor plan for display on one or more client devices, provide that generated information to one or more other devices for use in automating navigation of those devices and/or associated vehicles or other entities, etc.

If it is instead determined in block 510 that the information or instructions received in block 505 are not to generate mapping information for an indicated building, the routine continues instead to block 590 to perform one or more other indicated operations as appropriate. Such other operations may include, for example, receiving and responding to requests for previously generated floor plans and/or other generated information (e.g., requests for such information for use by an ILDM system, requests for such information for display on one or more client devices, requests for such information to provide it to one or more other devices for use in automated navigation, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 588 or 590, the routine continues to block 595 to determine whether to continue, such as until an explicit indication to terminate is received, or instead only if an explicit indication to continue is received. If it is determined to continue, the routine returns to block 505 to wait for and receive additional instructions or information, and otherwise continues to block 599 and ends.

Figure 6A:
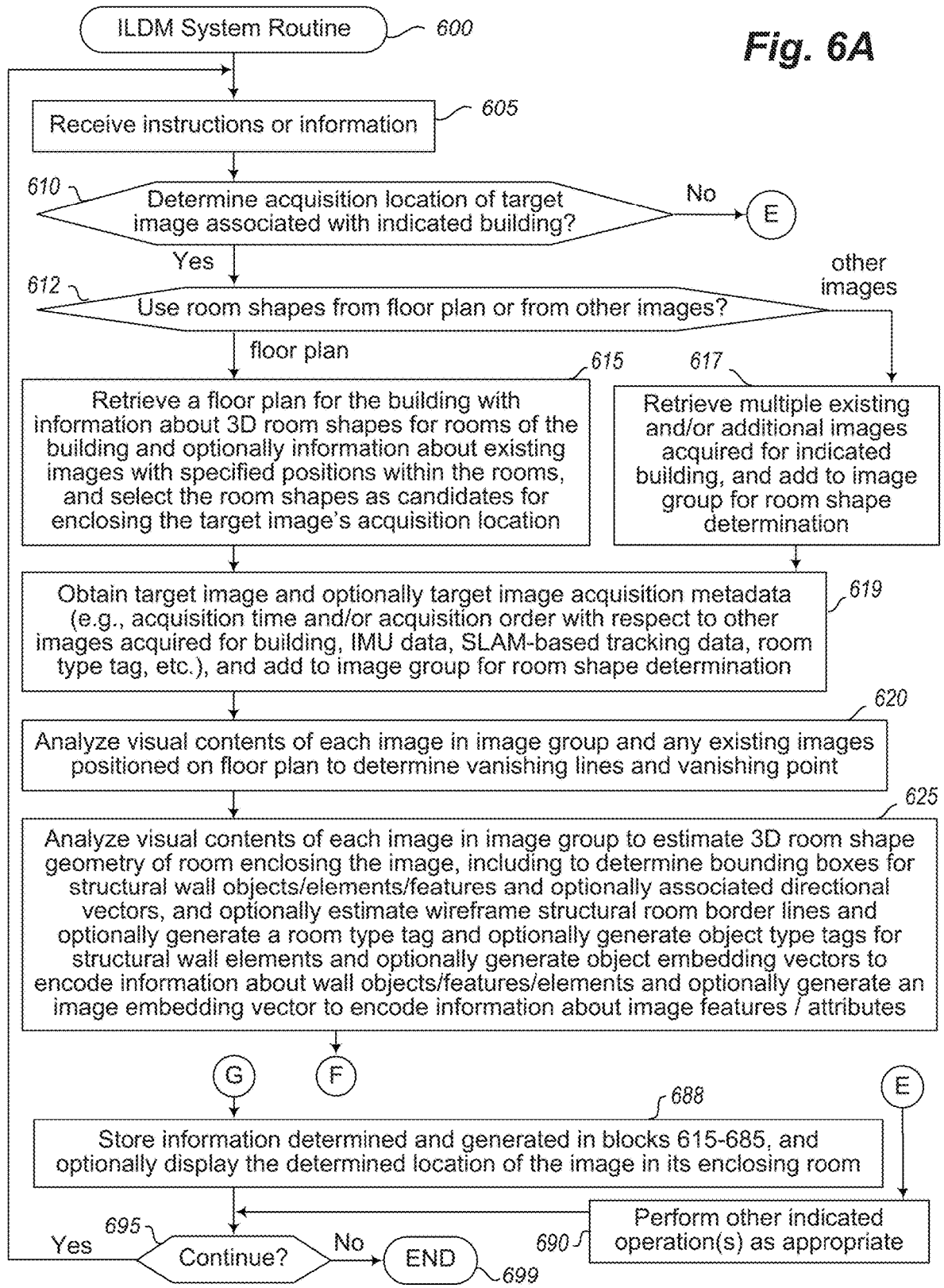
FIGS. 6A-6B illustrate an example flow diagram for an Image Location Determination Manager (ILDM) system routine in accordance with an embodiment of the present disclosure.
Figure 6B:
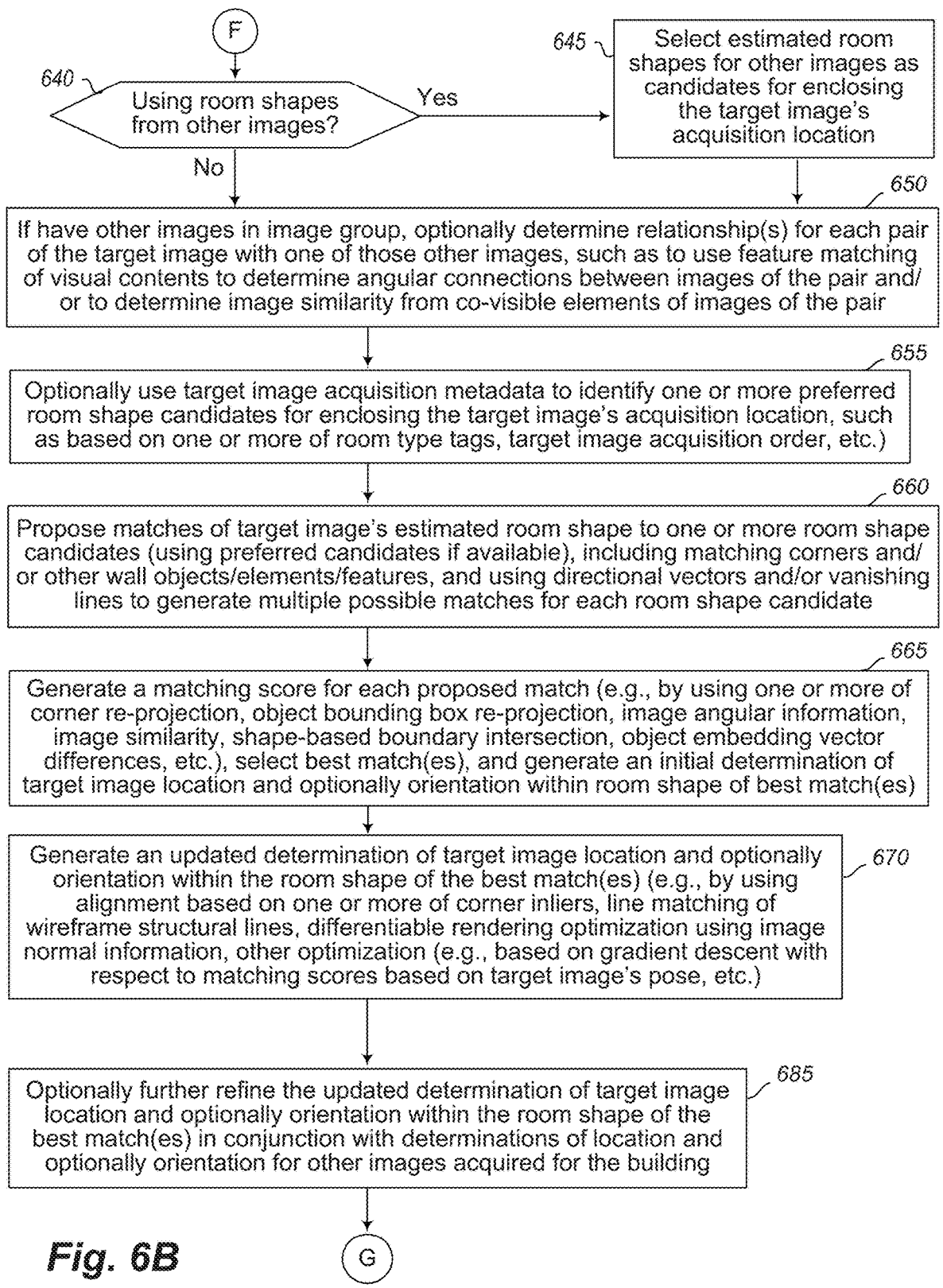

FIGS. 6A-6B illustrate an example embodiment of a flow diagram for an Image Location Determination Manager (ILDM) System routine 600. The routine may be performed by, for example, execution of the ILDM system 140 of FIG. 1A, the ILDM system 340 of FIG. 3, and/or an ILDM system as described with respect to FIGS. 2P-2Z and elsewhere herein, such as to perform automated operations related to determining the acquisition location of an image based at least in part on an analysis of the image's contents and using associated room shape information (e.g., based at least in part on wall objects and/or other structural elements and features of the room shapes), and to subsequently use the determined acquisition location information in one or more automated manners. In the example of FIGS. 6A-6B, the acquisition location is determined with respect to a floor plan of a building, such as a house, but in other embodiments, other types of mapping information may be used for other types of structures or for non-structure locations, and the determined acquisition location information may be used in other manners than those discussed with respect to routine 600, as discussed elsewhere herein.

The illustrated embodiment of the routine begins at block 605, where information or instructions are received. The routine continues to block 610 to determine whether the instructions received in block 605 indicate to determine the acquisition position of a target image for an indicated building, and if so the routine continues to perform blocks 612-688 to do so, and otherwise continues to block 690.

In block 612, the routine determines whether to use room shapes from a floor plan for the building or from other images acquired for the building (e.g., additional images acquired concurrently during the same time period as the target image, existing images that were previously acquired and have known pose information, etc.). If from other images, the routine continues to block 617 to retrieve those other images and to add them to an image group for subsequent 3D room shape estimate determination (unless room shapes have already been estimated or otherwise determined for the those images, in which case those determined room shapes are retrieved), and otherwise continues to block 615 to retrieve a floor plan for the building that has associated information about the rooms' room shapes and room types (e.g., 3D room shapes, and optionally including additional information about wall structural elements' object types and/or 2D bounding boxes and/or 3D bounding boxes, and/or about wireframe structural lines of the room shapes, etc.), and to select the room shapes from the floor plans or the other images as the candidates for enclosing the target image's acquisition position.

After blocks 615 or 617, the routine continues to block 619, where it obtains the target image and optionally acquisition metadata for the target image (e.g., one or more of acquisition time, acquisition order with respect to other images acquired for the building, IMU data, SLAM-based tracking data, room type tag, etc.), such as to receive the information in block 605 or to otherwise retrieve stored information, and adds the target image to the image group for estimated room shape determination. In block 620, the routine then, if vanishing line information is to be used rather than bounding box directional vector orientations for determining wall alignments of proposed shape matches, analyzes the visual data of each image in the image group to determine vanishing lines and vanishing point information for those images, and similarly does so for any existing images with specified positions on the floor plan if not already performed. In block 625, the routine then analyzes the visual data of each image in the image group to estimate 3D room shape geometry of the room enclosing the image, including to determine 2D and/or 3D bounding boxes for wall objects and other structural wall elements/features and to optionally determine directional vector orientations for each bounding box and to optionally generate an object embedding vector for each such object or other element/feature, to optionally estimate wireframe structural room border lines, to optionally generate a room type tag, to optionally generate object type tags for structural wall elements, and to optionally generate an image embedding vector to encode information about image features and/or attributes for the image.

After block 625, the routine continues to block 640 to determine whether the candidate room shapes are from other images or from the floor plan, and if the former proceeds to block 645 to select the estimated room shapes for the other images from block 625 to be used as the candidates for enclosing the target image's acquisition location. After block 645, or if it is instead determined in block 640 that the candidate room shapes are from the floor plan, the routine continues to block 650, where, if the image group includes other images (additional images concurrently acquired and/or previously acquired existing images with specified positions on the floor plan), it optionally performs operations including determining relationships for each pair of the target image with one of those other images, such as to use feature matching of the visual data of the images of the pair to determine angular connections between the images, and/or to determine the overall image similarity of the images of the user using co-visible elements of the images. After block 650, the routine continues to block 655, where it optionally uses acquisition metadata for the target image to identify one or more preferred room shape candidates, such as based on one or more of room type tag matching, target image acquisition order, etc. In block 660, the routine then proposes matches of the target image's estimated room shape to one or more room shape candidates (using preferred candidates if available, such as before or instead of other candidates), such as by matching corners and using vanishing lines to generate multiple possible alternative shape matches with different candidate room shape placements for each room shape candidate, by matching wall objects and using associated directional vector information to generate multiple possible alternative shape matches with one or more candidate room shape placements for each room shape candidate, etc. In block 665, the routine then generates a matching score for each proposed match, such as by using one or more scoring criteria and combining their scores if multiple are used, with the scoring criteria optionally being based on one or more of corner re-projection, object bounding box re-projection, object embedding vector comparison, image angular information, image similarity, and shape-based boundary intersection, with one or more best matches being selected based on the scores and used to generate the initial determination of the target image acquisition position/pose (e.g., acquisition location and optionally orientation) within the room shape of the one or more best matches.

In block 670, the routine then generates an updated determination of the target image acquisition position within the room shape of the one or more best matches, such as by using one or more of alignment based on corner inliers, alignment based on wireframe structural line inliers, differentiable rendering using image normal information, other optimization based on gradient descent (e.g., simulated annealing) to adjust the initial determination of the target image acquisition position/pose, etc. In block 685, the routine then optionally optimizes the updated determination of the target image acquisition position/pose within the room shape of the one or more best matches in conjunction with other related acquisition position/pose determinations for other images acquired for the building, such as to use additional information related to relationships between the images to adjust their final acquisition positions. After block 685, the routine continues to block 688 to store the information that was determined and generated in blocks 612-685, and to optionally display the determined image acquisition location information for the image in its enclosing room on the floor plan (or floor plan excerpt), although in other embodiments the determined information may be used in other manners (e.g., for automated navigation of one or more devices).

If it is instead determined in block 610 that the information or instructions received in block 605 are not to determine the acquisition position of a target image, the routine continues instead to block 690 to perform one or more other indicated operations as appropriate. Such other operations may include, for example, receiving and responding to requests for previously determined image acquisition position information and/or for associated target images (e.g., requests for such information for display on one or more client devices, requests for such information to provide it to one or more other devices for use in automated navigation, etc.), obtaining and storing information about buildings for use in later operations (e.g., information about floor plans and associated wall element positions for rooms in the floor plan, etc.), etc.

After blocks 688 or 690, the routine continues to block 695 to determine whether to continue, such as until an explicit indication to terminate is received, or instead only if an explicit indication to continue is received. If it is determined to continue, the routine returns to block 605 to wait for and receive additional instructions or information, and otherwise continues to block 699 and ends.

FIG. 7 illustrates an example embodiment of a flow diagram for a Building Map Viewer system routine 700. The routine may be performed by, for example, execution of a map viewer client computing device 175 and its software system(s) (not shown) of FIG. 1A, a client computing device 390 of FIG. 3, and/or a mapping information viewer or presentation system as described elsewhere herein, such as to receive and display mapping information (e.g., a 2D or 3D floor plan) for a defined area that includes visual indications of one or more determined image acquisition locations, as well as to optionally display additional information (e.g., images) associated with particular locations in the mapping information. In the example of FIG. 7, the presented mapping information is for the interior of a building (such as a house), but in other embodiments, other types of mapping information may be presented for other types of buildings or environments and used in other manners, as discussed elsewhere herein.

The illustrated embodiment of the routine begins at block 705, where instructions or information are received. At block 710, the routine determines whether the received instructions or information indicate to display or otherwise present information representing a building interior, and if not continues to block 790. Otherwise, the routine proceeds to block 712 to retrieve a floor plan and/or other generated mapping information for the building and optionally indications of associated linked information for the building interior and/or a surrounding location external to the building, and selects an initial view of the retrieved information (e.g., a view of the floor plan). In block 715, the routine then displays or otherwise presents the current view of the retrieved information, and waits in block 717 for a user selection. After a user selection in block 717, if it is determined in block 720 that the user selection corresponds to the current building area (e.g., to change the current view), the routine continues to block 722 to update the current view in accordance with the user selection, and then returns to block 715 to update the displayed or otherwise presented information accordingly. The user selection and corresponding updating of the current view may include, for example, displaying or otherwise presenting a piece of associated linked information that the user selects (e.g., a particular image associated with a displayed visual indication of a determined acquisition location), changing how the current view is displayed (e.g., zooming in or out; rotating information if appropriate; selecting a new portion of the floor plan to be displayed or otherwise presented, such as with some or all of the new portion not being previously visible, or instead with the new portion being a subset of the previously visible information; etc.).

If it is instead determined in block 710 that the instructions or other information received in block 705 are not to present information representing a building interior, the routine continues instead to block 790 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the ILDM system, etc.), to obtain and store other information about users of the system, to respond to requests for generated and stored information, etc.

Following block 790, or if it is determined in block 720 that the user selection does not correspond to the current building area, the routine proceeds to block 795 to determine whether to continue, such as until an explicit indication to terminate is received, or instead only if an explicit indication to continue is received. If it is determined to continue (e.g., if the user made a selection in block 717 related to a new location to present), the routine returns to block 705 to await additional instructions or information (or to continue on to block 712 if the user made a selection in block 717 related to a new location to present), and if not proceeds to step 799 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
receiving, by one or more computing systems, a target image that is acquired in a building having multiple rooms and has visual coverage of multiple surrounding walls;
determining, by the one or more computing systems, an acquisition location of the target image on a floor plan of the building, including:
generating, by the one or more computing systems and based at least in part on analyzing visual data of the target image, an estimated 3D room shape visible in the target image and an indicated position within the estimated 3D room shape at which the target image was acquired, including determining information in the estimated 3D room shape about wall objects visible in the multiple surrounding walls that include at least one of one or more windows or one or more doorways or one or more non-doorway wall openings;
obtaining, by the one or more computing systems, determined three-dimensional ("3D") room shapes each associated with a respective one of the multiple rooms and including information about additional wall objects in that associated room that include at least one of one or more additional windows or one or more additional doorways or one or more additional non-doorway wall openings;
selecting, by the one or more computing systems, one of a plurality of alternative shape matches for the estimated 3D room shape based at least in part on a degree of match determined for the selected one alternative shape match, wherein the alternative shape matches are each for a placement of one of the determined 3D room shapes that is relative to the estimated 3D room shape and is based at least in part on matching one or more of the wall objects of the estimated 3D room shape and one or more of the additional wall objects of that one determined 3D room shape, and has a determined degree of match that is based at least in part on a fit in the placement of that one determined 3D room shape to the estimated 3D room shape, and wherein the one determined 3D room shape for the selected one alternative shape match is for one of the multiple rooms;
locating, by the one or more computing systems and within the one room, and by using the placement for the selected one alternative shape match of the determined 3D room shape relative to the estimated 3D room shape, the indicated position within the estimated 3D room shape on that placement, and identifying the acquisition location of the target image on the floor plan based on the located indicated position within the one room; and
providing, by the one or more computing systems, information about the determined acquisition location of the target image in the one room, to enable display of the determined acquisition location on the floor plan of the building.

2. The computer-implemented method of claim 1 wherein the determining of the acquisition location of the target image on the floor plan includes determining, by the one or more computing systems, an orientation of the target image at the determined acquisition location that identifies a direction in at least two dimensions from the determined acquisition location, and wherein the providing of the information includes presenting, by the one or more computing systems and on a client device, a display of at least some of the floor plan of the building that includes the one room and that is overlaid with one or more visual indications of the determined acquisition location and the determined orientation.

3. The computer-implemented method of claim 1 wherein the obtaining of the determined 3D room shapes for the multiple rooms includes generating, by the one or more computing systems, the determined 3D room shape for the one room based at least in part on analyzing additional visual data of an other image acquired in the one room, including determining information in that determined 3D room shape about the additional wall objects in the one room.

4. The computer-implemented method of claim 1 wherein the generating of the estimated 3D room shape includes determining, by the one or more computing systems, wall object information from the visual data of the target image that includes, for each of the wall objects, a position of a 3D bounding box around that wall object and a directional vector orientation for the 3D bounding box and at least one of an object type for that wall object or a unique identification of that wall object, and wherein the matching for each of the alternative shape matches of the one or more wall objects of the estimated 3D room shape to the one or more additional wall objects of the one determined 3D room shape for that alternative shape match includes using the determined wall object information from the visual data of the target image and using additional determined wall object information for that one determined 3D room shape that includes, for each of those one or more additional wall objects, a position of an additional 3D bounding box around that additional wall object and an additional directional vector orientation for that additional 3D bounding box and at least one of an additional object type for that additional wall object or an additional unique identification for that additional wall object.

5. The computer-implemented method of claim 1 further comprising determining, by the one or more computing systems and for each of the wall objects, an object embedding vector that is generated to encode information about at least shape and position of that wall object, and determining, by the one or more computing systems and for each of the alternative shape matches, the degree of match for that alternative shape match based at least in part on comparison of one or more of the determined object embedding vectors for the one or more wall objects of the estimated 3D room shape to one or more additional object embedding vectors generated to encode information about at least shape and position of the one or more additional wall objects of the one determined 3D room shape for that alternative shape match.

6. The computer-implemented method of claim 1 wherein the determined degree of match for the selected one alternative shape match is based on a determined matching score that represents the fit in the placement of the one determined 3D room shape for the selected one alternative shape match to the estimated 3D room shape, and wherein the identifying of the acquisition location of the target image on the floor plan based on the located indicated position within the one room includes refining, by the one or more computing systems, the located indicated position within the one room via one or more adjustments to the located indicated position within the one room that are optimized using gradient descent and one or more respective additional matching scores determined to represent fits for the one or more adjustments.

7. A system comprising:
one or more hardware processors of one or more computing devices; and
one or more memories with stored instructions that, when executed by at least one of the one or more hardware processors, cause at least one of the one or more computing devices to perform automated operations including at least:
  determining, for a target image acquired in a building having multiple rooms, an acquisition location of the target image in the building, including:
    generating, based at least in part on analyzing visual data of the target image, an estimated room shape for the target image with information about structural wall elements visible in the target image that include at least one of one or more windows or one or more doorways or one or more non-doorway wall openings;
    obtaining, for each of one or more rooms of the multiple rooms, a determined room shape of the room with information about additional structural wall elements in the room that include at least one of one or more additional windows or one or more additional doorways or one or more additional non-doorway wall openings;
    selecting one of a plurality of alternative shape matches for the estimated room shape based at least in part on a degree of match determined for that selected one alternative shape match, wherein the alternative shape matches each includes a placement of one of the determined room shapes of one of the multiple rooms relative to the estimated room shape and has a determined degree of match that is based at least in part on a fit of the estimated room shape to that placement of that one determined room shape, with at least one of the placement or the determined degree of match for that alternative shape match being based at least in part on one or more of the structural wall elements of the estimated room shape that are matched to one or more of the additional structural wall elements of that one determined room shape;
    locating, for the one room whose determined room shape is used for the selected one alternative shape match, the acquisition location of the target image within that one room based at least in part on the placement for the selected one alternative shape match; and
  providing information about the determined acquisition location of the target image in the one room of the building whose determined room shape is used for the selected one alternative shape match.

8. The system of claim 7 wherein the determining of the acquisition location of the target image in the building includes determining an orientation of the target image at the determined acquisition location that identifies a direction in at least two dimensions from the determined acquisition location, and wherein the providing of the information includes presenting, on a client device, a display of at least some of the building that includes the one room and that is overlaid with one or more visual indications of the determined acquisition location and the determined orientation.

9. The system of claim 7 wherein the obtaining of the determined room shape for each of the one or more rooms includes, for each of the one or more rooms:
  obtaining at least one other image acquired in that room; and
  generating the determined room shape for that room based at least in part on analyzing visual data of the at least one other image acquired in that room.

10. The system of claim 7 wherein the generating of the estimated room shape includes determining wall element information from the visual data of the target image that includes, for each of the structural wall elements, a position of a bounding box around that structural wall element and a directional vector orientation for the bounding box and at least one of an object type or a unique identification of that structural wall element, and wherein the at least one of the placement or the determined degree of match for each of the alternative shape matches includes using the determined wall element information from the visual data of the target image and using additional determined wall element information for that one determined room shape that includes, for each of the one or more additional structural wall elements of the determined room shape for that alternative shape match, a position of an additional bounding box around that additional structural wall element and an additional directional vector orientation for that additional bounding box and at least one of an additional object type or an additional unique identification for that additional structural wall element.

11. The system of claim 10 wherein the generating of the estimated room shape further includes analyzing, using one or more trained neural networks, the visual data of the target image.

12. The system of claim 7 wherein at least some of the structural wall elements are wall objects that include the at least one of the one or more windows or the one or more doorways or the one or more non-doorway wall openings, wherein the one or more structural wall elements of the estimated room shape are each one of the wall objects, and wherein the stored instructions include software instructions that, when executed, cause the at least one computing device to perform further automated operations including determining, for each of the wall objects, an object embedding vector that is generated to encode information about at least shape and position of that wall object, and including determining, for each of the alternative shape matches, the degree of match for that alternative shape match based at least in part on comparison of one or more of the determined object embedding vectors for the one or more structural wall elements of the estimated room shape to one or more additional object embedding vectors generated to encode information about at least shape and position of the one or more additional structural wall elements of the one determined room shape for that alternative shape match.

13. The system of claim 12 wherein the determining of the object embedding vector for each of the wall objects includes analyzing, using one or more trained neural networks, the visual data of the target image.

14. The system of claim 7 wherein the determined degree of match for the selected one alternative shape match is based on a determined matching score that represents the fit of the estimated room shape in the placement for the selected one alternative shape match to the one determined room shape in that placement, and wherein the locating of the acquisition location of the target image within the one room includes refining an initial position within the one room via one or more adjustments to the initial position that are optimized using gradient descent and one or more respective additional matching scores determined to represent fits for the one or more adjustments.

15. The system of claim 7 wherein the estimated room shape and the determined room shapes are three-dimensional ("3D") shapes, and wherein the generating of the estimated room shape includes determining room shape information of a surrounding room around the acquisition location of the target image that includes at least one of a 3D point cloud modeling at least some walls of the surrounding room, or planar surfaces representing the at least some walls of the surrounding room, or wireframe structural lines representing boundaries of the at least some walls of the surrounding room, and using the determined room shape information for the estimated room shape.

16. The system of claim 7 wherein at least some of the structural wall elements are wall objects of the estimated room shape that include the at least one of the one or more windows or the one or more doorways or the one or more non-doorway wall openings, and wherein the locating of the acquisition location of the target image within the one room further includes determining the plurality of alternative shape matches for the estimated room shape, including:
   selecting one or more of the determined room shapes as candidate room shapes for matching to the estimated room shape; and
   generating, for each of the selected candidate room shapes, one or more of the plurality of alternative shape matches by, for each of the one or more alternative shape matches, determining the placement of that selected candidate room shape relative to the estimated room shape by matching one or more additional wall objects of that selected candidate room shape with one or more of the wall objects of the estimated room shape and by using directional vector orientation for at least one of the one or more wall objects to align one or more walls of that selected candidate room shape with one or more walls of the estimated room shape and by adjusting sizes of at least one of the estimated room shape or that selected candidate room shape to correspond to each other.

17. The system of claim 16 wherein the determined room shape of the one room for the selected one alternative shape match is generated from analyzing additional visual data of an other image acquired in the one room that includes the additional structural wall elements, and wherein the selecting of one of the alternative shape matches for the estimated room shape based at least in part on its determined degree of match includes determining, for the selected one alternative shape match, a matching score between the estimated room shape and the determined room shape in the placement for the selected one alternative shape match based on one or more matching criteria, wherein the one or more matching criteria include at least one of:
   determined distances in that placement between matching bounding boxes for the one or more structural wall elements in the estimated room shape and for the one or more additional structural wall elements in that determined room shape; or
   determined distances between one or more object embedding vectors for the one or more structural wall elements in the estimated room shape that encode information about at least shape and position of those structural wall elements, and one or more matching additional object embedding vectors for the one or more additional structural wall elements in that determined room shape; or
   determined distances between positions for the one or more structural wall elements in the visual data of the target image and additional positions for the one or more structural wall elements in further visual data of a further image that is generated by reprojecting the positions of the one or more structural wall elements using the other image; or
   determined distances between positions for the one or more additional structural wall elements in the additional visual data of the other image and additional positions for the one or more additional structural wall elements in further visual data of a further image that is generated by reprojecting the positions of the one or more additional structural wall elements using the target image.

18. The system of claim 7 wherein the automated operations further include updating the placement for the selected one alternative shape match of the one determined room shape relative to the estimated room shape based on at least one of:
   performing a differentiable rendering optimization on differences between predicted pixel-level surface normal information for the estimated room shape compared to other pixel-level surface normal values estimated for an existing image with a specified position in the one room; or
   performing a differentiable rendering optimization on differences between predicted pixel-level surface segment information for the estimated room shape compared to other pixel-level surface segment values estimated for an existing image with a specified position in the one room, wherein the pixel-level surface segment information for the estimated room shape is predicted based on at least one of segment surface normal information, or segment surface depth map information, or output of a convolutional neural network; or
   performing an optimization using gradient descent based on differences between the determined degree of match for the placement for the selected one alternative shape match of the one determined room shape relative to the estimated room shape, and one or more additional determined degrees of match for one or more adjustments to the placement for the selected one alternative shape match of the one determined room shape relative to the estimated room shape.

19. A non-transitory computer-readable medium having stored contents that cause one or more computing systems to perform automated operations including at least:
   receiving, by the one or more computing systems, a target image and multiple other images that are acquired in a building having multiple rooms, wherein each of the target image and the multiple other images has visual coverage of multiple surrounding walls;
   determining, by the one or more computing systems, an acquisition location of the target image in the building, including:
      generating, by the one or more computing systems and based at least in part on analyzing visual data of the target image, an estimated room shape that includes at least walls and corners and wall objects visible in the target image, wherein the wall objects include at least one of one or more windows or one or more doorways or one or more non-doorway wall openings;
      obtaining, by the one or more computing systems, room shapes determined for the multiple other images, wherein each determined room shape identifies at least walls and corners and additional wall objects visible in a surrounding room for an associated one of the multiple other images, wherein the additional wall objects include at least one of one or more additional windows or one or more additional doorways or one or more additional non-doorway wall openings;

selecting, by the one or more computing systems, one of a plurality of alternative shape matches for the estimated room shape based at least in part on a degree of match determined for the selected one alternative shape match, wherein the alternative shape matches each includes a placement of one of the determined room shapes relative to the estimated room shape and has a determined degree of match that is based at least in part on a fit using its placement of the walls and corners and wall objects of the estimated room shape to matching walls and corners and additional wall objects of the one determined room shape for that alternative shape match;

locating, by the one or more computing systems, and for the surrounding room for the one determined room shape for the selected one alternative shape match, the acquisition location within that surrounding room using the placement for the selected one alternative shape match; and providing, by the one or more computing systems, information about the determined acquisition location of the target image within the surrounding room for the one determined room shape for the selected one alternative shape match, to enable display of the determined acquisition location with information about the building.

20. The non-transitory computer-readable medium of claim 19 wherein the determining of the acquisition location of the target image in the building includes determining, by the one or more computing systems, an orientation of the target image at the determined acquisition location that identifies a direction in at least two dimensions from the determined acquisition location, and wherein the providing of the information includes presenting, by the one or more computing systems and on a client device, a display of at least some of the building that includes the surrounding room for the one determined room shape for the selected one alternative shape match and that is overlaid with visual indications of the determined acquisition location and of the determined orientation.

21. The non-transitory computer-readable medium of claim 19 wherein the obtaining of the determined room shapes for the multiple other images includes generating, by the one or more computing systems and for the surrounding room for the one determined room shape for the selected one alternative shape match, the determined room shape for that surrounding room based at least in part on analyzing additional visual data of the one other image associated with that one determined room shape, including determining information in that determined room shape about the additional wall objects visible in that one other image.

22. The non-transitory computer-readable medium of claim 19 wherein the generating of the estimated room shape includes determining, by the one or more computing systems, wall object information from the visual data of the target image that includes, for each of the wall objects, a position of a bounding box around that wall object and a directional vector orientation for the bounding box and at least one of an object type for that wall object or a unique identification of that wall object, and wherein the selecting of the one alternative shape match includes matching the wall objects of the estimated room shape to the additional wall objects of the one determined room shape for the selected one alternative shape match by using the determined wall object information from the visual data of the target image and using additional determined wall object information for that one determined room shape that includes, for each of those one or more additional wall objects, a position of an additional bounding box around that additional wall object and an additional directional vector orientation for that additional bounding box and at least one of an additional object type for that additional wall object or an additional unique identification for that additional wall object.

23. The non-transitory computer-readable medium of claim 19 wherein the stored contents include software instructions that, when executed by the one or more computing systems, cause the one or more computing systems to perform further automated operations including determining, by the one or more computing systems and for each of the wall objects, an object embedding vector that is generated to encode information about at least shape and position of that wall object, and determining, by the one or more computing systems and for each of the alternative shape matches, the degree of match for that alternative shape match based at least in part on comparison of one or more of the determined object embedding vectors for the one or more wall objects of the estimated room shape to one or more additional object embedding vectors generated to encode information about at least shape and position of the one or more additional wall objects of the one determined room shape for that alternative shape match.

24. The non-transitory computer-readable medium of claim 19 wherein the determined degree of match for the selected one alternative shape match is based on a determined matching score that represents the fit in the placement of the one determined room shape for the selected one alternative shape match to the estimated room shape, and wherein the locating of the acquisition location of the target image within the surrounding room for the one determined room shape for the selected one alternative shape match includes refining, by the one or more computing systems, an initial position within that surrounding room via one or more adjustments to that initial position that are optimized using gradient descent and one or more respective additional matching scores determined to represent fits for the one or more adjustments.

* * * * *